US012762527B1

(12) United States Patent
Fulco et al.

(10) Patent No.: US 12,762,527 B1
(45) Date of Patent: Oct. 13, 2026

(54) DEVICE CONTROLLING AND/OR INDICATING SENSOR MODE

(71) Applicant: Block, Inc., Oakland, CA (US)

(72) Inventors: Gregory Fulco, San Francisco, CA (US); Christa Seta, New Paltz, NY (US); Alisha Wilson, Encinitas, CA (US)

(73) Assignee: Block, Inc., Oakland, CA (US)

( * ) Notice: Subject to any disclaimer, the term of this patent is extended or adjusted under 35 U.S.C. 154(b) by 42 days.

(21) Appl. No.: 18/766,323

(22) Filed: Jul. 8, 2024

(51) Int. Cl.
*G06Q 20/20* (2012.01)

(52) U.S. Cl.
CPC ......... *G06Q 20/208* (2013.01); *G06Q 20/209* (2013.01)

(58) Field of Classification Search
CPC ........................... G06Q 20/208; G06Q 20/209
See application file for complete search history.

(56) References Cited

U.S. PATENT DOCUMENTS

| | | | | |
|---|---|---|---|---|
| 7,909,248 | B1 * | 3/2011 | Goncalves | G07G 1/0072 235/462.14 |
| 9,286,558 | B1 * | 3/2016 | Daniel | G06K 19/06037 |
| 12,084,104 | B1 * | 9/2024 | Alameh | G06Q 10/087 |
| 2009/0181716 | A1 * | 7/2009 | Benco | H04N 1/4433 455/550.1 |
| 2013/0087619 | A1 * | 4/2013 | Wang | G06K 7/10554 235/462.33 |
| 2013/0256405 | A1 * | 10/2013 | Montout | G06K 7/1091 235/375 |
| 2017/0076269 | A1 * | 3/2017 | Saeed | G07G 1/0018 |
| 2018/0176366 | A1 * | 6/2018 | Mukherjee | H04W 4/50 |
| 2019/0205010 | A1 * | 7/2019 | Fujii | G06F 3/03547 |
| 2021/0329165 | A1 * | 10/2021 | Liu | H04R 1/34 |
| 2021/0406487 | A1 * | 12/2021 | Spolzino | G06K 19/06093 |
| 2022/0398905 | A1 * | 12/2022 | Yang | G06F 3/147 |
| 2023/0067950 | A1 * | 3/2023 | Burbank | G06V 20/52 |
| 2023/0152957 | A1 * | 5/2023 | Yoon | G06F 3/04845 |
| 2023/0342744 | A1 * | 10/2023 | Nelms | G06Q 30/0641 |
| 2025/0022039 | A1 * | 1/2025 | Ikezawa | G06Q 30/0185 |

OTHER PUBLICATIONS

Von Reischach, Felix, et al. "Evaluation of 1D barcode scanning on mobile phones." 2010 Internet of Things (IOT). IEEE, 2010. (Year: 2010).*

Creusot, Clement, and Asim Munawar. "Real-time barcode detection in the wild." 2015 IEEE winter conference on applications of computer vision. IEEE, 2015. (Year: 2015).*

* cited by examiner

*Primary Examiner* — Nathan A Mitchell
(74) *Attorney, Agent, or Firm* — Polsinelli PC

(57) ABSTRACT

Systems and methods are disclosed for controlling and/or indicating sensor usability. For instance, a system running an application can identify, based on contextual data, a transition in the application from a first mode (in which a sensor is not usable by the application) to a second mode (in which the sensor is usable by the application). The system can transition an output device (e.g., a display) from not outputting a sensor usability indicator (while in the first mode) to outputting the sensor usability indicator (while in the second mode). The system activates the sensor to scan an optical glyph (while in the second mode and while outputting the sensor usability indicator). The system analyzes the optical glyph to optically decode object information from the optical glyph. The object information is associated with an object. The system performs an action associated with the object based on the object information.

20 Claims, 15 Drawing Sheets

DEVICE CONTROLLING AND/OR INDICATING SENSOR MODE

TECHNICAL FIELD

A barcode scanner is a device that can scan barcodes, for instance by emitting a laser toward the barcode and measuring the reflected light from the laser. A camera is a device that includes an image sensor, for instance with an array of photodetectors, that can capture an image of a scene. A quick response (QR) code is a type of two-dimensional matrix barcode that can be read using a camera.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

DETAILED DESCRIPTION

Figure 1A:
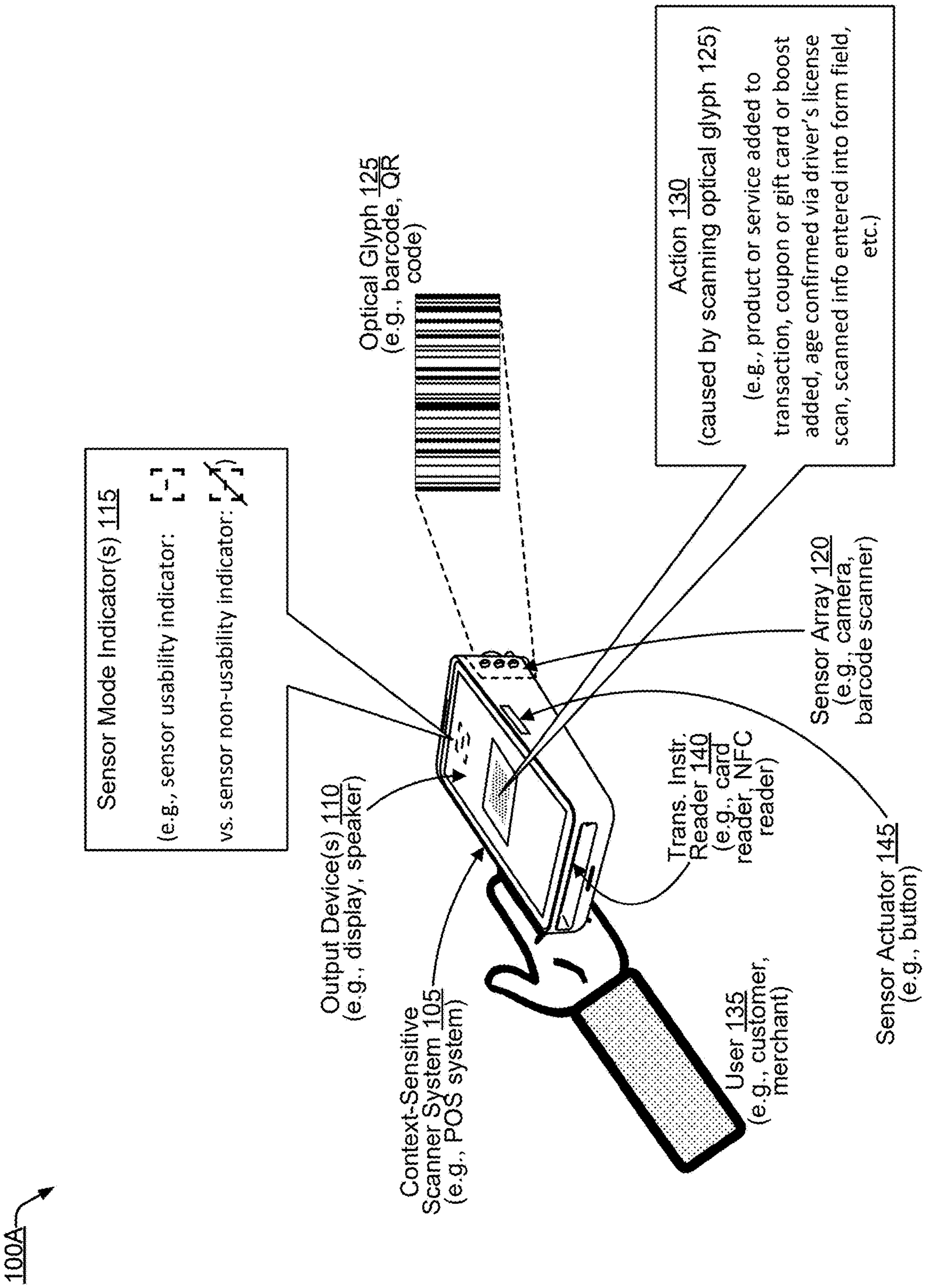
FIG. 1A is a perspective diagram illustrating use of a context-sensitive scanner system that displays sensor usability indicator(s) to show when sensor(s) of a sensor array are usable, and that uses the sensor(s) to scan an optical glyph to perform an action, in accordance with some examples.

Barcode scanners, cameras, and short-range wireless communication receiver devices can improve convenience and speed of data transfer between devices, for instance by allowing devices to communicate without physical contact. For example, barcode scanners, cameras, and short-range wireless communication receiver devices can allow devices to communicate without swiping of one object through another (e.g., swiping a card through a slot), without insertion of one object into another (e.g., inserting a card into a slot or a jack into a port), and without cables or wires.

For instance, a barcode scanner can be used to identify a barcode. A barcode can be referred to as a one-dimensional (1D) barcode. A barcode can include a series of parallel lines having a variety of widths. In some cases, a barcode scanner can emit a laser toward the barcode, and can read or scan the barcode by interpreting the light (that was initially emitted in the form of the laser) reflected back toward photodetector(s) of the barcode scanner. A system associated with the barcode scanner can decode information that is optically encoded into the barcode, for instance by interpreting different line widths, or combinations thereof, to refer to different characters. In some examples, the information can be associated with an object. For instance, the information can include a stock keeping unit (SKU) code, an identifier of the object, attribute(s) of the object, a uniform resource locator (URL) and/or uniform resource identifier (URI) pointing to a webpage with information about the object, or a combination thereof.

A camera can also be used to identify a 1D barcode or a multi-dimensional (2D, 3D, etc.) matrix barcode, such as a quick response (QR) code, an Aztec code, a data matrix, a PDF417 code, a high capacity color barcode, a maxicode, a semacode, a variant of any of the previously-listed code types, or a combination thereof. A system associated with the camera can decode information that is optically encoded into the matrix barcode, for instance by interpreting different patterns of matrix cells (e.g., black cells, white cells, and/or cells of other colors), or combinations thereof, to refer to different characters. As with the barcode, the information encoded in the matrix barcode can be associated with an object, such as a SKU code or any of the other types of information associated with an object listed above.

A short-range wireless communication receiver can communicate wirelessly over short-range wireless communication protocols such as near-field communication (NFC), radio frequency identification (RFID), Bluetooth®, personal area network(s) (PAN(s)), Wi-Fi, and/or wireless local area network(s) (WLAN(s)). In some examples, a short-range wireless communication receiver can receive information from a powered short-range wireless communication transmitter, which can use a battery or other power source to power a transmission of the information to the short-range wireless communication receiver over the short-range wireless communication protocol, which the short-range wireless communication receiver can receive, decode, decrypt, parse, and/or interpret. In some examples, a short-range wireless communication receiver can receive information from a non-powered short-range wireless communication transmitter, which can be referred to as a short-range wireless communication tag (e.g., an NFC tag or RFID tag). A non-powered short-range wireless communication transmitter can include an induction coil to wirelessly receive power from the short-range wireless communication receiver through electromagnetic induction, and use this power to power a transmission of the information to the short-range wireless communication receiver over the short-range wireless communication protocol, which the short-range wireless communication receiver can receive, decode, decrypt, parse, and/or interpret. As with the barcode and the matrix barcode, the information received by the short-range wireless communication receiver from the short-range wireless communication transmitter (powered or otherwise) can be associated with an object, such as a SKU code or any of the other types of information associated with an object listed above.

In some examples, a system that includes a one or more sensor(s) and/or communication interface(s) (e.g., a barcode scanner, a camera, and/or a short-range wireless communication receiver) can keep the one or more sensor(s) and/or communication interface(s) active at all times, allowing the system to receive sensor data from the one or more sensor(s) and/or communication interface(s) at any time. However, this can be inefficient and can waste resources. For instance, use of the one or more sensor(s) and/or communication interface(s) by the system at all times can use an increased level of power (e.g., battery power), can use an increased level of bandwidth of a coupling between the sensor(s) and processor(s) of the system, can use an increased level of bandwidth of a coupling between the communication interface(s) and processor(s) of the system, can generate increased heat, can increase a need for heat dissipation components such as heatsinks or fans (e.g., that take up space and/or use additional power), or a combination thereof. Thus, it may be desirable to turn off or otherwise disable the one or more sensor(s) and/or communication interface(s) when data from the one or more sensor(s) and/or communication interface(s) is not usable by the application running on the system, for instance as determined based on context data (e.g., which mode the application is in). In some examples, it is also beneficial to disable certain sensor(s) and/or communication interface(s) to improve user safety and/or user experience, for instance to prevent a laser (e.g., from the barcode reader) from shining into a user's eyes, to prevent a light (e.g., from a camera flash) from shining into a user's eyes, or a combination thereof.

In some examples, it can be unclear to a user of a context-sensitive scanner system that includes one or more sensor(s) and/or communication interface(s) (e.g., a barcode scanner, a camera, and/or a short-range wireless communication receiver) when each of the sensor(s) and/or communication interface(s) are, and are not, usable by the context-sensitive scanner system. For instance, in some examples, a context-sensitive scanner system may be able to receive input(s) from a barcode scanner, camera, and/or a short-range wireless communication receiver in some modes, but not in other modes, for instance based on contextual data. In an illustrative example, a context-sensitive scanner system may be a point of sale (POS) terminal running a POS application, and may include a barcode scanner, a camera, and/or a short-range wireless communication receiver. The context-sensitive scanner system can receive sensor-based inputs (e.g., via the barcode scanner, camera, and/or a short-range wireless communication receiver) while in certain modes (e.g., a mode for adding products to a cart for purchase in a transaction, a mode for managing inventory in a store, or the like) but can disable receipt of sensor-based inputs (e.g., via the barcode scanner, camera, and/or a short-range wireless communication receiver) in other modes (e.g., a mode in which the context-sensitive scanner system displays transaction analytics, a mode used for accounting or tax preparation, a mode for editing images captured using the camera, and the like).

Technical benefits of enabling and disabling the context-sensitive scanner system's ability to receive inputs from the sensor(s) and/or communication interface(s) depending on context can include, for instance, a reduction in power usage (e.g., battery power) by the context-sensitive scanner system, a decrease in bandwidth usage across a coupling between the sensor(s) and processor(s) of the context-sensitive scanner system, a decrease in bandwidth usage across a coupling between the communication interface(s) and processor(s) of the context-sensitive scanner system, a reduction in heat generated by the component(s) of the context-sensitive scanner system, a decreased need for heat dissipation components such as heatsinks or fans (e.g., that take up space and/or use additional power), or a combination thereof. In some examples, the context-sensitive scanner system can include switches that disconnect the sensor(s) and/or communication interface(s) from power, and/or from the processor(s) of the context-sensitive scanner system, during times when the application run by the context-sensitive scanner system cannot use input(s) (e.g., sensor data) from the sensor(s) and/or communication interface(s). The context-sensitive scanner system can use the switches to connect (e.g., reconnect) the sensor(s) and/or communication interface(s) to power, and/or to the processor(s) of the context-sensitive scanner system, during times when the application run by the context-sensitive scanner system can use input(s) (e.g., sensor data) from the sensor(s) and/or communication interface(s). In some examples, the context-sensitive scanner system can selectively enable certain sensor(s) and/or communication interface(s) while keeping other sensor(s) and/or communication interface(s) disabled, for instance based on context.

To overcome any potential confusion as to when a context-sensitive scanner system can and cannot use sensor data from one or more sensor(s) and/or communication interface(s) (e.g., a barcode scanner, a camera, and/or a short-range wireless communication receiver), the context-sensitive scanner system can output one or more indicators. The indicators can indicate usability or non-usability of the sensor data from one or more sensor(s) and/or communication interface(s) by the application running on the context-sensitive scanner system at a given time. In an illustrative example, where the application is a POS application, the context-sensitive scanner system can output a sensor non-usability indicator while the POS application is in a first mode (e.g., for displaying transaction analytics), and can output a sensor usability indicator while the POS application is in a first mode (e.g., for adding products to a cart for purchase in a transaction). The sensor non-usability indicator (and/or lack of sensor usability indicator) can indicate that the sensor data from one or more sensor(s) and/or communication interface(s) is not usable by the application running on the context-sensitive scanner system while in the first mode. In some examples, while a sensor may be non-usable for a particular mode, the sensor may not be disabled at that particular time. In other examples, when a sensor is indicated as non-usable, the sensor may be disabled at the particular time. The sensor usability indicator (and/or lack of sensor non-usability indicator) can indicate that the sensor data from one or more sensor(s) and/or communication interface(s) is usable by the application running on the context-sensitive scanner system while in the second mode. When the sensor usability indicator is presented, the sensor can be both usable and enabled at that time.

In some examples, the context-sensitive scanner system's output of sensor usability indicator(s) and/or sensor non-usability indicator(s) can improve the context-sensitive scanner system's user interface(s) by providing and clarifying limitations (e.g., in time, positioning of the context-sensitive scanner system, mode of the context-sensitive scanner system, and/or other contextual cues) on when certain sensor(s) and/or communication interface(s) are selectable to be used (e.g., are usable) by the application running on the context-sensitive scanner system, and when certain sensor(s) and/or communication interface(s) are not selectable to be used (e.g., are not usable) by the application. In some examples, the sensor usability indicator(s) and/or sensor non-usability indicator(s) can represent a limited list of at least one function (e.g., activation of at least one sensor or communication interface) that can be selected for use by the application to initiate the selected function (e.g., activate the at least one sensor or communication interface, receive input(s) from the at least one sensor or communication interface, and/or perform an action using the input(s)).

In some examples, systems and methods are disclosed for controlling and/or indicating sensor usability. For instance, a context-sensitive scanner system running an application can identify, based on contextual data, a transition in the application from a first mode (in which a sensor is not usable by the application) to a second mode (in which the sensor is usable by the application). The context-sensitive scanner system can transition an output device (e.g., a display) from not outputting a sensor usability indicator (while in the first mode) to outputting the sensor usability indicator (while in the second mode). The context-sensitive scanner system activates the sensor to scan an optical glyph (while in the second mode and while outputting the sensor usability indicator). The context-sensitive scanner system analyzes the optical glyph to optically decode object information from the optical glyph. The object information is associated with an object. The context-sensitive scanner system performs an action associated with the object based on the object information.

Various aspects of the application will be described with respect to the figures. FIG. 1A is a perspective diagram 100A illustrating use of a context-sensitive scanner system 105 that displays sensor usability indicator(s) 115 to show when sensor(s) of a sensor array 120 are usable, and that uses the sensor(s) to scan an optical glyph 125 to perform an action 130. The context-sensitive scanner system 105 is illustrated held by a hand of a user 135 (e.g., a customer, a merchant, a buyer, a seller, and/or another type of user). The context-sensitive scanner system 105 includes a sensor array 120 that can include one or more sensor(s) and/or communication interface(s). In some examples, the sensor(s) and/or communication interface(s) of the sensor array 120 can include, for instance, one or more barcode scanner(s), camera(s) (e.g., with image sensor(s)), short-range wireless communication receiver(s) and/or transceiver(s) (e.g., NFC reader and/or RFID reader), microphone(s), proximity sensor(s), depth sensor(s), positioning receiver(s), pose sensor(s), or a combination thereof. In some examples, the sensor array 120 can be referred to as a sensor bulge, a sensor cap, a camera bulge, a camera cap, a camera array, or a combination thereof. The sensor array 120 is illustrated as having several shapes (e.g., rounded lenses and/or associated sensor(s)) coupled to the sensor array 120. In some examples, each of these shapes can represent an example sensor and/or communication interface of the sensor array 120.

Depth sensors can include radio detection and ranging (RADAR) sensors, light detection and ranging (LiDAR) sensors, sound detection and ranging (SODAR) sensors, sound navigation and ranging (SONAR) sensors, multispectral imaging detection and active reflectance (MiDAR) sensors, laser rangefinders, time of flight (ToF) sensors, structured light sensors, stereoscopic camera sensors, or a combination thereof. Positioning receivers can include global navigation satellite system (GNSS) receivers, such as global positioning system (GPS) receivers, Galileo receivers, BeiDou navigation satellite system (BDS) receivers, Globalnaya Navigazionnaya Sputnikovaya Sistema (GLONASS) receivers, navigation Indian continent (NavIC) receivers, quasi-zenith satellite system (QZSS) receivers, or combinations thereof. Positioning receivers can also include cellular transceivers, Wi-Fi transceivers, WLAN transceivers, and/or other transceivers that can be used to locate a device (e.g., via signal triangulation). Pose sensors can include positioning receivers, accelerometers, gyrometers, gyroscopes, altimeters, barometers, intertial measurement unit(s) (IMU(s)), depth sensors, or a combination thereof.

The context-sensitive scanner system 105 includes one or more output device(s) 110. In some examples, the output device(s) 110 include one or more display(s), such as liquid crystal display (LCD) screens, light emitting diode (LED) displays, organic LED (OLED) displays, active matrix OLED (AMOLED) displays, plastic OLED (POLED) displays, twisted nematic (TN) displays, in-plane switching (IPS) displays, vertical alignment (VA) displays, mini-LED displays, micro-LED displays, quantum dot (QD) displays, QD-OLED displays, touchscreen displays (e.g., with resistive touch sensors and/or capacitive touch sensors), or combinations thereof. In some examples, the output device(s) 110 include other light sources, such as LEDs, light bulbs, or lasers that are not part of a display. In some examples, the output device(s) 110 include speakers, headphones, headsets, or other audio output devices. In some examples, the output device(s) 110 include one or more haptic actuators (e.g., motors) that can output haptic feedback, such as a vibration in a particular pattern. The context-sensitive scanner system 105 that is illustrated in FIG. 1A is illustrated as including a display as one of the output device(s) 110 of the illustrated context-sensitive scanner system 105. In some examples, the output device(s) 110 of the context-sensitive scanner system 105 can include one or more projectors.

The context-sensitive scanner system 105 is configured to, and can, output sensor mode indicator(s) 115. The sensor mode indicator(s) 115 can include sensor usability indicator (s) that the context-sensitive scanner system 105 can output via the output device(s) 110 during time periods in which a particular sensor or communication interface is usable by an application running on the context-sensitive scanner system 105. In some examples, the context-sensitive scanner system 105 can stop outputting the sensor usability indicator(s) (and/or start outputting sensor non-usability indicator(s)) during time periods in which the particular sensor or communication interface is not usable by the application running on the context-sensitive scanner system 105. An example of a sensor usability indicator is illustrated as including four corners of a square, with a horizontal line in the center (e.g., representing the laser of a barcode scanner). The example of the sensor usability indicator is illustrated in FIG. 1A in the callout for the sensor mode indicator(s) 115 as well as on the illustrated display of the illustrated context-sensitive scanner system 105.

The sensor mode indicator(s) 115 can include sensor non-usability indicator(s) that the context-sensitive scanner system 105 can output via the output device(s) 110 during time periods in which a particular sensor or communication interface is not usable by the application running on the context-sensitive scanner system 105. In some examples, the context-sensitive scanner system 105 can stop outputting the sensor non-usability indicator(s) (and/or start outputting sensor usability indicator(s)) during time periods in which the particular sensor or communication interface is usable by the application running on the context-sensitive scanner system 105. An example of a sensor non-usability indicator is illustrated as a variant of the example of the sensor usability indicator, with a diagonal line through it crossing it out. Both the sensor usability indicator(s) and sensor non-usability indicator(s) are non-limiting examples and, as described below, can be configured and/or presented in similar or different manners than described herein.

The context-sensitive scanner system 105 includes a sensor actuator 145. In some examples, the sensor actuator 145 may be a button, a switch, a toggle, a trigger, a hardware variant of any of the listed types of actuators, a virtual (e.g., touchscreen-based and/or software-based) variant of any of the listed types of actuators, or a combination thereof. In FIG. 1A, the sensor actuator 145 is illustrated as a physical button on a side of the context-sensitive scanner system 105. In another illustrative example, the sensor actuator 145 may be a virtual button displayed on a touchscreen of the context-sensitive scanner system 105. In some examples, the context-sensitive scanner system 105 can have one or more touchscreens, each of which can be considered an output device (e.g., of the output device(s) 110), an input device (e.g., of the sensor array 120 and/or other sensor(s) and/or input device(s)), or a combination thereof. In some examples, a sensor may be actuated in response to an input to an input device, such as a touchscreen (which may or may not be related to an input to a virtual button) or microphone. The user 135 may interact with the sensor actuator 145 while the sensor usability indicator (e.g., of the sensor mode indicator(s) 115) is being output by the output device(s) 110 to activate a specific sensor and/or communication interface of the sensor array 120 of the context-sensitive scanner system 105. The interaction with the sensor actuator 145 can, for instance, be, and/or include, a pressing of a button, a flipping of a switch, a sliding of a toggle, a pressing of a trigger, or a combination thereof. For instance, in FIG. 1A, the user 135 can press the sensor actuator 145 (the button) on the side of the context-sensitive scanner system 105 while the sensor usability indicator is displayed on the display (of the output device(s) 110) to activate a sensor of the sensor array 120 (e.g., a barcode scanner and/or a camera) to scan an optical glyph 125 (e.g., a barcode, a 2D matrix barcode, or another type of optical glyph).

The context-sensitive scanner system 105 scanning an optical glyph 125, such as a barcode or 2D matrix barcode, can cause the context-sensitive scanner system 105 to analyze the optical glyph 125 to extract information from the optical glyph 125 (e.g., the information having been optically encoded in the optical glyph 125). For instance, the optical glyph 125 can include information that is optically encoded in the optical glyph 125, and the context-sensitive scanner system 105 can analyze the optical glyph 125 to extract the information, for instance by interpreting different line widths of a barcode (or combinations thereof) to refer to different characters (e.g., text, numbers, and/or alphanumeric characters), or by interpreting different patterns of matrix cells (e.g., black cells, white cells, and/or cells of other colors) (or combinations thereof) to refer to different characters (e.g., text, numbers, and/or alphanumeric characters). In some examples, the information decoded from the optical glyph 125 can include information about an object. For instance, the information can include a stock keeping unit (SKU) code, an identifier of the object, attribute(s) of the object, a uniform resource locator (URL) and/or uniform resource identifier (URI) pointing to a webpage with information about the object, or a combination thereof. In some examples, the optical glyph 125 can be on the object, can be part of the object, and/or can be coupled to the object.

In some examples, the context-sensitive scanner system 105 may use a barcode scanner (of the sensor array 120) instead of (or in addition to) a camera (of the sensor array 120) to scan and/or read the optical glyph 125 at least in part to improve speed and/or efficiency over camera-based scanning and/or reading of the optical glyph 125. For instance, in some examples, a barcode scanner can provide improved speed of scanning and/or reading of the optical glyph 125 (where the optical glyph 125 is a barcode) compared to camera-based scanning and/or reading of the optical glyph 125. In some examples, a barcode scanner can use less power and/or computational resources to scan and/or read the optical glyph 125 compared to camera-based scanning and/or reading of the optical glyph 125, for instance because the barcode scanner does not need image processing and/or analysis system(s). In some examples, a barcode scanner is more robust and/or flexible at scanning and/or reading the optical glyph 125 compared to camera-based scanning and/or reading of the optical glyph 125, for instance because the barcode scanner emits the light it uses (e.g., a laser) and therefore is less dependent on ambient lighting conditions. In some examples, a barcode scanner can have a longer range from which it can scan and/or read the optical glyph 125 compared to camera-based scanning and/or reading of the optical glyph 125. Both use of barcode scanners (to scan and/or read a optical glyph 125) and camera-based scanning (to scan and/or read a optical glyph 125) are faster, more efficient, and more reliably accurate than manual entry of object information (e.g., a product name or SKU) using a keyboard, keypad, touchscreen-based interface, or other type of interface that is more reliant on receipt of user inputs to identify the object.

The context-sensitive scanner system 105 can use the information decoded from the optical glyph 125 to perform an action 130. The action 130 can include, for example, adding a product or service (e.g., associated with the object and/or the optical glyph 125) to a transaction (e.g., to a "cart" or tab or other data structure associated with the transaction) (see e.g., FIGS. 4-5), scanning the optical glyph 125 of an object (e.g., product or service) for checkout (e.g., with or without a cart or tab), searching for an item in an inventory (e.g., to add the item to a cart or tab, to identify whether the item is in stock, to identify how many of the item remain in inventory, to identify a location of the item in a store, or a combination thereof), adding an object or group of objects into an inventory database, updating inventory of an object or group of object, adding and/or redeeming an entitlement (e.g., a coupon, gift card, a transit card, a boost, a discount, a loyalty reward, another transaction modifier, or a combination thereof) to be used in a transaction, selling and/or checking a balance of an entitlement (e.g., a gift card, a loyalty reward, a transit card), confirming an age or other personal information (e.g., if the optical glyph 125 is part of a driver's license), counting and/or tracking inventory, tracking shipments, entering the information into a form field of a user interface (UI) (see e.g., FIGS. 6-7), making a selection (e.g., from a dropdown, a set of radio buttons, a set of checkboxes, or other set of option) in a user interface, creating a new item record for an object (e.g., a product or service) in an inventory data structure (see e.g., FIG. 7), adding SKUs or other information about an object and/or product and/or service to an item record, creating purchase orders, or a combination thereof.

For instance, in an illustrative example, the context-sensitive scanner system 105 can use the sensor(s) (e.g., barcode reader, camera) of the sensor array 120 to read one or more optical glyphs (e.g., optical glyph 125) associated with one or more products or services. The action 130 taken by the context-sensitive scanner system 105 can include adding the one or more products or services to a customer's "cart" or "tab" or other list of products or services to be purchased in the transaction. The context-sensitive scanner system 105 can use the transaction instrument reader 140 to read transaction instrument information from a transaction instrument, or can use stored transaction instrument information associated with the customer (e.g., previously read by the transaction instrument reader 140 or another transaction instrument reader in a previous transaction) to facilitate processing the transaction using the transaction instrument information. In some examples, facilitating the processing of the transaction can include sending the transaction instrument information (e.g., encrypted or not) to one or more transaction processing server(s) (e.g., associated with a bank or other financial entity) to allow the transaction processing server(s) to process the transaction. In some examples, facilitating the processing of the transaction can include interacting with a distributed ledger (e.g., a blockchain ledger) to add an indication of the transaction to a new block in the distributed ledger, and/or to add a corresponding transfer of asset(s) (e.g., cryptocurrencies, non-fungible token(s), or other asset(s)) to the new block in the distributed ledger.

In some examples, the action 130 may be associated with a transaction. For instance, as noted above, the action 130 can include adding an item (e.g., product or service) to a cart, tab, or otherwise for checkout in a transaction. The context-sensitive scanner system 105 is also illustrated as including at least one transaction instrument reader 140, illustrated in FIG. 1A as a card slot for receiving and/or reading a transaction card. The transaction instrument reader 140 can be used to read transacting instrument information for use in processing the transaction associated with the action 130. In some examples, the at least one transaction instrument reader 140 of the context-sensitive scanner system 105 can include a magnetic stripe reader that can read a magnetic stripe of a transaction instrument (e.g., a magnetic stripe of a transaction card swiped through a slot), an integrated circuit (IC) chip reader that can read an IC chip (e.g., a Europay-Mastercard-Visa (EMV) chip) of a transaction instrument (e.g., an IC chip of a transaction card inserted into a slot), an NFC reader that can read an NFC transmitter of a transaction instrument (e.g., a powered NFC transmitter of a phone or watch, or a non-powered NFC transmitter of a transaction card). In some examples, the context-sensitive scanner system 105 can use the transaction instrument information read from the transaction instrument using the transaction instrument reader 140 to facilitate processing of a transaction.

In some examples, the output device(s) 110 of the context-sensitive scanner system 105 may include visual output component(s) and/or device(s) (e.g., display(s), projector(s), LED indicator light(s), other type(s) of indicator light(s), or a combination thereof) that can project information about a scanned optical glyph 125, information about an object (e.g., associated with the optical glyph 125), information about a transaction (e.g., to purchase the object associated with the optical glyph 125), or a combination thereof. In some examples, for instance, the output device(s) 110 can display (e.g., on a display and/or via a projector), aspects of a transaction, another optical glyph (e.g., barcode or 2D matrix barcode such as a QR code) for a user to scan via a phone (e.g., to access a payment application for bill splitting, tipping, transaction approval, entering of sensitive data such as a personal identification number (PIN) or password, loyalty information, multi-factor authentication, or a combination thereof).

Figure 1B:
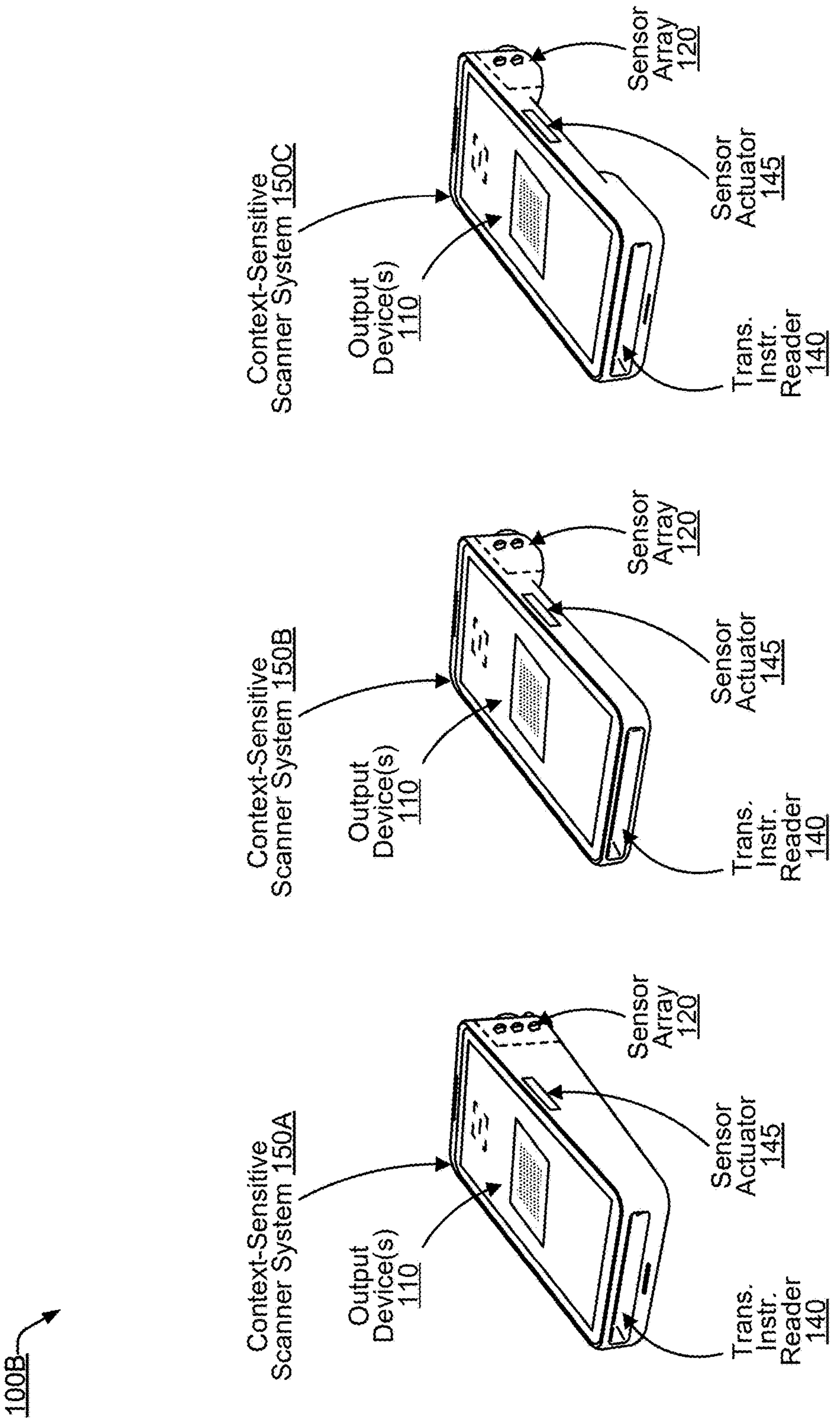
FIG. 1B is a perspective diagram illustrating examples of the context-sensitive scanner system, in accordance with some examples.

FIG. 1B is a perspective diagram illustrating examples 100B of the context-sensitive scanner system 105. In particular, the context-sensitive scanner systems 150A-150C of FIG. 1B are examples of the context-sensitive scanner system 105, and vice versa. The context-sensitive scanner system 150A includes a housing with a wedge shape. In some examples, the wedge shape of the context-sensitive scanner system 150A can be advantageous because it includes more internal space, for instance allowing the context-sensitive scanner system 150A to include a larger battery (and therefore a longer battery life), more input device(s) (e.g., sensor(s) and/or communication interface(s)), and/or more output device(s) (e.g., output device(s) 110 and/or communication interface(s)) than the context-sensitive scanner system 150B and/or the context-sensitive scanner system 150C. The angle of the wedge can help direct certain output device(s) 110 (e.g., a display such as the display that is illustrated on the context-sensitive scanner system 150A) to be directed toward a user while the context-sensitive scanner system 150A is resting on a surface (e.g., a tabletop or countertop).

The context-sensitive scanner system 150B includes a housing with a thinner rectangular area and a thicker area (e.g., which may be referred to as a bump or cap) in a distal portion of the context-sensitive scanner system 150B that includes the sensor array 120. In some examples, the context-sensitive scanner system 150B is thinner, lighter, and/or smaller than the context-sensitive scanner system 150A. Furthermore, when the context-sensitive scanner system 150B is set down on a surface (e.g., a tabletop or countertop), the context-sensitive scanner system 150B can rest on the surface at an angle due to the difference in height between the rear of the thinner rectangular portion and the thicker area with the sensor array 120, forming a natural gap between the context-sensitive scanner system 150B and the surface that can help make the context-sensitive scanner system 150B easier for the user to pick up from the surface or set down onto the surface. The angle can also help direct certain output device(s) 110 (e.g., a display such as the display that is illustrated on the context-sensitive scanner system 150B) to be directed toward a user while the context-sensitive scanner system 150B is resting on a surface (e.g., a tabletop or countertop).

The context-sensitive scanner system 150C includes a housing with a thinner rectangular area, a distal thicker area that includes the sensor array 120, and an anterior thicker area that includes the transaction instrument reader 140. In some examples, the context-sensitive scanner system 150C is thinner, lighter, and/or smaller than the context-sensitive scanner system 150A. In some examples, the context-sensitive scanner system 150C can have more space for certain components associated with the transaction instrument reader 140 (and/or for a battery, input device(s), and/or output device(s)) than the context-sensitive scanner system 150B. Furthermore, when the context-sensitive scanner system 150C is set down on a surface (e.g., a tabletop or countertop), the context-sensitive scanner system 150C can bridge over a portion of the surface due to the difference in height between the thinner rectangular portion and the two (distal and anterior) thicker areas (e.g., the distal thicker area with the sensor array 120, the anterior thicker area with the transaction instrument reader 140), forming a natural gap between the context-sensitive scanner system 150C and the surface that can help make the context-sensitive scanner system 150C easier for the user to pick up from the surface or set down onto the surface. In some examples, the relative thickness of the two (distal and anterior) thicker areas (e.g., the distal thicker area with the sensor array 120, the anterior thicker area with the transaction instrument reader 140) can differ, for instance with the distal thicker area (with the sensor array 120) being thicker than the anterior thicker area (with the transaction instrument reader 140) so that the context-sensitive scanner system 150C can rest on the surface at an angle that can also help direct certain output device(s) 110 (e.g., a display such as the display that is illustrated on the context-sensitive scanner system 150C) to be directed toward a user while the context-sensitive scanner system 150C is resting on a surface (e.g., a tabletop or countertop).

Figure 2:
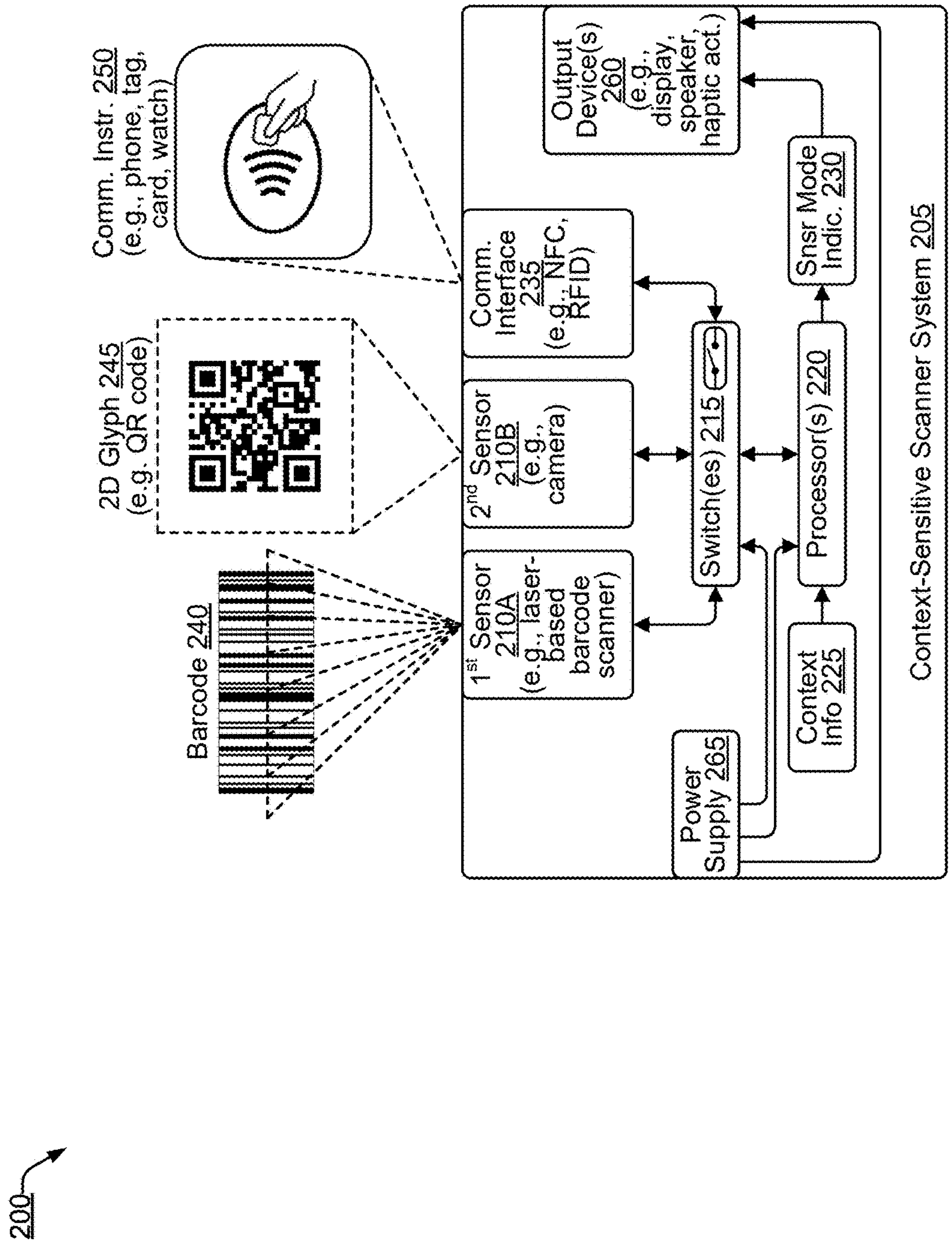
FIG. 2 is a block diagram illustrating a context-sensitive scanner system that controls and/or indicates usability of a first sensor, a second sensor, and a communication interface, in accordance with some examples.

FIG. 2 is a block diagram 200 illustrating a context-sensitive scanner system 205 that controls and/or indicates usability of a first sensor 210A, a second sensor 210B, and a communication interface 235. The context-sensitive scanner system 205 is an example of the context-sensitive scanner system 105 and/or the context-sensitive scanner systems 150A-150C, or vice versa. The first sensor 210A, the second sensor 210B, and/or the communication interface 235 are examples of sensor(s) and/or communication interface(s) that can be included in the sensor array 120 of the context-sensitive scanner system 105.

The context-sensitive scanner system 205 includes one or more processor(s) 220 that can execute instructions stored in memory (e.g., in at least one non-transitory computer-readable storage medium). The processor(s) 220 can be powered by a power supply 265 (e.g., battery and/or connection to power outlet). The instructions can be associated with a software application, and execution of the instructions by the processor(s) 220 can run the application on the context-sensitive scanner system 205. The processor(s) 220 of the context-sensitive scanner system 205 can receive context information 225. The processor(s) 220 of the context-sensitive scanner system 205 can determine, based on the context information 225, whether to modify any switch(es) 215 to enable or disable the any of the first sensor 210A, the second sensor 210B, and/or the communication interface 235.

The processor(s) 220 of the context-sensitive scanner system 205 can determine, based on the context information 225, whether to output a sensor mode indicator(s) 230 (e.g., sensor mode indicator(s) 115) via output device(s) 260 (e.g., output device(s) 110) of the context-sensitive scanner system 205. For instance, the processor(s) 220 of the context-sensitive scanner system 205 can determine, based on the context information 225, whether to output a sensor usability indicator, and/or a sensor non-usability indicator, for each of the first sensor 210A, the second sensor 210B, and/or the communication interface 235. In some examples, for instance, the sensor mode indicator(s) 230 can separately indicate usability or non-usability of different sensor(s) and/or communication interface(s) (e.g., the first sensor 210A, the second sensor 210B, and/or the communication interface 235). In some examples, for instance, the sensor mode indicator(s) 230 can indicate usability or non-usability of a group of sensor(s) and/or communication interface(s) (e.g., two or more of the first sensor 210A, the second sensor 210B, and/or the communication interface 235). In some examples, the sensor mode indicator(s) 230 can indicate usability of one or more of the sensor(s) and/or communication interface(s) by outputting one or more sensor usability indicators, and/or by not outputting one or more sensor non-usability indicators. In some examples, the sensor mode indicator(s) 230 can indicate non-usability of one or more of the sensor(s) and/or communication interface(s) by outputting one or more sensor non-usability indicators, and/or by not outputting one or more sensor usability indicators. The output device(s) 260 can be powered by a power supply 265 (e.g., battery and/or connection to power outlet).

In some examples, the processor(s) 220 of the context-sensitive scanner system 205 can determine, based on the context information 225, whether to automatically activate any of the first sensor 210A, the second sensor 210B, and/or the communication interface 235. In the example illustrated in FIG. 2, the first sensor 210A is a barcode scanner that can scan a barcode 240, the second sensor 210B is a camera that can scan a 2D glyph 245 (e.g., a QR code), and the communication interface 235 is a NFC reader that can read from a communication instrument 250 (e.g., a NFC tag, a phone, a watch, or some other short-range wireless communication transmitter and/or instrument).

The context information 225 can include, for instance, an operation and/or function to be performed using the application (e.g., using a specific UI or mode of the application), a type of input to be provided to an application running on a context-sensitive scanner system, a location (e.g., data field) for receiving input to an application running on a context-sensitive scanner system, a current mode of the application running on the context-sensitive scanner system, a current mode of the context-sensitive scanner system itself, a current UI being displayed by the context-sensitive scanner system, a selection to be made in a user interface (e.g., from a dropdown, a set of radio buttons, a set of checkboxes, or other set of option), another application stored and/or installed on the context-sensitive scanner system, another application running (e.g., in the background or in the foreground) on the context-sensitive scanner system, a location of the context-sensitive scanner system 205, sensor data from the first sensor 210A (e.g., the barcode 240 scanned by the barcode scanner), sensor data from the second sensor 210B (e.g., the 2D glyph 245 scanned by the camera and/or or any objects detected and/or recognized in image(s) captured by the camera), communicated information received by the communication interface 235 (e.g., received from the communication instrument 250), audio data received via another sensor (e.g., microphone) of the context-sensitive scanner system 205, proximity data received via another sensor (e.g., proximity detector) of the context-sensitive scanner system 205, depth data received via another sensor (e.g., depth sensor) of the context-sensitive scanner system 205, a pose (e.g., location and/or orientation) of the context-sensitive scanner system 205, an identity of a user (e.g., user 135) of the context-sensitive scanner system 205, a time, a date, or a combination thereof. The pose of the context-sensitive scanner system 205 can refer to the location (e.g., latitude, longitude, and/or elevation) of the context-sensitive scanner system 205, the orientation (e.g., pitch, yaw, and/or roll) of the context-sensitive scanner system 205, an inventory amount, an inventory trend, a sales trend, an inventory prediction (e.g., based on an inventory trend and/or an ML model), a sales prediction (e.g., based on a sales trend and/or an ML model), a type of payment data, a transaction history associated with a user, a transaction history associated with a merchant, a transaction history associated with an object (e.g., a product or service associated with an optical glyph 125), or a combination thereof.

For instance, in some examples, if the application is in a specific mode or on a specific UI in which sensor(s) and/or communication interface(s) are to be usable (e.g., a mode or UI in which the user is to use the context-sensitive scanner system 205 to add items to a cart to be purchased in a transaction), the processor(s) 220 can set the switch(es) 215 to be activated and/or enabled, for instance causing the switch(es) 215 to physically and/or electrically couple (e.g., connect) the sensor(s) and/or communication interface(s) to a power supply 265 (e.g., a battery and/or connection to a power outlet) and/or to the processor(s) 220, and can set the output device(s) 260 to output sensor usability indicator(s) (of the sensor mode indicator(s) 230). In some examples, if the application is in a specific mode or on a specific UI in which sensor(s) and/or communication interface(s) are not to be usable (e.g., a mode or UI that shows sales analytics or some other data that does not require further input(s)), the processor(s) 220 can set the switch(es) 215 to be deactivated and/or disabled, for instance causing the switch(es) 215 to physically and/or electrically decouple (e.g., disconnect) the sensor(s) and/or communication interface(s) from the power supply 265 and/or from the processor(s) 220, and can set the output device(s) 260 to not output sensor usability indicator(s) (of the sensor mode indicator(s) 230), and/or to output sensor non-usability indicator(s) (of the sensor mode indicator(s) 230).

In some examples, the processor(s) 220 of the context-sensitive scanner system 205 can determine, based on the context information 225 (e.g., based on pose information from one or more pose sensor(s) of the context-sensitive scanner system 205), that the context-sensitive scanner system 205 is being held at a specific angle or range of angles associated with barcode scanning, in which case the processor(s) 220 can set the switch(es) 215 so that the first sensor 210A (the barcode scanner) is activated and/or enabled, for instance causing the switch(es) 215 to physically and/or electrically couple (e.g., connect) the first sensor 210A (the barcode scanner) to a power supply 265 and/or to the processor(s) 220. The context-sensitive scanner system 205 being held at the specific angle or range of angles associated with barcode scanning can also cause the context-sensitive scanner system 205 to output sensor usability indicator(s) (of the sensor mode indicator(s) 230) that indicate that the first sensor 210A (the barcode scanner) is usable during this time period.

Figure 3:
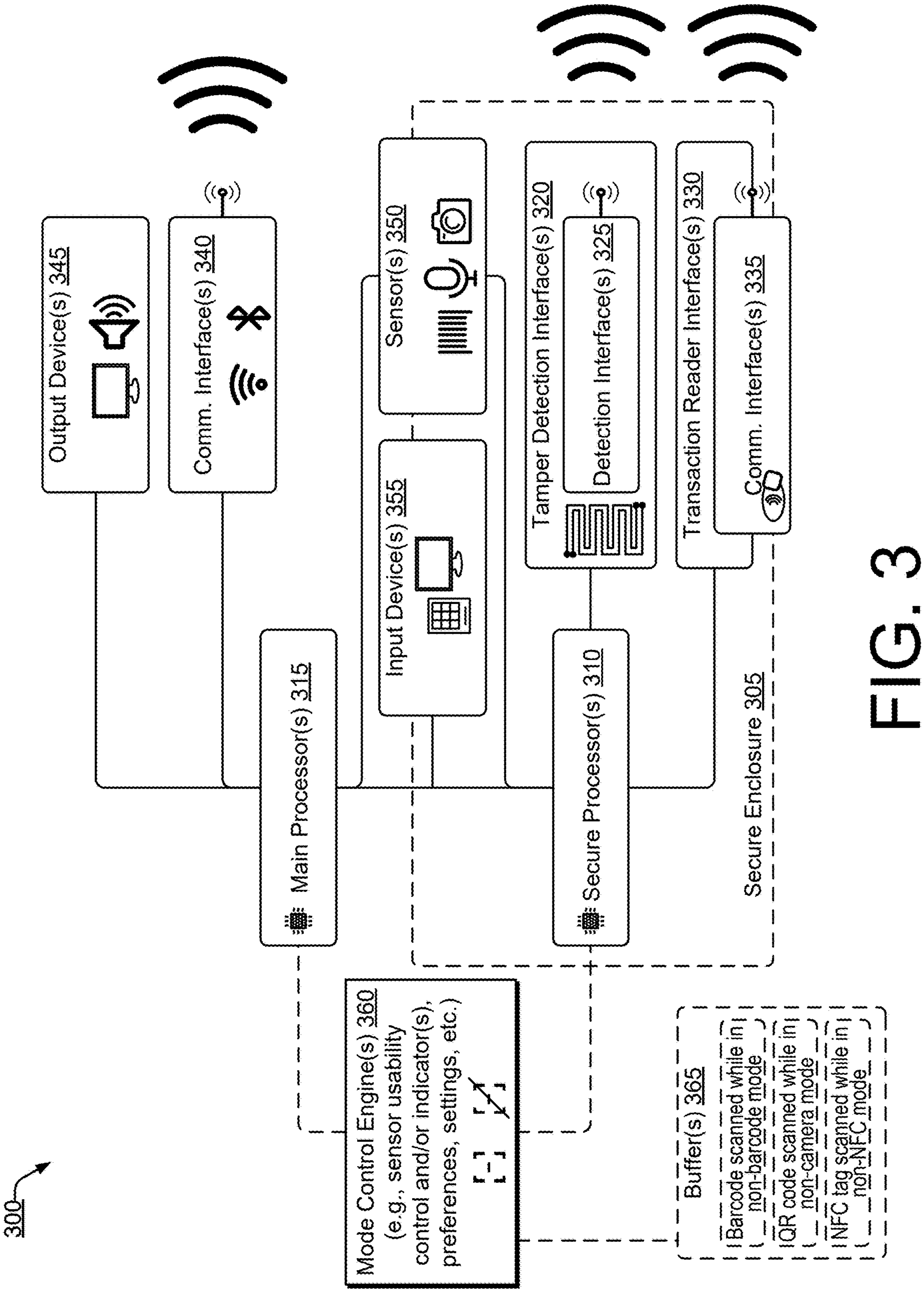
FIG. 3 is a block diagram illustrating an architecture of a context-sensitive scanner system, in accordance with some examples.

FIG. 3 is a block diagram illustrating an architecture of a context-sensitive scanner system 300. The context-sensitive scanner system 300 can be an example of the context-sensitive scanner system 105 and/or the context-sensitive scanner system 205, or vice versa. The context-sensitive scanner system 300 includes one or more main processor(s) 315 and one or more secure processor(s) 310. The processor(s) 220 can include the main processor(s) 315 and/or the secure processor(s) 310, or vice versa. The secure processor(s) 310 are inside a secure enclosure 305, while the main processor(s) 315 are outside of the secure enclosure 305. The secure enclosure 305 may be protected by tamper detection interface(s) 320 that can detect attempt(s) to tamper with the context-sensitive scanner system 300 (e.g., attempt(s) to tamper with the secure enclosure 305 and/or anything within the secure enclosure 305). The secure processor(s) 310 can deal with sensitive information, such as transaction information (e.g., payment information), encryption keys, and the like. In some examples, the tamper detection interface(s) 320 can include conductive tamper traces that run across surface(s) of the secure enclosure 305 and that maintain specific voltages unless tampered with, along with voltage sensors that can detect changes in those voltages caused by a tamper attempt. In some examples, the two or more tamper traces can conduct different voltages than one another, and can be positioned close to one another, so that a tamper attempt is likely to bridge the two tamper traces and change the voltages of one or both tamper traces, or to break one or both tamper traces and open the circuit, also changing the voltages of one or both tamper traces. In some examples, the tamper traces can run along the surface(s) of the secure enclosure 305 in a specific pattern, such as a boustrophedonic pattern, a zig-zag pattern, or a combination thereof.

In some examples, the tamper detection interface(s) 320 include detection interface(s) 325, which include sensor(s) and/or wireless communication interface(s) that are sensitive to capacitance, inductance, and/or incidence within a detection range around the context-sensitive scanner system 300 (e.g., within the detection range around the detection interface(s) 325). These detection interface(s) 325 can be used to implement a "virtual cage" around the context-sensitive scanner system 105 or portions there, for instance to detect a probe or other tool of a malicious party who might attempt to tamper with the context-sensitive scanner system 300 or a portion thereof. In some examples, these detection interface(s) 325 can also be sensitive to capacitance, inductance, and/or incidence of a transaction instrument, and thus, signal(s) and/or sensor data from the detection interface(s) 325 can be analyzed by the secure processor(s) 310 to detect presence, type, and/or pose of the transaction instrument, for instance as a proximity sensor.

The secure enclosure 305 of the context-sensitive scanner system 300 also includes transaction reader interface(s) 330, including communication interface(s) 335 for reading transaction information over short-range wireless signal(s) received from a transaction instrument. The transaction reader interface(s) 330 can be examples of the transaction instrument reader(s) 140, or vice versa. The transaction reader interface(s) 330 can also be referred to as transaction reader(s), transaction instrument reader(s), transaction instrument reader interface(s), payment reader interface(s), payment reader(s), payment instrument reader(s), payment instrument reader interface(s). Examples of the communication interface(s) 335 can include the transaction instrument reader(s) 140, the communication interface(s) 235, load-modulation communication interface(s), I/Q modulation communication interface(s), NFC communication interface(s), RFID communication interface(s), short-range wireless communication interface(s), or combination(s) thereof. In some examples, the transaction reader interface(s) 330 can also include magnetic stripe readers, integrated circuit (IC) chip readers such as Europay/Mastercard/Visa (EMV) chip reader, and/or other types of transaction reader interface(s) 330. In some examples, at least a subset of the communication interface(s) 335 can be separate from the transaction reader interface(s) 330, for instance to be used for reading NFC transmitters (e.g., NFC tags) and/or RFID transmitters (e.g., RFID tags) associated with objects (e.g., products or services to be purchased) rather than transaction instruments. In some examples, some such communication interface(s) 335 can be outside of the secure enclosure 305.

The context-sensitive scanner system 300 also includes communication interface(s) 340 for Wi-Fi, WLAN, Bluetooth®, PAN, cellular network(s), and/or other types of wireless communication(s). In some examples, the communication interface(s) 210C of the context-sensitive scanner system 205 include one or more of the communication interface(s) 340.

The context-sensitive scanner system 300 also includes sensor(s) 350, such as camera(s), IR sensors, depth sensors, positioning receivers, pose sensors, microphones, barcode readers, and/or other types of sensors discussed herein. Examples of the sensor(s) 350 include the sensors of the sensor array 120, the first sensor 210A, the second sensor 210B, and in some examples the communication interface(s) 235. In some examples, at least a subset of the sensor(s) 350 is within the secure enclosure 305 and managed by the secure processor(s) 310. In some examples, at least a subset of the sensor(s) 350 is outside of the secure enclosure 305 and managed by the main processor(s) 315.

In some examples, the context-sensitive scanner system 300 can use sensor data from the sensor(s) 350 to detect the transaction instrument, for instance using object detection and/or object recognition. In some examples, the communication interface(s) 210C of the context-sensitive scanner system 205 include one or more of the sensor(s) 350.

The context-sensitive scanner system 300 also includes output device(s) 345, such as display screen(s), speaker(s), haptic actuator(s), or a combination thereof. The context-sensitive scanner system 300 uses the output device(s) 345 to output user interface(s), such as alerts, notification(s), and/or other user interface(s) associated with any of the actions 130. Examples of the user interfaces include the UI 415, the UI 425, the UI 515, the UI 615, the UI 715, the UI 815, and/or the UI 825, and/or other user interfaces illustrated and/or discussed herein. In some examples, the output device(s) 345 can include wireless communication interface(s) such as the wireless communication interface(s) 340, which the context-sensitive scanner system 300 can use to generate and/or transmit user interface(s) to the output device(s) 345 (e.g., screen(s), speaker(s), haptic actuator(s), or a combination thereof) to output. In some examples, the main processor(s) 315 are responsible for outputting content via the output device(s) 345. In some examples, the secure processor(s) 310 are responsible for outputting content via the output device(s) 345.

The context-sensitive scanner system 300 also includes input device(s) 355, such as keypads, trackpads, buttons, knobs, sliders, touch-sensitive surface(s) of a touchscreen display screen, or a combination thereof. In some examples, certain input device(s) of the input device(s) 355 are controlled by the main processor(s) 315, while certain input device(s) of the input device(s) 355 are controlled by the secure processor(s) 310. For instance, the secure processor(s) 310 can receive and handle input(s) from any of the input device(s) 355 that are used to input sensitive information, such as a user's personal identification number (PIN) or signature. The main processor(s) 315 can receive and handle input(s) from any of the input device(s) 355 that are used to input non-sensitive information.

In some examples, a transaction instrument or other device discussed herein can also include at least a subset of the components discussed as being part of the context-sensitive scanner system 300. In some examples, a transaction instrument or other device discussed herein can also perform at least a subset of the functionality discussed as being part of the context-sensitive scanner system 300.

The operations discussed herein as performed by the context-sensitive scanner system 105, the context-sensitive scanner systems 150A-150C, the context-sensitive scanner system 205, and/or the processor(s) 220 can be performed by the secure processor(s) 310, the main processor(s) 315, or a combination thereof. For instance, the context-sensitive scanner system 300 may include mode control engine(s) 360 that are controlled by the secure processor(s) 310, the main processor(s) 315, or a combination thereof. The mode control engine(s) 360 can receive context data (e.g., context information 225), determine which of the sensor(s) 350, communication interface(s) 340, and/or communication interface(s) 335 to activate or deactivate based on the context data, set switch(es) (e.g., switch(es) 215) to couple or decouple certain sensor(s) and/or communication interface(s) to or from power and/or processor(s), and/or control whether sensor mode indicator(s) (e.g., sensor mode indicator(s) 115, sensor mode indicator(s) 230, sensor usability indicator(s), and/or sensor non-usability indicator(s)) are output by output device(s) of the context-sensitive scanner system 300, or a combination thereof.

Note that while the communication interface(s) 340, the output device(s) 345, and the sensor(s) 350 are illustrated outside of the secure enclosure 305, in some examples at least some of these elements are also in the secure enclosure 305 of the context-sensitive scanner system 300.

In some examples, the context-sensitive scanner system 300 includes one or more buffer(s) 365 that can be controlled, written to, and/or read from by the mode control engine(s) 360. For instance, if a specific sensor or communication interface is activated and receives data (e.g., sensor data and/or transmitted data) during a time period in which the specific sensor or communication interface was intended to be non-usable, the context-sensitive scanner system 300 can write the received data to the buffer(s) 365. The next time the context-sensitive scanner system 300 enters a mode in which the specific sensor or communication interface is intended to be usable, the context-sensitive scanner system 300 can read the received data from the buffer(s) 365 and use the data read from the buffer(s) 365 as if the data had been received from the specific sensor or communication interface. In some examples, context-sensitive scanner system 300 can include privacy and/or security protections that prevent certain types of data (e.g., transaction instrument information read from a transaction instrument, personal identifying information (PII) of a persons) from being written to the buffer(s) 365 (e.g., for longer than a predetermined amount of time, or at all). However, such privacy and/or security protections need not apply to other types of information, such as SKUs or other object information related to an object (e.g., to a product or service).

In an illustrative example if a barcode scanner (of the sensor(s) 350) is activated and scans a barcode for a specific product (e.g., an apple) to read the SKU for the specific product while the context-sensitive scanner system 300 is in a first mode in which the barcode scanner is not intended to be usable, the context-sensitive scanner system 300 can store the SKU for the specific product (as read from the barcode by the barcode reader) in the buffer(s) 365. If, later, the context-sensitive scanner system 300 enters a second mode in which products are to be scanned to be added to a cart or tab for a transaction, the SKU for the specific product (e.g., the apple) can be retrieved from the buffer(s) 365 and added to the cart or tab for the transaction. In some examples, the context-sensitive scanner system 300 can add information to the buffer(s) 365 that is read from a barcode by a barcode scanner (of the sensor(s) 350), that is read from a 2D matrix barcode (e.g., QR code) by a camera (of the sensor(s) 350), and/or that is received from a short-range wireless transmitter (e.g., a RFID tag or NFC tag) by a short-range wireless communication interface (e.g., of the communication interface(s) 335, the communication interface(s) 340, and/or the sensor(s) 350).

Figure 4:
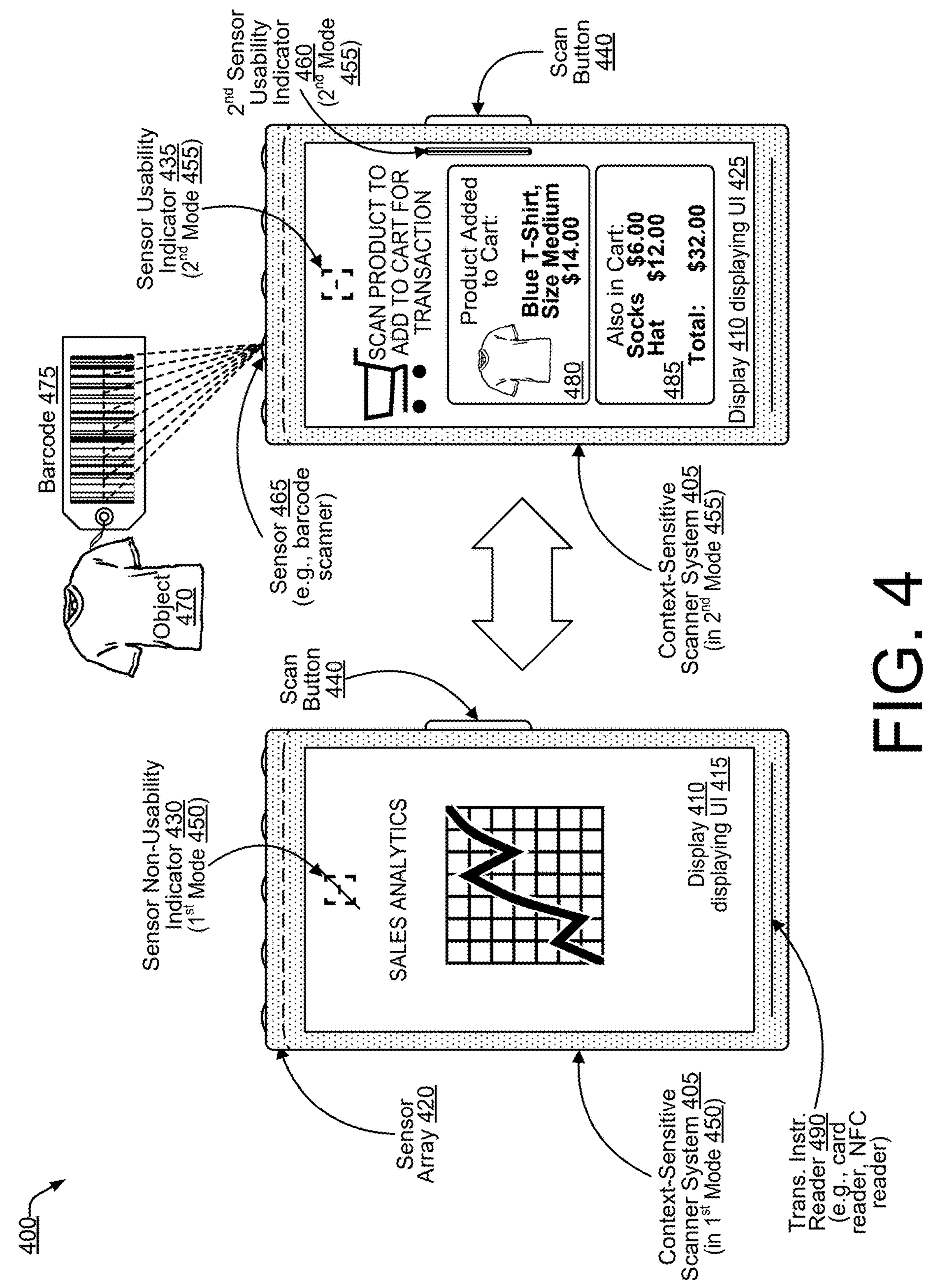
FIG. 4 is a conceptual diagram illustrating a context-sensitive scanner system transitioning between a first mode (in which sensor(s) of a sensor array are not usable) and a second mode (in which the sensor(s) of the sensor array are usable), in accordance with some examples.

FIG. 4 is a conceptual diagram 400 illustrating a context-sensitive scanner system 405 transitioning between a first mode 450 (in which sensor(s) of a sensor array 420 are not usable) and a second mode 455 (in which the sensor(s) of the sensor array 420 are usable). The context-sensitive scanner system 405 can be an example of the context-sensitive scanner system 105, the context-sensitive scanner systems 150A-150C, the context-sensitive scanner system 205, and/or the context-sensitive scanner system 300, or vice versa. The context-sensitive scanner system 405 includes a display 410, which is an example of the output device(s) 110, the output device(s) 260, and/or the output device(s) 345. While the context-sensitive scanner system 405 is in the first mode 450, the display 410 displays a first user interface (UI) 415 that shows sales analytics, for instance for one or more merchant(s), store(s), customer(s), or combination thereof. The context-sensitive scanner system 405 includes a scan button 440, which can be an example of the sensor actuator 145 of the context-sensitive scanner system 105. A portion of the context-sensitive scanner system 405 that is outlined using dashed lines represents the sensor array 420, which can be an example of the sensor array 120, a sensor array that includes the sensor(s) and/or communication interface(s) of FIG. 2 (e.g., first sensor 210A, second sensor 210B, and/or communication interface 235), the communication interface(s) 335, the communication interface(s) 340, the sensor(s) 350, or a combination thereof. The sensor array 420 is illustrated as having several shapes (e.g., rounded lenses and/or associated sensor(s)) coupled to the sensor array 420. In some examples, each of these shapes can represent an exemplary sensor and/or communication interface of the sensor array 420. For instance, the sensor array 420 includes a sensor 465, which can be a barcode scanner, a camera, or another type of sensor discussed herein.

While the context-sensitive scanner system 405 is in the first mode 450, the application running on the context-sensitive scanner system 405 has no use for the sensor(s) and/or communication interface(s) of the sensor array 420. For instance, while the context-sensitive scanner system 405 displays the UI 415 showing the sales analytics, there is no clear use case for information that might be scanned from an optical glyph 125, such as a barcode 475. Thus, while the context-sensitive scanner system 405 is in the first mode 450, the UI 415 displays a sensor non-usability indicator 430 associated with the first mode 450. The sensor non-usability indicator 430 indicates to a user of the context-sensitive scanner system 405 that at least a subset of the sensor(s) and/or communication interface(s) of the sensor array 420 are not usable by the application running on the context-sensitive scanner system 405 while the context-sensitive scanner system 405 (e.g., while the application) is in the first mode 450. Similarly, while the context-sensitive scanner system 405 is in the first mode 450, the UI 415 does not display a sensor usability indicator (e.g., sensor usability indicator 435). Thus, while the context-sensitive scanner system 405 is in the first mode 450, an interaction with the scan button 440 (e.g., pressing the scan button 440) does not activate sensor(s) and/or communication interface(s) of the sensor array 420. In some cases, while the context-sensitive scanner system 405 is in the first mode 450, an interaction with the scan button 440 (e.g., pressing the scan button 440) does nothing. In some cases, while the context-sensitive scanner system 405 is in the first mode 450, an interaction with the scan button 440 (e.g., pressing the scan button 440) causes the UI 415 to display an error or warning, for instance causing the sensor non-usability indicator 430 to flash, change size, change color, move, or otherwise become more prominent within the UI 415.

The context-sensitive scanner system 405 can transition between the first mode 450 and a second mode 455. In the second mode 455, the display 410 displays a UI 425 that requests the user to scan products to add them to the user's cart for a transaction. While the context-sensitive scanner system 405 is in the second mode 455, at least a subset of the sensor(s) and/or communication interface(s) of the sensor array 420 are usable, for instance for the purpose of scanning optical glyph(s) associated with products to be added to the cart of the user for the transaction. While the context-sensitive scanner system 405 is in the second mode 455, the UI 425 displays the sensor usability indicator 435 indicating that at least subset of the sensor(s) and/or communication interface(s) of the sensor array 420 are usable in the second mode 455. While the context-sensitive scanner system 405 is in the second mode 455, the UI 425 also displays a second sensor usability indicator 460 that is displayed adjacent to the scan button 440, parallel to the scan button 440, within a threshold distance of the scan button 440, and/or along the length of the scan button 440. The second sensor usability indicator 460 can therefore serve as a context cue for the user to press the scan button 440. In some cases, while the context-sensitive scanner system 405 is in the second mode 455, an interaction with the scan button 440 (e.g., a press of the scan button 440) causes the context-sensitive scanner system 405 to activate at least a subset of the sensor(s) and/or communication interface(s) of the sensor array 420. For instance, activation of a sensor 465 is illustrated. The sensor 465 is illustrated as a laser-based barcode scanner emitting a laser across a barcode 475 associated with an object 470. The object 470 is illustrated as a t-shirt, and the barcode 475 is coupled to the object 470 by being on a tag coupled to the t-shirt. In response to scanning the barcode 475 using the sensor 465, the UI 425 is updated with a box 480 that indicates that the object 470 was added to the user's cart for the transaction, and identifies the object 470 as a blue t-shirt with a size of medium and a price of $14.00. Another box 485 indicates that other items in the cart include socks that cost $6.00 and a hat that costs $12.00, for a total of $32.00 for all three items.

In some examples, the scan button 440 (or another sensor actuator 145) can be context-sensitive as to which sensor(s) and/or communication interface(s) of the sensor array 420 the scan button 440 activates. For instance, if the second mode 455 and/or UI 425 expects the barcode 475 (or barcodes and/or optical glyphs in general) as an input, the scan button 440 can specifically trigger activation of the sensor 465 because the sensor 465 is capable of scanning the barcode 475 (or barcodes and/or optical glyphs in general), for instance because the sensor 465 is a barcode scanner, a camera, or another optical sensor. In some examples, the scan button 440 (or another sensor actuator 145) can be reprogrammed and/or customized at the context-sensitive scanner system 405 based on user preferences. For instance, in some examples, the scan button 440 (or another sensor actuator 145) can be reprogrammed and/or customized to activate a specific operation or function of the context-sensitive scanner system 405 and/or the application running on the context-sensitive scanner system 405. In an illustrative example, the scan button 440 (or another sensor actuator 145) can be reprogrammed and/or customized to transition the context-sensitive scanner system 405 between the first mode 450 and the second mode 455.

The context-sensitive scanner system 405 is also illustrated as including at least one transaction instrument reader 490. The transaction instrument reader 490 may be an example of the transaction instrument reader 140 and/or transaction reader interface(s) 330, or vice versa. The transaction instrument reader 490 is illustrated as a card slot for receiving and/or reading a transaction card. In some examples, the transaction instrument reader 490 of the context-sensitive scanner system 405 can include a magnetic stripe reader, an IC chip reader, an NFC interface, and/or any other type of transaction instrument reader discussed herein.

Figure 5:
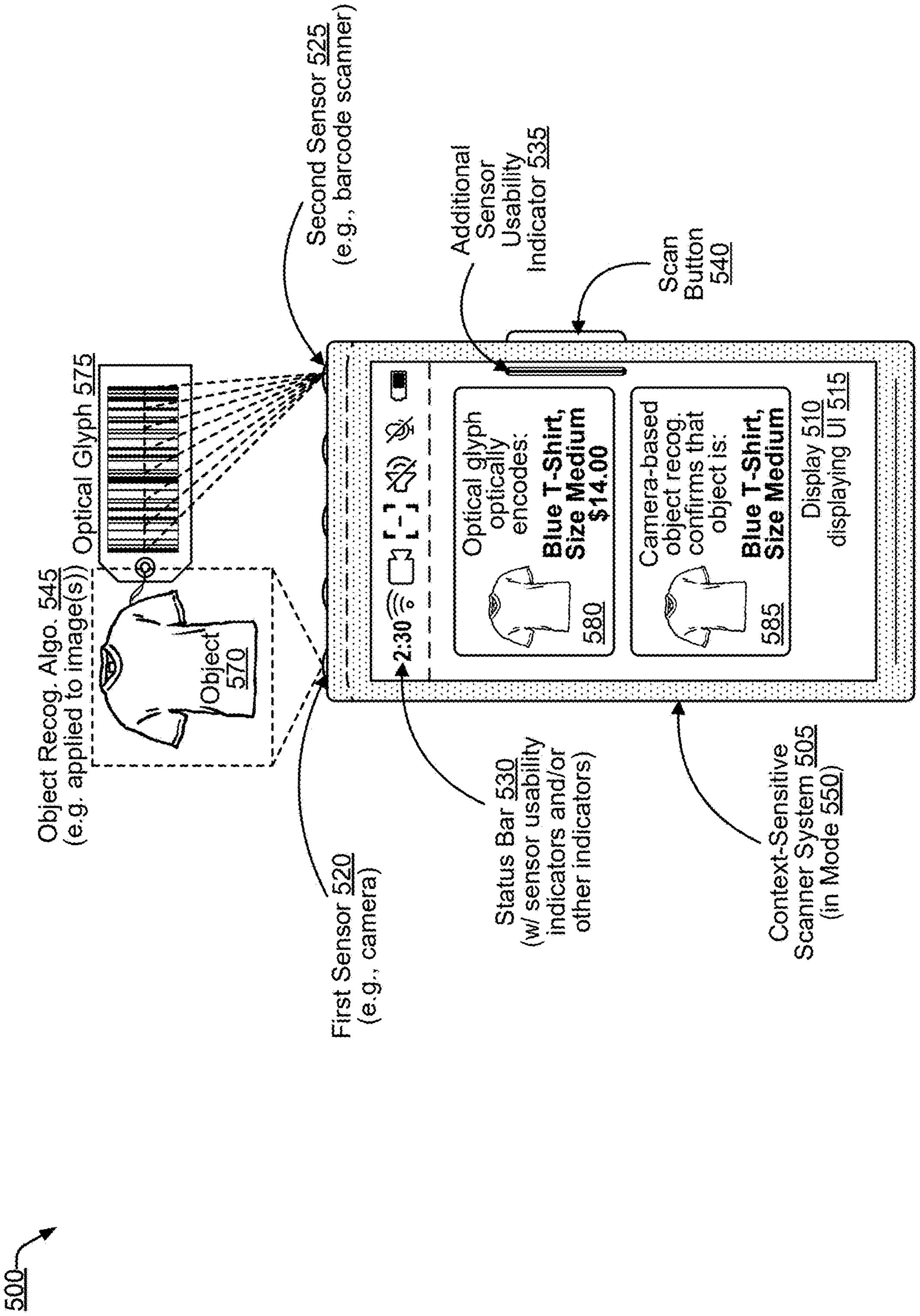
FIG. 5 is a conceptual diagram illustrating a context-sensitive scanner system verifying that object information decoded from an optical glyph matches visual characteristic(s) of an object corresponding to the barcode using an object recognition algorithm, in accordance with some examples.

FIG. 5 is a conceptual diagram 500 illustrating a context-sensitive scanner system 505 verifying that object information decoded from an optical glyph 575 matches visual characteristic(s) of an object 570 corresponding to the barcode using an object recognition algorithm 545. The context-sensitive scanner system 505 can be an example of the context-sensitive scanner system 105, the context-sensitive scanner systems 150A-150C, the context-sensitive scanner system 205, and/or the context-sensitive scanner system 300, and/or the context-sensitive scanner system 405, or vice versa. The context-sensitive scanner system 505 includes a display 510, which is an example of the output device(s) 110, the output device(s) 260, the output device(s) 345, and/or the display 410, or vice versa. The display 510 displays a UI 515. The UI 515 may be associated with a mode 550 that the context-sensitive scanner system 505 (and/or the application running on the context-sensitive scanner system 505) is in.

The UI 515 includes a status bar 530 that includes various sensor usability indicators (e.g., sensor mode indicator(s) 115, sensor mode indicator(s) 230) and/or other status indicators For instance, from left to right as illustrated in FIG. 5, the status bar 530 includes a clock (indicating a time of 2:30), a Wi-Fi indicator (e.g., indicating that the context-sensitive scanner system 505 is connected to a Wi-Fi network and/or indicating a connection strength of the Wi-Fi connection), a first sensor usability for a first sensor 520 (e.g., camera), a second sensor usability for a second sensor 525 (e.g., barcode scanner), a first mute indicator indicating that an output device (e.g., speaker) is muted, a second mute indicator indicating that an input device (e.g., microphone) is muted, and a battery indicator indicating a charge level of a battery (e.g., power supply). The sensor usability indicators in the status bar 530 indicate that the first sensor first sensor 520 and the second sensor 525 are both usable in the mode 550 and/or while the UI 515 is displayed.

The UI 515 also includes an additional sensor usability indicator 535 that, like the second sensor usability indicator 460 of the UI 425, is displayed adjacent to the scan button 540 of the context-sensitive scanner system 505, parallel to the scan button 540, within a threshold distance of the scan button 540, and/or along the length of the scan button 540. In some examples, a color and/or size of the additional sensor usability indicator 535 can be set to convey how important or urgent usage of the sensor(s) is. For instance, the additional sensor usability indicator 535 can be grey and/or thin if usage of the sensor(s) is not important or urgent to the mode 550 and/or the UI 515, but can be colorful (e.g., red, green, blue) and/or thick if usage of the sensor(s) is important and/or urgent to the mode 550 and/or the UI 515. In some examples, the usability indicator can be designed and/or presented so as to not disrupt the UI. In some examples, the usability indicator can be designed and/or presented so as to call attention to the actuator and/or functionality in the UI and/or can be designed. In some examples, the usability indicator can be designed and/or presented to substantially align with the actuator, thereby easily signaling to the user where the actuator is located. This is particularly helpful on user interfaces with limited space and/or small form devices.

In some examples, interaction with the scan button 540 can cause activation of the first sensor 520 and/or the second sensor 525. The second sensor 525 (e.g., barcode scanner or camera) is used to scan an optical glyph 575, such as a barcode or a 2D matrix barcode (e.g., QR code). The optical glyph 575 is coupled to the object 570, for instance with the optical glyph 575 appearing on a tag that is coupled to the object 570. The context-sensitive scanner system 505 decodes object information about the object 570 from the optical glyph 575. The object information is optically encoded in the optical glyph 575. The UI 515 includes a box 580 that indicates that the object information decoded from the optical glyph 575 (as scanned using the second sensor 525) indicates that the object 570 is a blue t-shirt with a size of medium and a price of $14.00.

The first sensor 520 (e.g., camera) is used to capture image(s) of a scene that includes the object 570 and/or the optical glyph 575. The context-sensitive scanner system 505 applies the object recognition algorithm 545 to the image(s) to extract feature(s) of the object 570, detect and/or recognize the object 570 within the image (e.g., based on comparison(s) of the representation of the object 570 in the image(s) to stored representation of the object 570 in reference image(s)), track the object, or a combination thereof. In some examples, the object recognition algorithm 545 performs feature extraction, feature detection, feature recognition, feature tracking, object detection, object recognition, object tracking, facial detection, facial recognition, facial tracking, person detection, person recognition, person tracking, semantic segmentation, image classification, simultaneous localization and mapping (SLAM), or a combination thereof. In some examples, the context-sensitive scanner system 505 uses the object recognition algorithm 545 to identify the identity of the object 570, and/or to identify the attribute(s) and/or characteristic(s) of the object 570.

In some examples, such use of the object recognition algorithm 545 can be used for data input (e.g., camera scans and identifies five apples available for sale and/or are to be added to an inventory or a cart for purchase), to verify data being received from the first sensor or another sensor (e.g., camera verifies a shirt indicated as blue is in fact blue), to verify data input via another mechanism (e.g., camera verifies that there are in fact five apples for sale, which corresponds to the manually input indication of five apples for sale), etc. This can improve both the speed and/or efficiency in which some tasks are completed and/or data accuracy. In some examples, such use of the object recognition algorithm 545 can be used to assist another sensor, for insurance by using the camera (e.g., the first sensor 520) and the object recognition algorithm 545 to identify a location of the optical glyph 575, and then aiming or otherwise directing a barcode scanner (e.g., the second sensor 525) toward the optical glyph 575 based on the identification of the location of the optical glyph 575 according to the object recognition algorithm 545. This can improve the speed and/or efficiency with which the optical glyph 575 is scanned and/or read by the context-sensitive scanner system 505

For instance, the UI 515 includes a box 585 that indicates that, according to the object recognition algorithm 545, the object 570 is detected and/or recognized (in the image(s) captured by the first sensor 520) to be a blue T-shirt with a size of medium. Thus, the context-sensitive scanner system 505 can use the first sensor 520 and the object recognition algorithm 545 to confirm whether the object information encoded into the optical glyph 575 (and scanned via the second sensor 525) is accurate or not. In some cases, in response to confirming that the object information encoded into the optical glyph 575 (and scanned via the second sensor 525) is accurate (e.g., matches the object recognized in the image(s) captured using the first sensor 520), the context-sensitive scanner system 505 can add the object 570 to the user's cart for a transaction, as in the second mode 455 and/or the second sensor UI 425 of FIG. 4. In some cases, in response to identifying that the object information encoded into the optical glyph 575 (and scanned via the second sensor 525) is inaccurate (e.g., differs from the object recognized in the image(s) captured using the first sensor 520), the context-sensitive scanner system 505 can output an alert, warning, or notification that the object information optically encoded in the optical glyph 575 appears to correspond to a different object than the object 570.

While the verification process illustrated in FIG. 5 is illustrated as using two separate sensors (e.g., the first sensor 520 and the second sensor 525) in FIG. 5, in some examples, the verification process can be performed using a single sensor. For instance, in some examples, the sensor can be a camera, and the camera can be used both to scan the optical glyph 575 and to capture the image of the scene (including the object 570 and/or the optical glyph 575) to which the context-sensitive scanner system 505 applies the object recognition algorithm 545.

Figure 6:
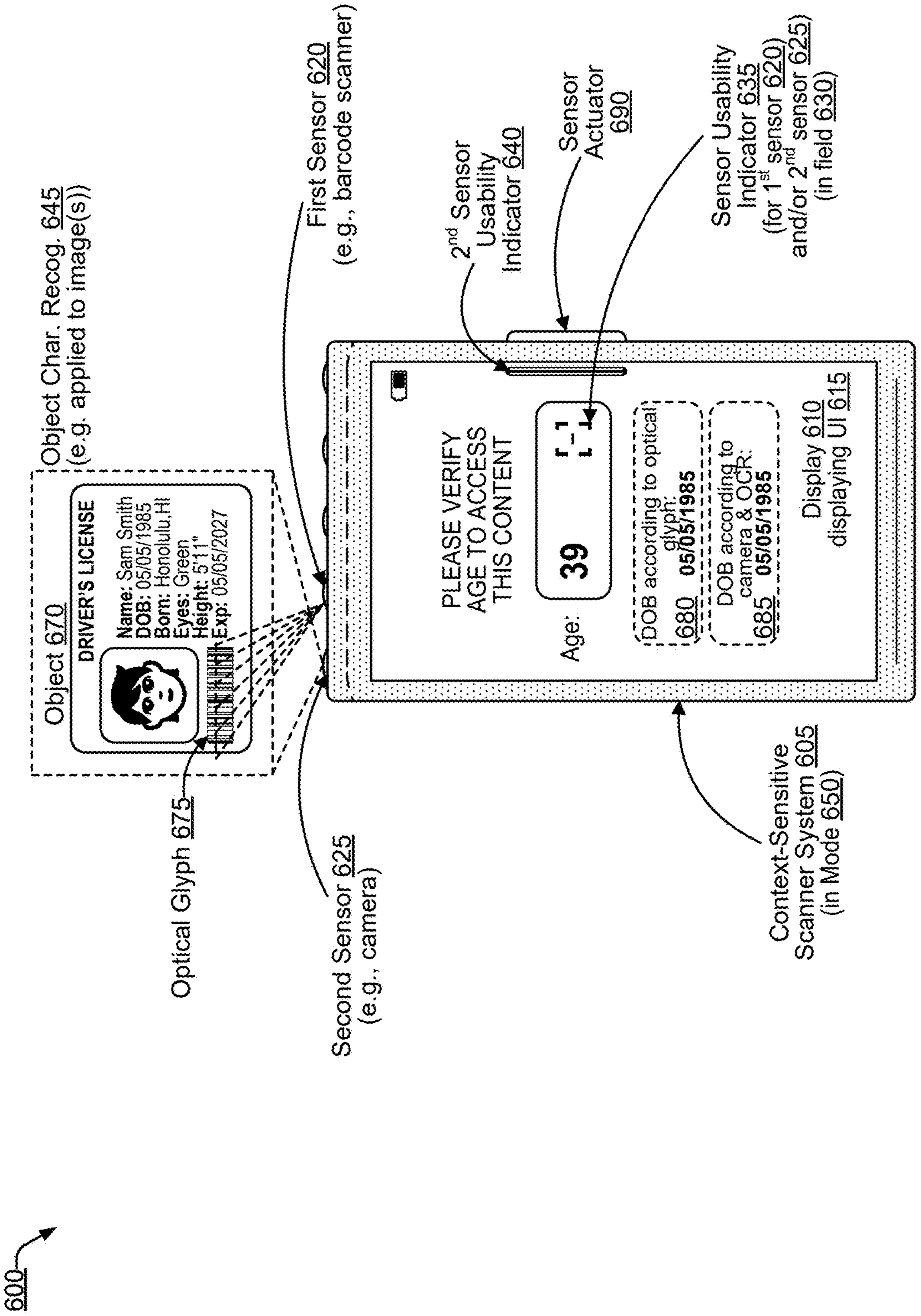
FIG. 6 is a conceptual diagram illustrating a context-sensitive scanner system using sensor information from one or more sensor(s) to fill in a field in a user interface (UI), and verifying that personal information decoded from a barcode matches personal information printed on a document, in accordance with some examples.

FIG. 6 is a conceptual diagram 600 illustrating a context-sensitive scanner system 605 using sensor information from one or more sensor(s) (e.g., first sensor 620, second sensor 625) to fill in a field in a user interface (UI), and verifying that personal information decoded from a barcode matches personal information printed on a document. The context-sensitive scanner system 605 can be an example of the context-sensitive scanner system 105, the context-sensitive scanner systems 150A-150C, the context-sensitive scanner system 205, and/or the context-sensitive scanner system 300, the context-sensitive scanner system 405, and/or the context-sensitive scanner system 505, or vice versa. The context-sensitive scanner system 505 includes a display 610, which is an example of the output device(s) 110, the output device(s) 260, the output device(s) 345, the display 410, and/or the display 510, or vice versa. The display 610 displays a UI 615 (corresponding to a mode 650) that requests verification of a user's age to access a piece of content, such as a website, an article, a payment interface, a transaction interface, a media asset, or even a physical area (e.g., opening of a door or gate can be locked behind age verification and/or identity verification).

In FIG. 6, the object 670 about which object information is being retrieved is a personal identification document of a person, specifically a driver's license of a person (e.g., of the user of the context-sensitive scanner system 605 or of another person). The object 670 (e.g., the driver's license) includes an optical glyph 675 (e.g., a barcode or 2D matrix barcode) that optically encodes personal information of the person. Similarly to the verification process illustrated in FIG. 5, the context-sensitive scanner system 605 performs a verification process by scanning (e.g., using the first sensor 620) the optical glyph 675 that optically encodes the personal information of the user and decoding the personal information of the user from the optical glyph 675, and by capturing (e.g., using the second sensor 625) an image of the object 670 (e.g., the driver's license) and parsing the personal information of the user from the image of the object 670 (e.g., using optical character recognition (OCR) 645). The context-sensitive scanner system 605 can verify that the personal information of the user decoded from the optical glyph 675 (as scanned via the first sensor 620) matches the personal information of the user parsed from the image of the object 670 (as captured via the second sensor 625 and/or parsed via OCR 645). For instance, the UI 615 includes a box 680 that indicates that the person's date of birth according to the optical glyph 675 (as scanned via the first sensor 620) is May 5, 1985. The UI 615 also includes a box 685 that indicates that the person's date of birth according to the image (as captured via the second sensor 625 and parsed via OCR 645) is May 5, 1985.

The UI 615 includes a field 630 for an age of the user. The field 630 includes a sensor usability indicator 635 indicating that the first sensor 620 and/or the second sensor 625 are usable in the mode 650, and are usable specifically to fill in the field 630. The UI 615 also includes a second sensor usability indicator 640 indicating that the first sensor 620 and/or the second sensor 625 are usable in the mode 650. The second sensor usability indicator 640 is similar to the second sensor usability indicator 460 and/or the additional sensor usability indicator 535, in that the second sensor usability indicator 640 is adjacent to a sensor actuator 690. In some examples, interacting with (e.g., touching) the sensor usability indicator 635 and/or interacting with the sensor actuator 690 (near the second sensor usability indicator 640) can cause the context-sensitive scanner system 605 the activate the first sensor 620 and/or the second sensor 625 to scan the optical glyph 675 and/or the object 670 to identify the person's age as discussed above, and can enter the person's age (in the illustrated example, 39) into the field 630. In some examples, the context-sensitive scanner system 605 can enter the person's age into the field 630 if the date of birth according to the optical glyph 675 (as scanned via the first sensor 620) matches the date of birth according to the image (as captured via the second sensor 625 and parsed via OCR 645), for instance as shown in box 680 and box 685.

While the verification process illustrated in FIG. 6 is illustrated as using two separate sensors (e.g., the first sensor 620 and the second sensor 625) in FIG. 6, in some examples, the verification process can be performed using a single sensor. For instance, in some examples, the sensor can be a camera, and the camera can be used both to scan the optical glyph 675 and to capture the image of the scene (including the object 670 and/or the optical glyph 675) to which the context-sensitive scanner system 605 applies OCR 645 to parse the personal information. While the object 670 is illustrated as a driver's license, it should be understood that similar processes can be performed using other types of personal identification documents, such as passports, identification (ID) cards, employee badges, permanent residence cards (e.g., green cards), certificates of citizenship, visas, and the like.

The verification process illustrated in FIGS. 5-6 can provide improved security and/or confidence in identifying an object, similarly to two-factor authentication or multi-factor authentication more broadly. In some examples, a verification process like the processes illustrated in FIGS. 5-6 can be used for multi-factor authentication, for instance to log into a computer or to enter into a secure building or other area. For instance, as illustrated in FIG. 6, a person can present a personal identification document (e.g., an employee badge) to a context-sensitive scanner system (e.g., context-sensitive scanner system 505 and/or context-sensitive scanner system 605). The context-sensitive scanner system can capture an image of the personal identification document, scan an optical glyph (e.g., optical glyph 575, optical glyph 675) on or coupled to the personal identification document, and/or receive a transmission from a short-range wireless transmitter (e.g., RFID tag or NFC tag) of the personal identification document. The context-sensitive scanner system can verify whether (a) personal information written on the personal identification document (e.g., determined by applying OCR 645 to the image of the personal identification document), (b) personal information decoded from the optical glyph (e.g., the personal information having been optically encoded into the optical glyph), and (c) personal information received from the short-range wireless transmitter match one another and/or match a reference dataset (e.g., database) of valid personal information. In this way, one or more personal identification document(s) can provide multi-factor authentication by providing the personal information in multiple ways that are each individually receivable and/or verifiable by the context-sensitive scanner system, in some cases receivable using different sensor(s) and/or communication interface(s) of the context-sensitive scanner system.

Figure 7:
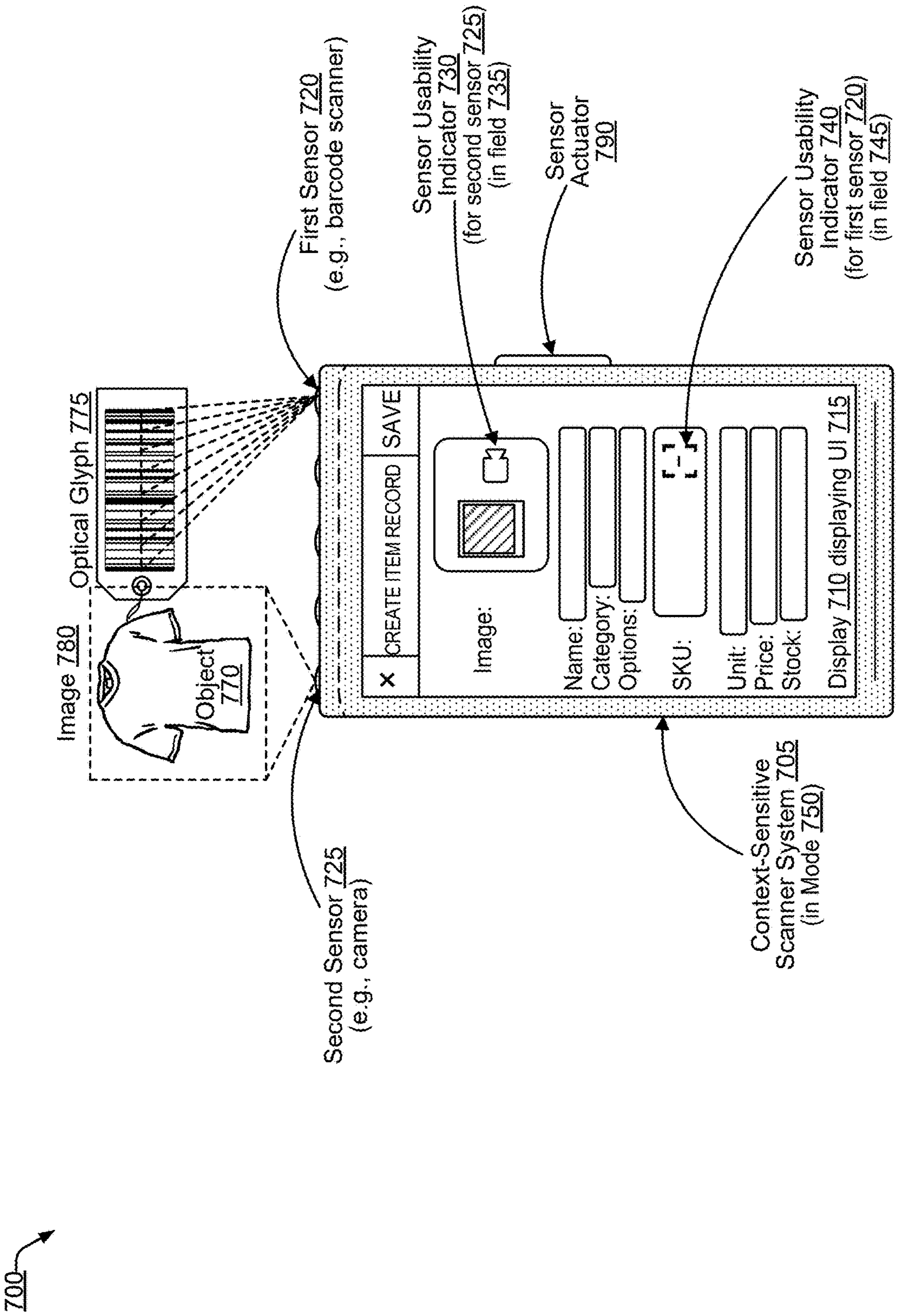
FIG. 7 is a conceptual diagram illustrating a context-sensitive scanner system using first sensor information from a first sensor to fill in a first field in a user interface (UI), and using second sensor information from a second sensor to fill in a second field in the UI, in accordance with some examples.

FIG. 7 is a conceptual diagram 700 illustrating a context-sensitive scanner system 705 using first sensor information from a first sensor to fill in a first field in a user interface (UI), and using second sensor information from a second sensor to fill in a second field in the UI. The context-sensitive scanner system 705 can be an example of the context-sensitive scanner system 105, the context-sensitive scanner systems 150A-150C, the context-sensitive scanner system 205, and/or the context-sensitive scanner system 300, the context-sensitive scanner system 405, the context-sensitive scanner system 505, and/or the context-sensitive scanner system 605, or vice versa. The context-sensitive scanner system 505 includes a display 610, which is an example of the output device(s) 110, the output device(s) 260, the output device(s) 345, the display 410, the display 510, and/or the display 610, or vice versa. While the context-sensitive scanner system 705 (and/or an application running on the context-sensitive scanner system 705) is in a mode 750, the display 710 displays a UI 715 for creating and item record and/or adding the item record to an inventory (e.g., to a database or other data structure). The UI 715 includes a close button, a save button and a number of fields that a user of the context-sensitive scanner system 705 can add information about the object 770 into, to create the item record for the object 770. The fields include a field 735 for an image 780 of the object 770, a field for a name of the object 770 (e.g., T-shirt), a field for a category of the object 770 (e.g., apparel), a field for options associated with the object 770 (e.g., blue, red, green, small, medium, large), a field 745 for a SKU for the object 770, a field for units per item for the object 770 (e.g., eggs are typically sold by a dozen units per item, that is a dozen eggs per carton, while a t-shirt can be sold on its own as a single unit per item or in a multi-pack), a field for price of the object 770 (e.g., $14.00), a field for stock of the object 770 (e.g., how many of the object 770 are in a particular store and available for purchase/sale), and the like.

Some of the fields can be filled in automatically using sensor data from one or more sensor(s) and/or communication interface(s) of the context-sensitive scanner system 705. For instance, the UI 715 includes the field 735 for the image 780 of the object 770. The field 735 includes a sensor usability indicator 730 for the second sensor 725 (e.g., a camera) indicating that the second sensor 725 (e.g., the camera) is usable to fill in the field 735. In some examples, interacting with (e.g., touching) the sensor usability indicator 730 (and/or interacting with the sensor actuator 790 of the context-sensitive scanner system 705) can cause the context-sensitive scanner system 705 the activate the second sensor 725, to capture an image 780 of the object 770 using the second sensor 725, and/or to insert the image 780 of the object 770 into the field 735.

Similarly, the UI 715 includes the field 745 for the SKU of the object 770. The field 745 includes a sensor usability indicator 740 for the first sensor 720 (e.g., a barcode scanner and/or a camera) indicating that the first sensor 720 is usable to fill in the field 745. In some examples, interacting with (e.g., touching) the sensor usability indicator 740 (and/or interacting with the sensor actuator 790 of the context-sensitive scanner system 705) can cause the context-sensitive scanner system 705 to activate the first sensor 720, scan the optical glyph 775 (e.g., barcode or 2D matrix barcode) of the object 770 using the first sensor 720, decode the SKU from the optical glyph 775 (e.g., the SKU having been optically encoded in the optical glyph 775), and/or to insert the SKU of the object 770 into the field 745.

While the first sensor 720 and the second sensor 725 are illustrated as separate sensors in FIG. 7, in some examples, one sensor (e.g., a camera) can perform the functions of both the first sensor 720 and the second sensor 725 discussed above. For instance, the camera can both capture the image 780 of the object 770 to use in the field 735, and can scan the optical glyph 775 to retrieve the SKU from the optical glyph 775 to use in the field 745.

Figure 8:
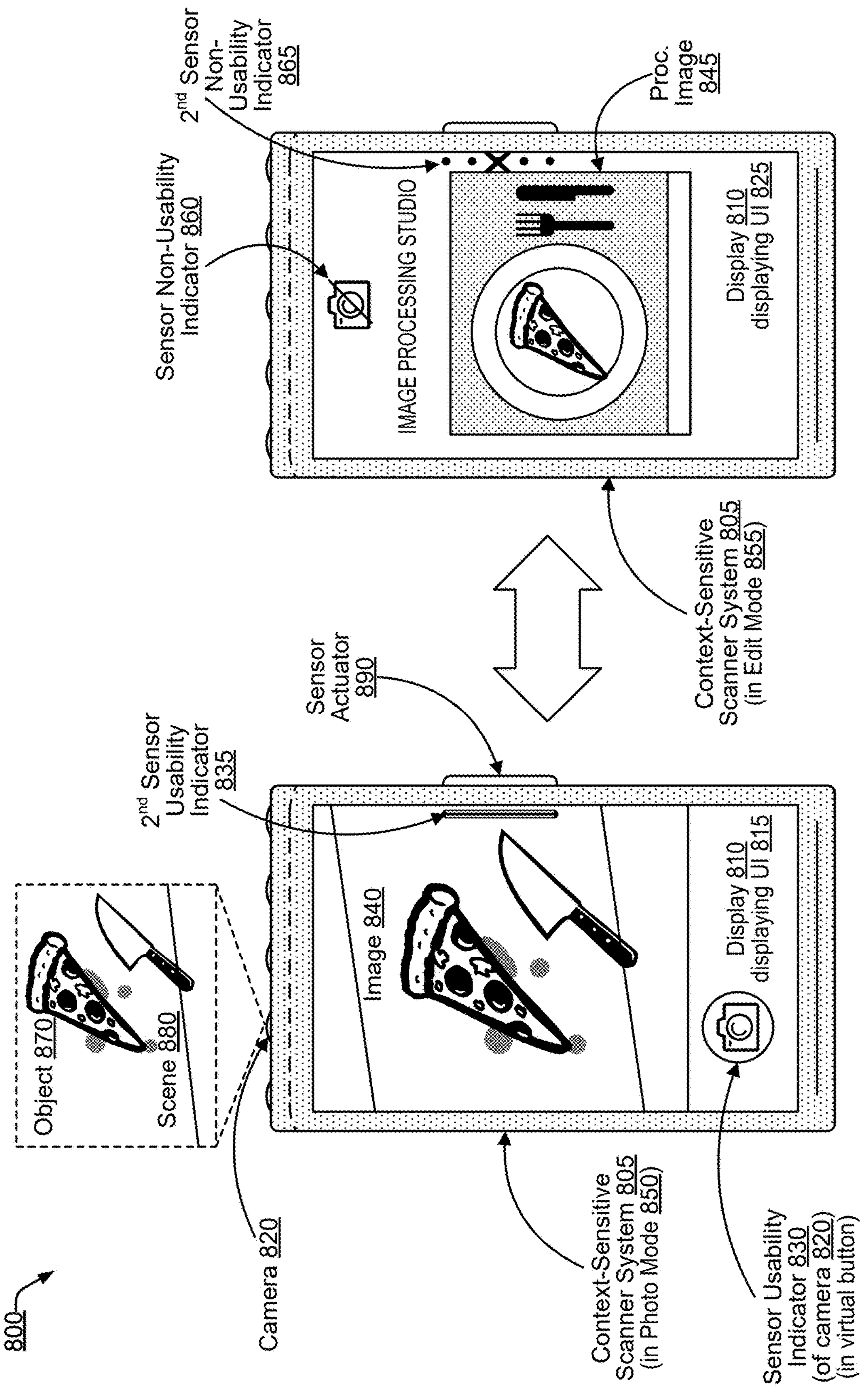
FIG. 8 is a conceptual diagram illustrating a context-sensitive scanner system that transitions from a photo mode (in which a camera is usable and captures an image) to an editing mode (in which the image is processed and the camera is not usable), in accordance with some examples.

FIG. 8 is a conceptual diagram 800 illustrating a context-sensitive scanner system 805 that transitions from a photo mode (in which a camera is usable and captures an image) to an editing mode (in which the image is processed and the camera is not usable). The context-sensitive scanner system 805 can be an example of the context-sensitive scanner system 105, the context-sensitive scanner systems 150A-150C, the context-sensitive scanner system 205, and/or the context-sensitive scanner system 300, the context-sensitive scanner system 405, the context-sensitive scanner system 505, the context-sensitive scanner system 605, and/or the context-sensitive scanner system 705, or vice versa. The context-sensitive scanner system 505 includes a display 710, which is an example of the output device(s) 110, the output device(s) 260, the output device(s) 345, the display 410, the display 510, the display 610, and/or the display 710, or vice versa. While the context-sensitive scanner system 805 is in a photo mode 850, the display 810 displays a UI 815 that allows capture of an image 840 using a camera 820. The UI 815 includes a sensor usability indicator 830 showing an icon of a camera in a virtual button, indicating that the camera 820 can be used while the context-sensitive scanner system 805 (and/or an application running on the context-sensitive scanner system 805) is in the photo mode 850. The UI 815 also includes a second sensor usability indicator 835 adjacent to a sensor actuator 890, similarly to the second sensor usability indicator 460, the additional sensor usability indicator 535, and/or the second sensor usability indicator 640. Upon receipt of an interaction with the virtual button with the sensor usability indicator 830 (e.g., a touch of the virtual button) and/or an interaction with the sensor actuator 890 (e.g., a press of the sensor actuator 890), the camera 820 captures the image 840.

The image 840 is an image of a scene 880 with an object 870. The object 870 is a pizza slice as illustrated in FIG. 8. The image 840 shows the object 870 in a scene 880 that might not be desirable to show to other users (e.g., to potential customers). For instance, the image 840 shows grease stains under the pizza slice (the object 770), and a chef's knife askew near the pizza slice (the object 770).

The context-sensitive scanner system 805 can transition between the photo mode 850 and an editing mode 855. In the editing mode 855, the display 810 displays a UI 825 for editing the image 840 to generate a processed image 845. The processed image 845 modifies the background behind the object 770 (the pizza slice), for instance to put the object 770 (the pizza slice), on an elegant background with a plate and utensils, without the grease stains or chef's knife of the image 840. In some examples, the application running on the context-sensitive scanner system 805 can use the image 840 and/or the processed image 845 for a product image for an item record (e.g., for the field 735 in the UI 715), for verification that the object 870 matches a corresponding optical glyph (e.g., as in the verification in FIG. 5 that the object 570 matches the optical glyph 575 or the verification in FIG. 6 that the object 670 matches the optical glyph 675).

Because the editing mode 855 is a mode in which the image 840 being edited (to generate the processed image 845) has already been captured, there is no need to capture any additional image(s) while the context-sensitive scanner system 805 (and/or an application running on the context-sensitive scanner system 805) is in the editing mode 855. Thus, the UI 825 removes the sensor usability indicators of the UI 815 (e.g., sensor usability indicator 830, second sensor usability indicator 835) and includes a sensor non-usability indicator 860 (illustrated as a crossed-out camera icon) and a second sensor non-usability indicator 865. The second sensor non-usability indicator 865 takes the place of the second sensor usability indicator 835 and is illustrated as a crossed-out dotted line that is displayed adjacent to the sensor actuator 890 of the context-sensitive scanner system 505, parallel to the sensor actuator 890, within a threshold distance of the sensor actuator 890, and/or along the length of the sensor actuator 890. The lack of the sensor usability indicators (e.g., sensor usability indicator 830, second sensor usability indicator 835) and the presence of the sensor non-usability indicators (e.g., sensor non-usability indicator 860, second sensor non-usability indicator 865) in the UI 825 indicates that the camera 820 is not usable while the context-sensitive scanner system 805 (and/or an application running on the context-sensitive scanner system 805) is in the editing mode 855.

In some examples, the context-sensitive scanner system may also include a quick settings mode and/or user interface (not shown) in which UI elements are presented that, upon receiving a user input, allow the user to adjust brightness of output device(s) 110 (e.g., of a display 810, a projector, and/or indicator lights of the context-sensitive scanner system), turn Wi-Fi or WLAN connectivity on or off, change which Wi-Fi or WLAN network the context-sensitive scanner system is connected to, change a volume of a speaker (or other output device(s) 110), turn a first sensor (e.g., barcode scanner) on or off (e.g., via the switch(es) 215), turn a second sensor (e.g., camera) on or off (e.g., via the switch(es) 215), turn a short-range wireless communication interface (e.g., communication interface 235) on or off (e.g., via the switch(es) 215), turn a battery saver mode on or off, activate the first sensor (e.g., barcode scanner) to scan an optical glyph, activate the second sensor (e.g., camera) to scan an optical glyph, activate the short-range wireless communication interface (e.g., communication interface 235) to receive data wirelessly (e.g., from a communication instrument 250), or a combination thereof.

Figure 9:
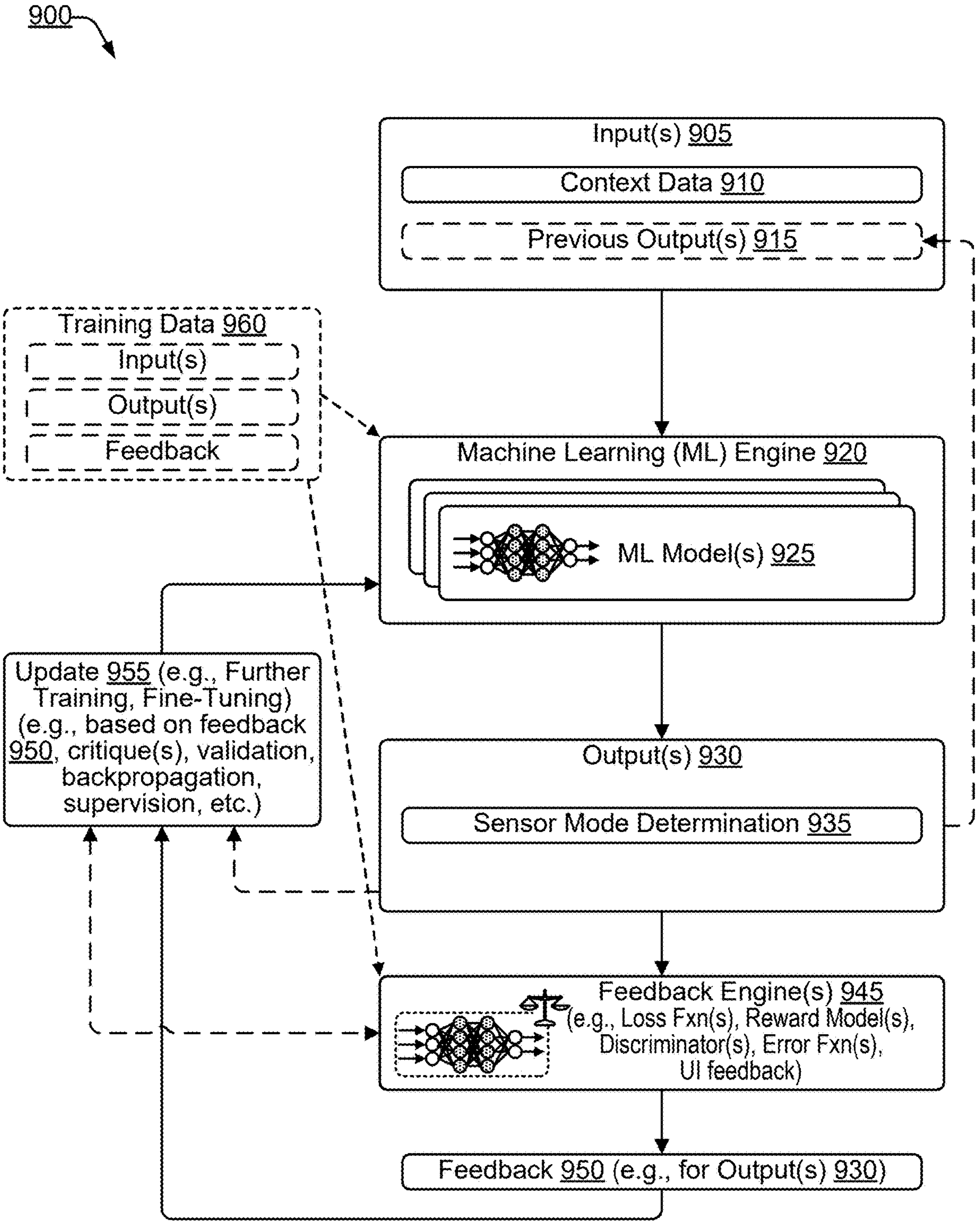
FIG. 9 is a block diagram illustrating an example of a machine learning system for training and use of one or more machine learning model(s) used for sensor usability determination based on context data, in accordance with some examples.

FIG. 9 is a block diagram illustrating an example of a machine learning system 900 for training and use of one or more machine learning model(s) 925 used for sensor usability determination based on context data 910. The machine learning system 900 a machine learning (ML) engine 920 that generates, trains, uses, and/or updates one or more ML model(s) 925.

The ML model(s) 925 can include, for instance, one or more neural network (NN(s)), convolutional NN(s) (CNN(s)), trained time delay NN(s) (TDNN(s)), deep network(s), autoencoder(s) (AE(s)), variational AE(s) (VAE(s)), deep belief net(s) (DBN(s)), recurrent NN(s) (RNN(s)), generative adversarial network(s) (GAN(s)), conditional GAN(s) (cGAN(s)), support vector machine(s) (SVM(s)), random forest(s) (RF(s)), decision tree(s), NN(s) with fully connected (FC) layer(s), NN(s) with convolutional layer(s), computer vision (CV) system(s), deep learning (DL) system(s), classifier(s), transformer(s), clustering algorithm(s), gradient boosting model(s), sequence-to-sequence (Seq2Seq) model(s), autoregressive (AR) model(s), large language model(s) (LLMs), model(s) trained using genetic algorithm(s) (GA(s)), model(s) trained using evolutionary algorithm(s) (EA(s)), model(s) trained using neuroevolution of augmenting topologies (NEAT) algorithm(s), model(s) trained using deep Q learning (DQN) algorithm(s), model(s) trained using advantage actor-critic (A2C) algorithm(s), model(s) trained using proximal policy optimization (PPO) algorithm(s), model(s) trained using reinforcement learning (RL) algorithm(s), model(s) trained using supervised learning (SL) algorithm(s), model(s) trained using unsupervised learning (UL) algorithm(s), or combinations thereof. Examples of LLMs that can be used can include, for instance, Generative Pre-Trained Transformer (GPT) (e.g., GPT-2, GPT-3, GPT-3.5, GPT-4, ChatGPT, and/or other GPT variant(s)), DaVinci, LLMs using Massachusetts Institute of Technology (MIT) langchain, Google® Bard®, Google® Gemini®, Large Language Model Meta AI (LLaMA), LLAMA 2, LLAMA 3, LLAMA 4, Megalodon, or combinations thereof.

In some examples, the mode control engine(s) 360 can be an example of ML engine 920 and/or the ML model(s) 925, or vice versa.

Within FIG. 9, a graphic representing the ML model(s) 925 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 925 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 925 can include a feed-forward network, in which case there are no feedback connections where outputs of the network are fed back into itself. In some cases, the ML model(s) 925 can include a recurrent neural network, which can have loops that allow information to be carried across nodes while reading in input. In some cases, the network can include a convolutional neural network, which may not link every node in one layer to every other node in the next layer.

One or more input(s) 905 can be provided to the ML model(s) 925. The ML model(s) 925 can be trained by the ML engine 920 (e.g., based on training data 960) to generate one or more output(s) 930.

In some examples, the input(s) 905 include context data 910 with context about a context-sensitive scanner system (e.g., context-sensitive scanner system 105, context-sensitive scanner systems 150A-150C, context-sensitive scanner system 205, context-sensitive scanner system 300, context-sensitive scanner system 405, context-sensitive scanner system 505, context-sensitive scanner system 605, context-sensitive scanner system 705, and/or context-sensitive scanner system 805), as in the context information 225. The context data 910 can include, for instance, for instance, an operation and/or function to be performed using an application running on a context-sensitive scanner system (e.g., using a specific UI or mode of the application), a type of input to be provided to an application running on a context-sensitive scanner system, a location (e.g., data field) for receiving input to an application running on a context-sensitive scanner system, a current mode of the application running on the context-sensitive scanner system, a current mode of the context-sensitive scanner system itself, a current UI being displayed by the context-sensitive scanner system, a selection to be made in a user interface (e.g., from a dropdown, a set of radio buttons, a set of checkboxes, or other set of option), another application stored and/or installed on the context-sensitive scanner system, another application running (e.g., in the background or in the foreground) on the context-sensitive scanner system, a location of the context-sensitive scanner system 205, sensor data from a first sensor (e.g., a barcode scanned by a barcode scanner), sensor data from a second sensor (e.g., an image captured by a camera, a 2D glyph scanned by the camera), data extracted from sensor data by processing the sensor data (e.g., data decoded from an optical glyph in which the data is optically encoded, characters recognized in an image using OCR 645, and/or objects detected and/or recognized in an image using a object recognition algorithm 545), communicated information received wirelessly by a short-range communication interface (e.g., received from a communication instrument 250), audio data received via a sensor (e.g., microphone) of the context-sensitive scanner system, proximity data received via a sensor (e.g., proximity detector) of the context-sensitive scanner system, depth data received via a sensor (e.g., depth sensor) of the context-sensitive scanner system, a pose (e.g., location and/or orientation) of the context-sensitive scanner system (e.g., as determined using pose sensor(s) of the context-sensitive scanner system), an identity of a user (e.g., user 135) of the context-sensitive scanner system, a time, a date, an inventory amount, an inventory trend, a sales trend, an inventory prediction (e.g., based on an inventory trend and/or an ML model), a sales prediction (e.g., based on a sales trend and/or an ML model), a type of payment data, a transaction history associated with a user, a transaction history associated with a merchant, a transaction history associated with an object (e.g., a product or service associated with an optical glyph 125), or a combination thereof.

In some examples, the input(s) 905 can include previous output(s) 915, such as previous iterations of the output(s) 930 generated by the ML model(s) 925. In some examples, the input(s) 905 can include partially-processed data that is to be processed further, such as various features, weights, intermediate data, layer data from specific layer(s) of the ML model(s) 925, or a combinations thereof.

The output(s) 930 generated by the ML model(s) 925 in response to input of the input(s) 905 (e.g., in response to the context data 910 and/or the previous output(s) 915) into the ML model(s) 925 can include a sensor mode determination 935. The sensor mode determination 935 can identify, based on the context data 910 and/or the previous output(s) 915, whether a particular sensor (e.g., of the sensor array 120) is usable or non-usable by the context-sensitive scanner system (or an application running on the context-sensitive scanner system) at a given time. For instance, in some examples, the sensor mode determination 935 can be a determination that the sensor is usable, in which case the context-sensitive scanner system can output a sensor usability indicator (e.g., sensor usability indicator 435, second sensor usability indicator 460, the sensor usability indicators in the status bar 530, additional sensor usability indicator 535, sensor usability indicator 635, second sensor usability indicator 640, sensor usability indicator 730, sensor usability indicator 740, sensor usability indicator 830, second sensor usability indicator 835) and/or not output a sensor non-usability indicator. In some examples, the sensor mode determination 935 can be a determination that the sensor is not usable, in which case the context-sensitive scanner system can output a sensor non-usability indicator (e.g., sensor non-usability indicator 430, sensor non-usability indicator 860, second sensor non-usability indicator 865) and/or not output a sensor usability indicator.

In some examples, the ML system that includes the ML engine 920 and/or ML model(s) 925 adds the output(s) 930 to a data store (e.g., the data store(s) 280). Data can be drawn from these data store(s) to use as input(s) 905 for the ML model(s) 925 for generating future output(s) 930 (e.g., as the previous output(s) 915).

In some examples, the ML system repeats the process illustrated in FIG. 9 multiple times to generate the output(s) 930 in multiple passes, using some of the output(s) 930 from earlier passes as some of the input(s) 905 in later passes (e.g., as the previous output(s) 915). For instance, in an illustrative example, in a first pass, the ML model(s) 925 can process the context data 910 to generate a sensor mode determination 935 while the context-sensitive scanner system is in a first mode. In a second pass, the ML model(s) 925 can add (e.g., append) the sensor usability determination from the first pass to the input(s) 905 (e.g., as the previous output(s) 915), and can generate another sensor mode determination 935 while the context-sensitive scanner system is in a second mode (e.g., updated to include the context data 910 and/or the previous sensor usability determination from the first pass) into the ML model(s) 925. In some examples, the second sensor usability determination (generated in the second pass) can be influenced by the first sensor usability determination (generated in the first pass), for instance if the first mode and the second mode are related, if the first sensor usability determination prevented the user from using the sensor for a function associated with the first mode and/or the second mode, and the like.

In some examples, the ML system includes one or more feedback engine(s) 945 that generate and/or provide feedback 950 about the output(s) 930. In some examples, the feedback 950 indicates how well the output(s) 930 align to corresponding expected output(s), how well the output(s) 930 serve their intended purpose, or a combination thereof. In some examples, the feedback engine(s) 945 include loss function(s), reward model(s) (e.g., other ML model(s) that are used to score the output(s) 930), discriminator(s), error function(s) (e.g., in back-propagation), user interface feedback received via a user interface from a user, or a combination thereof. In some examples, the feedback 950 can include one or more alignment score(s) that score a level of alignment between the output(s) 930 and the expected output(s) and/or intended purpose.

The ML engine 920 of the ML system can update (further train and/or fine-tune) the ML model(s) 925 based on the feedback 950 to perform an update 955 (e.g., further training) of the ML model(s) 925 based on the feedback 950. In some examples, the feedback 950 includes positive feedback, for instance indicating that the output(s) 930 closely align with expected output(s) and/or that the output(s) 930 serve their intended purpose. In some examples, the feedback 950 includes negative feedback, for instance indicating a mismatch between the output(s) 930 and the expected output(s), and/or that the output(s) 930 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback. In response to positive feedback in the feedback 950, the ML engine 920 can perform the update 955 to update the ML model(s) 925 to strengthen and/or reinforce weights associated with generation of the output(s) 930 to encourage the ML engine 920 to generate similar output(s) 930 given similar input(s) 905. In response to negative feedback in the feedback 950, the ML engine 920 can perform the update 955 to update the ML model(s) 925 to weaken and/or remove weights associated with generation of the output(s) 930 to discourage the ML engine 920 from generating similar output(s) 930 given similar input(s) 905.

In some examples, the update 955 can set and/or modify certain hyperparameters, settings, options, and/or parameters of the ML model(s) 925, such as temperature (e.g., level of creativity) for the output(s) 930, a top P value (e.g., influencing creativity level and/or randomness level) for the output(s) 930, a frequency penalty (e.g., to prevent output(s)) for the output(s) 930, a presence penalty (e.g., to encourage the personalized ML model(s) 925 to introduce new output(s)) for the output(s) 930, other hyperparameters discussed herein, other settings discussed herein, other options discussed herein, other parameters discussed herein, or a combination thereof. In some examples, the update 955 can set and/or modify certain hyperparameters, settings, options, and/or parameters of the ML model(s) 925 based on the feedback 950, for instance if the feedback 950 indicates whether the output(s) 930 in one pass match, or are different from, the output(s) 930 in another pass (e.g., indicative of randomness and/or frequency penalty and/or presence penalty).

In an illustrative example, if the ML model(s) 925 generates a sensor mode determination 935 based on the context data 910, and the feedback 950 indicates that the user found the sensor mode determination 935 to be accurate and/or helpful, then the feedback 950 can be interpreted as positive feedback, strengthening the weights of the ML model(s) 925 that were responsible for generating the sensor mode determination 935 to encourage generation of similar output(s) 930 given similar input(s) 905. For instance, if the sensor mode determination 935 indicates sensor usability, and the user is successfully able to use the sensor, this can be interpreted as positive feedback. Similarly, if the sensor mode determination 935 indicates sensor non-usability, and the user does not attempt to use the sensor, this can be interpreted as positive feedback.

On the other hand, if the feedback 950 indicates that the user found the sensor mode determination 935 to be inaccurate and/or not helpful, then the feedback 950 can be interpreted as negative feedback, weakening or removing the weights of the ML model(s) 925 that were responsible for generating the sensor mode determination 935 to discourage generation of similar output(s) 930 given similar input(s) 905. For instance, if the sensor mode determination 935 indicates sensor usability, but the user is not successful in being able to use the sensor, this can be interpreted as negative feedback. Similarly, if the sensor mode determination 935 indicates sensor non-usability, and the user attempts to use the sensor anyway, this can be interpreted as negative feedback.

In some examples, the ML engine 920 can also perform an initial training of the ML model(s) 925 before the ML model(s) 925 are used to generate the output(s) 930 based on the input(s) 905. During the initial training, the ML engine 920 can train the ML model(s) 925 based on training data 960. In some examples, the training data 960 includes examples of input(s) (of any input types discussed with respect to the input(s) 905), output(s) (of any output types discussed with respect to the output(s) 930), and/or feedback (of any feedback types discussed with respect to the feedback 950). In an illustrative example, the training data 960 can include examples of context data (e.g., as in context data 910), previous output(s) (e.g., as in previous output(s) 915), sensor mode determination(s) (e.g., as in the sensor mode determination 935), and/or feedback (e.g., as in the feedback 950). In some cases, positive feedback in the training data 960 can be used to perform positive training, to encourage the ML model(s) 925 to generate output(s) similar to the output(s) in the training data given input of the corresponding input(s) in the training data. In some cases, negative feedback in the training data 960 can be used to perform negative training, to discourage the ML model(s) 925 from generate output(s) similar to the output(s) in the training data given input of the corresponding input(s) in the training data.

In some examples, the ML model(s) 925 can generate the output(s) 930 dynamically and in real-time as the input(s) 905 continue to be received by the ML model(s) 925. This can ensure that the output(s) 930 are generated based on up-to-date input(s) 905.

Figure 10A:
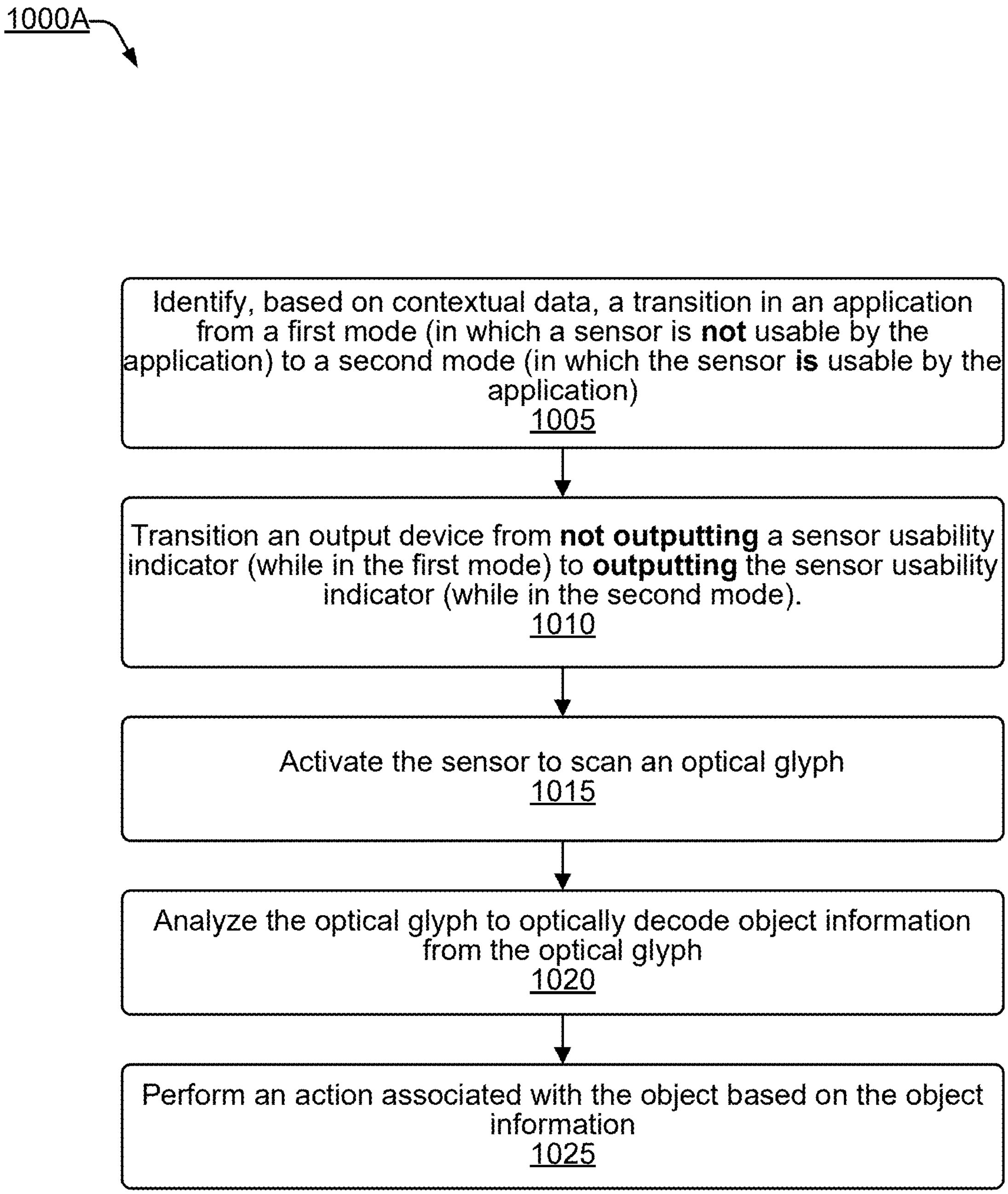
FIG. 10A is a flow diagram illustrating a process for controlling and/or indicating sensor usability, in accordance with some examples.

FIG. 10A is a flow diagram illustrating a process 1000A for controlling and/or indicating sensor usability. The process 1000A can be performed by, and/or using, a context-sensitive scanner system. The context-sensitive scanner system can include, for instance, the context-sensitive scanner system 105, the context-sensitive scanner systems 150A-150C, the context-sensitive scanner system 205, the context-sensitive scanner system 300, the context-sensitive scanner system 405, the context-sensitive scanner system 505, the context-sensitive scanner system 605, the context-sensitive scanner system 705, the context-sensitive scanner system 805, the ML system 900, the ML engine 920, the ML model(s) 925, the feedback engine(s) 945, a context-sensitive scanner system that performs the process 1000B, the environment 1100 for application interface customization, the environment 1200, the system 1300, a system, an apparatus, a point of sale (POS) system or terminal, a transaction instrument reader device, a processor that performs instructions stored in a non-transitory computer-readable storage medium, any subsystems or components of any of the above-listed systems, any other computing systems discussed herein, or a combination thereof.

At operation 1005, the context-sensitive scanner system (or a subsystem thereof) is configured to, and can, identify, based on contextual data, a transition in the application from a first mode to a second mode. Sensor data from a sensor is not usable by the application while the application is in the first mode. The sensor data from the sensor is usable by the application while the application is in the second mode.

Examples of the first mode include a mode that the context-sensitive scanner system 105 is in as illustrated in FIG. 1A, a mode determined by the mode control engine(s) 360, the first mode 450, the editing mode 855, another mode discussed herein, or a combination thereof. Examples of the second mode include a mode that the context-sensitive scanner system 105 is in as illustrated in FIG. 1A, a mode determined by the mode control engine(s) 360, the second mode 455, the mode 550, the mode 650, the mode 750, the photo mode 850, another mode discussed herein, or a combination thereof.

Examples of the sensor include any of the sensor(s) and/or communication interface(s) of the sensor array 120, the first sensor 210A, the second sensor 210B, the communication interface 235, the detection interface(s) 325, the communication interface(s) 335, the communication interface(s) 340, the sensor(s) 350, the input device(s) 355, any of the sensor(s) and/or communication interface(s) of the sensor array 420, the sensor 465, first sensor 520, the second sensor 525, the first sensor 620, the second sensor 625, the first sensor 720, the second sensor 725, the camera 820, another sensor discussed herein, or a combination thereof.

Examples of the sensor data include data captured and/or received by any of the sensor(s) and/or communication interface(s) of the sensor array 120, the scanned barcode 240, the scanned 2D glyph 245, the data received from the communication instrument 250, a detection by the detection interface(s) 325, data received by the communication interface(s) 335, data received by the communication interface(s) 340, sensor data captured by the sensor(s) 350, an input received using the input device(s) 355, data captured and/or received by any of the sensor(s) and/or communication interface(s) of the sensor array 420, the barcode 475 scanned using the 465, the image of the object 570 captured using the first sensor 520, the optical glyph 575 scanned using the second sensor 525, the optical glyph 675 scanned using the first sensor 620, the image of the object 670 captured using the second sensor 625, the optical glyph 775 scanned using the first sensor 720, the image 780 of the object 770 captured using the second sensor 725, the image 840 of the object 870 captured using the camera 820, any other sensor data discussed herein, any other communicated data discussed herein, any other input(s) discussed herein, or a combination thereof.

Examples of the contextual data include the context information 225, the context data 910, an operation and/or function to be performed using an application running on a context-sensitive scanner system (e.g., using a specific UI or mode of the application), a type of input to be provided to an application running on a context-sensitive scanner system, a location (e.g., data field) for receiving input to an application running on a context-sensitive scanner system, a current mode of the application running on the context-sensitive scanner system, a current mode of the context-sensitive scanner system itself, a current UI being displayed by the context-sensitive scanner system, a selection to be made in a user interface (e.g., from a dropdown, a set of radio buttons, a set of checkboxes, or other set of option), another application stored and/or installed on the context-sensitive scanner system, another application running (e.g., in the background or in the foreground) on the context-sensitive scanner system, a location of the context-sensitive scanner system 205, sensor data from a first sensor (e.g., a barcode scanned by a barcode scanner), sensor data from a second sensor (e.g., an image captured by a camera, a 2D glyph scanned by the camera), data extracted from sensor data by processing the sensor data (e.g., data decoded from an optical glyph in which the data is optically encoded, characters recognized in an image using OCR 645, and/or objects detected and/or recognized in an image using a object recognition algorithm 545), communicated information received wirelessly by a short-range communication interface (e.g., received from a communication instrument 250), audio data received via a sensor (e.g., microphone) of the context-sensitive scanner system, proximity data received via a sensor (e.g., proximity detector) of the context-sensitive scanner system, depth data received via a sensor (e.g., depth sensor) of the context-sensitive scanner system, a pose (e.g., location and/or orientation) of the context-sensitive scanner system (e.g., as determined using pose sensor(s) of the context-sensitive scanner system), an identity of a user (e.g., user 135) of the context-sensitive scanner system, a time, a date, the mode that the context-sensitive scanner system is in, any sensor data received from the sensor, an inventory amount, an inventory trend, a sales trend, an inventory prediction (e.g., based on an inventory trend and/or an ML model), a sales prediction (e.g., based on a sales trend and/or an ML model), a type of payment data, a transaction history associated with a user, a transaction history associated with a merchant, a transaction history associated with an object (e.g., a product or service associated with an optical glyph 125), or a combination thereof.

At operation 1010, the context-sensitive scanner system (or a subsystem thereof) is configured to, and can, transition the output device from not outputting an sensor usability indicator while the application is in the first mode to outputting the sensor usability indicator while the application is in the second mode. The sensor usability indicator identifies that the sensor data from the sensor is usable by the application while the application is in the second mode. In some examples, the sensor can be an optical sensor (e.g., barcode scanner, camera, and/or image sensor), and the sensor usability indicator can be an optical sensor usability indicator that identifies that the optical data from the optical sensor is usable by the application while the application is in the second mode.

Examples of the sensor usability indicator include a sensor usability indicator of the sensor mode indicator(s) 115, a sensor usability indicator of the sensor mode indicator(s) 230, a sensor usability indicator determined using the mode control engine(s) 360, the sensor usability indicator 435, the second sensor usability indicator 460, the sensor usability indicators in the status bar 530, the additional sensor usability indicator 535, the sensor usability indicator 635, the second sensor usability indicator 640, the sensor usability indicator 730, the sensor usability indicator 740, the sensor usability indicator 830, the second sensor usability indicator 835, and/or a sensor usability indicator associated with the sensor mode determination 935.

Examples of the output device include the output device(s) 110, the output device(s) 260, the output device(s) 345, the display 410, the display 510, the display 610, the display 710, the display 810, another display, a speaker, a headset, a set of headphones or a headphone jack to wireless connection therefor, a haptic actuator, or a combination thereof.

In some examples, the output device is a display, and the sensor usability indicator is output in one of a status bar (e.g., status bar 530) or an input field (e.g., field 630, field 735, field 745) of a graphical user interface (e.g., the UI 415, the UI 425, the UI 515, the UI 615, the UI 715, the UI 815, and/or the UI 825) while the application is in the second mode. In some examples, the output device is a display, and the sensor usability indicator is output at a part of the display that is within a threshold distance of an actuator, where activating the sensor is performed in response to receipt of an interaction with the actuator. Examples of the actuator include the sensor actuator 145, the scan button 440, the scan button 540, the sensor actuator 690, the sensor actuator 790, and/or the sensor actuator 890. Examples of such a sensor usability indicator include the second sensor usability indicator 460, the additional sensor usability indicator 535, the second sensor usability indicator 640, second sensor usability indicator 835. The second sensor non-usability indicator 865 is an example of a sensor non-usability indicator in a similar position relative to the actuator.

In some examples, the output device is a speaker, and the sensor usability indicator includes a sound played through the speaker. In some examples, the output device is a haptic feedback actuator (e.g., a motor), and the sensor usability indicator includes a vibration (e.g., a specific vibration pattern) output using the haptic feedback actuator.

In some examples, the context-sensitive scanner system (or a subsystem thereof) is configured to, and can, transition the output device from outputting a sensor non-usability indicator while the application is in the first mode to not outputting the sensor non-usability indicator while the application is in the second mode, the sensor non-usability indicator identifying that the sensor data from the sensor is not usable by the application while the application is in the first mode.

Examples of the sensor non-usability indicator include a sensor non-usability indicator of the sensor mode indicator (s) 115, a sensor non-usability indicator of the sensor mode indicator(s) 230, a sensor non-usability indicator determined using the mode control engine(s) 360, the sensor non-usability indicator 430, the sensor non-usability indicator 860, the second sensor non-usability indicator 865, and/or a sensor non-usability indicator associated with the sensor mode determination 935.

At operation 1015, the context-sensitive scanner system (or a subsystem thereof) is configured to, and can, activate the sensor to scan an optical glyph while the application is in the second mode and while the output device is outputting the sensor usability indicator.

Examples of the optical glyph include the optical glyph 125, the barcode 240, the 2D glyph 245, the barcode 475, the optical glyph 575, the optical glyph 675, the optical glyph 775, a 1D barcode, a 2D matrix barcode, a QR code, an Aztec code, a data matrix, a PDF417 code, a high capacity color barcode, a maxicode, a semacode, a variant of any of the previously-listed code types, another type of optical glyph discussed herein, or a combination thereof.

In some examples, the operation 1015, the context-sensitive scanner system (or a subsystem thereof) is configured to, and can, activate a communication interface to receive a short-range wireless transmission from a short-range wireless transmission instrument (e.g., the communication instrument 250).

In some examples, the term "interactive element" can encompass optical glyphs, short-range wireless transmission instruments (e.g., the communication instrument 250), or combinations thereof. In some examples, at operation 1015, the context-sensitive scanner system (or a subsystem thereof) is configured to, and can, activate an interface (e.g., sensor and/or communication interface) to interact with an interactive element and read and/or receive data (e.g., sensor data and/or transmitted data) from the interactive element.

At operation 1020, the context-sensitive scanner system (or a subsystem thereof) is configured to, and can, analyze the optical glyph to optically decode object information from the optical glyph as scanned in the optical sensor data. The object information is associated with an object. Examples of the object include the object 470, the object 570, the object 670, and/or the object 870. Examples of the object data can include data read from the optical glyph 125, the context information 225, data read from the barcode 240, data read from the 2D glyph 245, data received from the communication instrument 250, data read from the barcode 475, an image of the object 570, data read from the optical glyph 575, an image of the object 670, data read from the optical glyph 675, the image 780 of the object 770, data read from the optical glyph 775, the image 840 of the object 870, data associated with any of the fields of the UI 715 (e.g., a name, a category, options, a SKU, units per item, a price, stock), other object data discussed herein, or a combination thereof.

In some examples, the optical glyph is a barcode, and the sensor is a barcode scanner and/or a camera. In some examples, the optical glyph is a two-dimensional matrix barcode, and the sensor is a camera.

In some examples, the object is an identification document associated with a person (e.g., as in the object 670), the optical glyph (e.g., optical glyph 675) is on at least a part of the identification document, and the object information includes personal information associated with the person.

At operation 1025, the context-sensitive scanner system (or a subsystem thereof) is configured to, and can, perform an action associated with the object and based on the object information. Examples of the action include any of the actions 130, adding the object to a cart to be part of a transaction (e.g., as in the second mode 455 and/or the mode 550), adding an object or group of objects into an inventory database, updating inventory of an object or group of object, scanning the optical glyph 125 of an object (e.g., product or service) for checkout (e.g., with or without a cart or tab), searching for an item in an inventory (e.g., to add the item to a cart or tab, to identify whether the item is in stock, to identify how many of the item remain in inventory, to identify a location of the item in a store, or a combination thereof), applying a object recognition algorithm 545 (e.g., as in the mode 550), verifying accuracy between the optical glyph and the object (e.g., as in the mode 550 and/or the mode 650), applying OCR 645 (e.g., as in the mode 650), adding at least a subset of the object data into a field (e.g., as in the mode 750), editing and/or processing an image (e.g., as in the editing mode 855), adding and/or redeeming an entitlement (e.g., a coupon, gift card, a transit card, a boost, a discount, a loyalty reward, another transaction modifier, or a combination thereof) to be used in a transaction, selling and/or checking a balance of an entitlement (e.g., a gift card, a loyalty reward, a transit card), confirming an age or other personal information (e.g., if the optical glyph 125 is part of a driver's license), counting and/or tracking inventory, tracking shipments, entering the information into a form field of a user interface (UI) (see e.g., field 630, field 735, field 745), making a selection (e.g., from a dropdown, a set of radio buttons, a set of checkboxes, or other set of option) in a user interface, creating a new item record for an object (e.g., a product or service) in an inventory data structure (see e.g., FIG. 7), adding SKUs or other information about an object and/or product and/or service to an item record, creating purchase orders, or a combination thereof.

In some examples, the context-sensitive scanner system (or a subsystem thereof) is configured to, and can, identify, after performance of the action, a second transition in the application from the second mode back to the first mode. The context-sensitive scanner system can transition the output device from outputting the sensor usability indicator while in the second mode to not outputting the sensor usability indicator while in the first mode. In some examples, the context-sensitive scanner system (or a subsystem thereof) is configured to, and can, identify, after performance of the action, a second transition in the application from the second mode to a third mode. The context-sensitive scanner system can transition the output device from outputting the sensor usability indicator while in the second mode to not outputting the sensor usability indicator while in the third mode.

In some examples, the context-sensitive scanner system's output of sensor usability indicator(s) and/or sensor non-usability indicator(s) can improve the context-sensitive scanner system's user interface(s) by providing and clarifying limitations (e.g., in time, positioning of the context-sensitive scanner system, mode of the context-sensitive scanner system, and/or other contextual cues) on when certain sensor(s) and/or communication interface(s) are selectable to be used (e.g., are usable) by the application running on the context-sensitive scanner system, and when certain sensor(s) and/or communication interface(s) are not selectable to be used (e.g., are not usable) by the application. In some examples, the sensor usability indicator(s) and/or sensor non-usability indicator(s) can represent a limited list of at least one function (e.g., activation of at least one sensor or communication interface) that can be selected for use by the application to initiate the selected function (e.g., activate the at least one sensor or communication interface, receive input(s) from the at least one sensor or communication interface, and/or perform an action using the input(s)).

In some examples, the context-sensitive scanner system (or a subsystem thereof) is configured to, and can, receive transaction instrument information from a transaction instrument reader (e.g., transaction instrument reader 140, transaction reader interface(s) 330, transaction instrument reader 490) of the context-sensitive scanner system. The context-sensitive scanner system can facilitate processing of the transaction using the transaction instrument information. In some examples, facilitating the processing of the transaction can include sending the transaction instrument information (e.g., encrypted or not) to one or more transaction processing server(s) (e.g., associated with a bank or other financial entity) to allow the transaction processing server(s) to process the transaction. In some examples, facilitating the processing of the transaction can include interacting with a distributed ledger (e.g., a blockchain ledger) to add an indication of the transaction to a new block in the distributed ledger, and/or to add a corresponding transfer of asset(s) (e.g., cryptocurrencies, non-fungible token(s), or other asset (s)) to the new block in the distributed ledger.

In some examples, the context-sensitive scanner system (or a subsystem thereof) is configured to, and can, analyze an image captured using a camera of the apparatus to detect a representation of the object within the image, and verify that the representation of the object in the image matches the object information. Examples of this verification are illustrated in FIGS. 5 and 6. In some examples, the camera is the sensor. In some examples, the camera is distinct from the sensor. Use of such as verification process can provide improved security and/or confidence in identifying an object, similarly to two-factor authentication or multi-factor authentication more broadly. In some examples, such a verification process can be used for multi-factor authentication, for instance to log into a computer or to enter into a secure building or other area.

Figure 10B:
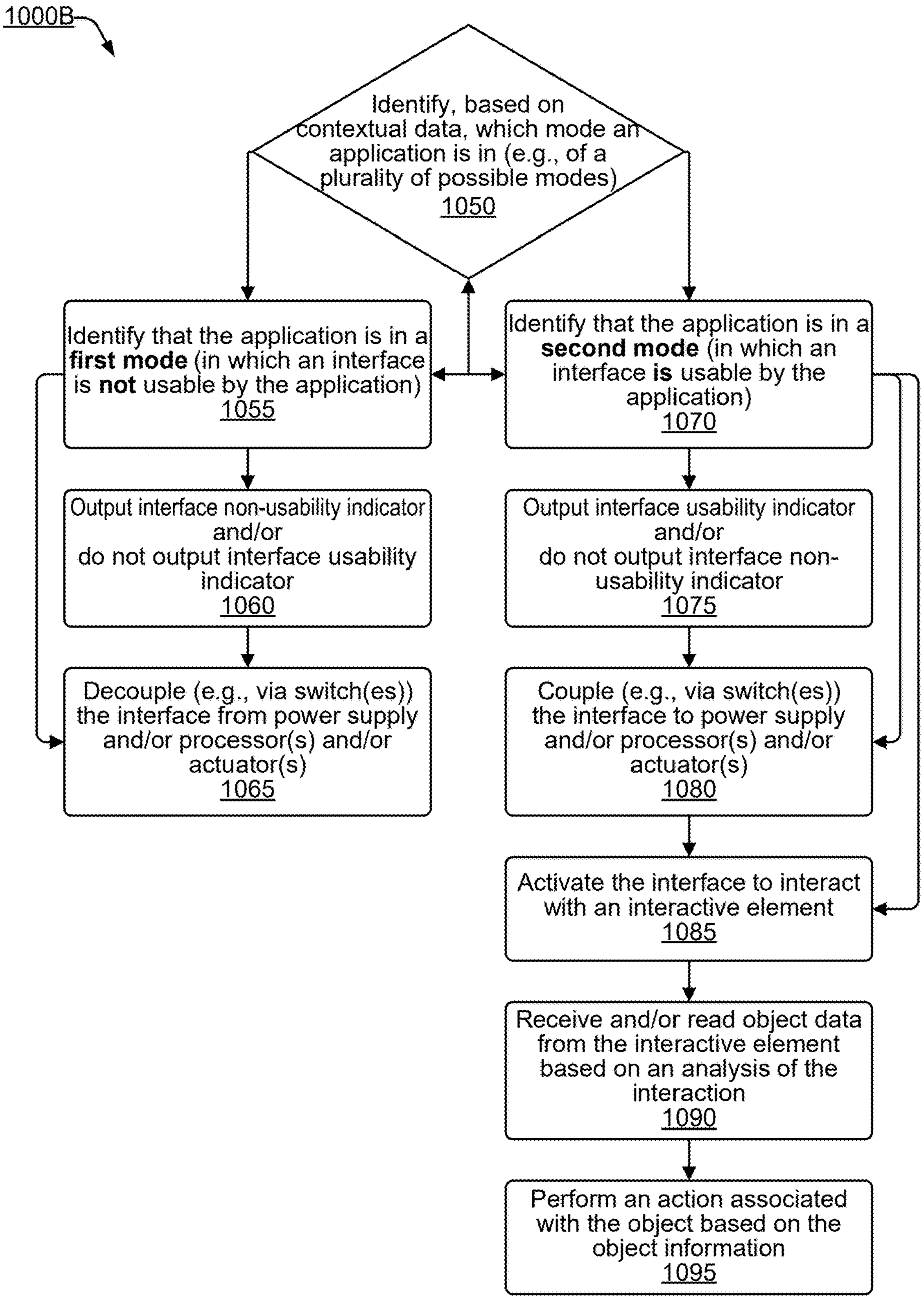
FIG. 10B is a flow diagram illustrating a process for controlling and/or indicating sensor usability, in accordance with some examples.

FIG. 10B is a flow diagram illustrating a process 1000B for controlling and/or indicating sensor usability. The process 1000B can be performed by, and/or using, a context-sensitive scanner system. The context-sensitive scanner system can include, for instance, the context-sensitive scanner system 105, the context-sensitive scanner systems 150A-150C, the context-sensitive scanner system 205, the context-sensitive scanner system 300, the context-sensitive scanner system 405, the context-sensitive scanner system 505, the context-sensitive scanner system 605, the context-sensitive scanner system 705, the context-sensitive scanner system 805, the ML system 900, the ML engine 920, the ML model(s) 925, the feedback engine(s) 945, a context-sensitive scanner system that performs the process 1000A, the environment 1100 for application interface customization, the environment 1200, the system 1300, a system, an apparatus, a point of sale (POS) system or terminal, a transaction instrument reader device, a processor that performs instructions stored in a non-transitory computer-readable storage medium, any subsystems or components of any of the above-listed systems, any other computing systems discussed herein, or a combination thereof At operation 1050, the context-sensitive scanner system (or a subsystem thereof) is configured to, and can, identify, based on contextual data, which mode an application (e.g., running on the context-sensitive scanner system) is in (e.g., of a plurality of possible modes). Operation 1050 can be followed by operation 1055 or by operation 1070, for instance depending on the mode that the context-sensitive scanner system is in.

Examples of the mode(s) include a mode that the context-sensitive scanner system 105 is in as illustrated in FIG. 1A, a mode determined by the mode control engine(s) 360, the first mode 450, the second mode 455, the mode 550, the mode 650, the mode 750, the photo mode 850, the editing mode 855, another mode discussed herein, or a combination thereof.

Examples of the contextual data include the context information 225, the context data 910, an operation and/or function to be performed using an application running on a context-sensitive scanner system (e.g., using a specific UI or mode of the application), a type of input to be provided to an application running on a context-sensitive scanner system, a location (e.g., data field) for receiving input to an application running on a context-sensitive scanner system, a current mode of the application running on the context-sensitive scanner system, a current mode of the context-sensitive scanner system itself, a current UI being displayed by the context-sensitive scanner system, a selection to be made in a user interface (e.g., from a dropdown, a set of radio buttons, a set of checkboxes, or other set of option), another application stored and/or installed on the context-sensitive scanner system, another application running (e.g., in the background or in the foreground) on the context-sensitive scanner system, a location of the context-sensitive scanner system 205, sensor data from a first sensor (e.g., a barcode scanned by a barcode scanner), sensor data from a second sensor (e.g., an image captured by a camera, a 2D glyph scanned by the camera), data extracted from sensor data by processing the sensor data (e.g., data decoded from an optical glyph in which the data is optically encoded, characters recognized in an image using OCR 645, and/or objects detected and/or recognized in an image using a object recognition algorithm 545), communicated information received wirelessly by a short-range communication interface (e.g., received from a communication instrument 250), audio data received via a sensor (e.g., microphone) of the context-sensitive scanner system, proximity data received via a sensor (e.g., proximity detector) of the context-sensitive scanner system, depth data received via a sensor (e.g., depth sensor) of the context-sensitive scanner system, a pose (e.g., location and/or orientation) of the context-sensitive scanner system (e.g., as determined using pose sensor(s) of the context-sensitive scanner system), an identity of a user (e.g., user 135) of the context-sensitive scanner system, a time, a date, the mode that the context-sensitive scanner system is in, any sensor data received from the sensor, an inventory amount, an inventory trend, a sales trend, an inventory prediction (e.g., based on an inventory trend and/or an ML model), a sales prediction (e.g., based on a sales trend and/or an ML model), a type of payment data, a transaction history associated with a user, a transaction history associated with a merchant, a transaction history associated with an object (e.g., a product or service associated with an optical glyph 125), or a combination thereof.

At operation 1055, the context-sensitive scanner system (or a subsystem thereof) is configured to, and can, identify that the application is in a first mode. In the first mode, an interface (e.g., sensor and/or communication interface) is not usable by the application. Examples of the first mode include a mode that the context-sensitive scanner system 105 is in as illustrated in FIG. 1A, a mode determined by the mode control engine(s) 360, the first mode 450, the editing mode 855, another mode discussed herein, or a combination thereof.

At operation 1060, the context-sensitive scanner system (or a subsystem thereof) is configured to, and can, output an interface non-usability indicator, and/or not output an interface usability indicator.

Examples of the interface usability indicator include a sensor usability indicator of the sensor mode indicator(s) 115, a sensor usability indicator of the sensor mode indicator(s) 230, a sensor usability indicator determined using the mode control engine(s) 360, the sensor usability indicator 435, the second sensor usability indicator 460, the sensor usability indicators in the status bar 530, the additional sensor usability indicator 535, the sensor usability indicator 635, the second sensor usability indicator 640, the sensor usability indicator 730, the sensor usability indicator 740, the sensor usability indicator 830, the second sensor usability indicator 835, and/or a sensor usability indicator associated with the sensor mode determination 935.

Examples of the interface non-usability indicator include a sensor non-usability indicator of the sensor mode indicator(s) 115, a sensor non-usability indicator of the sensor mode indicator(s) 230, a sensor non-usability indicator determined using the mode control engine(s) 360, the sensor non-usability indicator 430, the sensor non-usability indicator 860, the second sensor non-usability indicator 865, and/or a sensor non-usability indicator associated with the sensor mode determination 935.

At operation 1065, the context-sensitive scanner system (or a subsystem thereof) is configured to, and can, decouple (e.g., disconnect), via switch(es) (e.g., 215//), the interface from a power supply, processor(s), and/or actuator(s) for the interface.

At operation 1070, the context-sensitive scanner system (or a subsystem thereof) is configured to, and can, identify that the application is in a second mode. In the second mode, the interface (e.g., sensor and/or communication interface) is usable by the application. Examples of the second mode include a mode that the context-sensitive scanner system 105 is in as illustrated in FIG. 1A, a mode determined by the mode control engine(s) 360, the second mode 455, the mode 550, the mode 650, the mode 750, the photo mode 850, another mode discussed herein, or a combination thereof.

At operation 1075, the context-sensitive scanner system (or a subsystem thereof) is configured to, and can, output an interface usability indicator, and/or not output an interface non-usability indicator.

At operation 1080, the context-sensitive scanner system (or a subsystem thereof) is configured to, and can, couple (e.g., connect), via switch(es) (e.g., 215//), the interface from a power supply, processor(s), and/or actuator(s) for the interface.

At operation 1085, the context-sensitive scanner system (or a subsystem thereof) is configured to, and can, activate the interface to interact with an interactive element (e.g., an optical glyph and/or the communication instrument 250). For instance, if the interactive element is an optical glyph, the interface can interact with the interactive element by scanning the interactive element (e.g., the interface being a sensor capable of optical scanning such as a camera or a barcode reader). If the interactive element is a communication instrument, the interface can interact with the interactive element by communicating with the communication instrument 250 over short-range wireless communication protocols, in some cases first providing power to the communication instrument 250 and then receiving data transmitted by the communication instrument 250.

Examples of the interactive element include the optical glyph 125, the barcode 240, the 2D glyph 245, the communication instrument 250, the barcode 475, the optical glyph 575, the optical glyph 675, the optical glyph 775, a 1D barcode, a 2D matrix barcode, a QR code, an Aztec code, a data matrix, a PDF417 code, a high capacity color barcode, a maxicode, a semacode, a variant of any of the previously-listed code types, another type of optical glyph discussed herein, another type of communication instrument discussed herein, or a combination thereof.

At operation 1090, the context-sensitive scanner system (or a subsystem thereof) is configured to, and can, receive and/or read object data from the interactive element based on an analysis of the interaction. For instance, if the interactive element is an optical glyph, operation 1090 can include analyzing the optical glyph to optically decode object information from the optical glyph as scanned in the sensor data. The object information is associated with an object. Operation 1090 can include, or be included as part of, operation 1020.

At operation 1095, the context-sensitive scanner system (or a subsystem thereof) is configured to, and can, perform an action (e.g., action 130) associated with the object and based on the object information. Operation 1095 can include, or be included as part of, operation 1025.

Examples of the interface include any of the sensor(s) and/or communication interface(s) of the sensor array 120, the first sensor 210A, the second sensor 210B, the communication interface 235, the detection interface(s) 325, the communication interface(s) 335, the communication interface(s) 340, the sensor(s) 350, the input device(s) 355, any of the sensor(s) and/or communication interface(s) of the sensor array 420, the sensor 465, first sensor 520, the second sensor 525, the first sensor 620, the second sensor 625, the first sensor 720, the second sensor 725, the camera 820, another sensor discussed herein, or a combination thereof.

Examples of the object data include data captured and/or received by any of the sensor(s) and/or communication interface(s) of the sensor array 120, the scanned barcode 240, the scanned 2D glyph 245, the data received from the communication instrument 250, a detection by the detection interface(s) 325, data received by the communication interface(s) 335, data received by the communication interface(s) 340, sensor data captured by the sensor(s) 350, an input received using the input device(s) 355, data captured and/or received by any of the sensor(s) and/or communication interface(s) of the sensor array 420, the barcode 475 scanned using the 465, the image of the object 570 captured using the first sensor 520, the optical glyph 575 scanned using the second sensor 525, the optical glyph 675 scanned using the first sensor 620, the image of the object 670 captured using the second sensor 625, the optical glyph 775 scanned using the first sensor 720, the image 780 of the object 770 captured using the second sensor 725, the image 840 of the object 870 captured using the camera 820, any other sensor data discussed herein, any other communicated data discussed herein, any other input(s) discussed herein, or a combination thereof.

Examples of the contextual data include the context information 225, the context data 910, an operation and/or function to be performed using an application running on a context-sensitive scanner system (e.g., using a specific UI or mode of the application), a location of the context-sensitive scanner system 205, sensor data from a first sensor (e.g., a barcode scanned by a barcode scanner), sensor data from a second sensor (e.g., an image captured by a camera, a 2D glyph scanned by the camera), data extracted from sensor data by processing the sensor data (e.g., data decoded from an optical glyph in which the data is optically encoded, characters recognized in an image using OCR 645, and/or objects detected and/or recognized in an image using a object recognition algorithm 545), communicated information received wirelessly by a short-range communication interface (e.g., received from a communication instrument 250), audio data received via a sensor (e.g., microphone) of the context-sensitive scanner system, proximity data received via a sensor (e.g., proximity detector) of the context-sensitive scanner system, depth data received via a sensor (e.g., depth sensor) of the context-sensitive scanner system, a pose (e.g., location and/or orientation) of the context-sensitive scanner system (e.g., as determined using pose sensor(s) of the context-sensitive scanner system), an identity of a user (e.g., user 135) of the context-sensitive scanner system, a time, a date, the mode that the context-sensitive scanner system is in, any sensor data received from the sensor, or a combination thereof.

Figure 11:
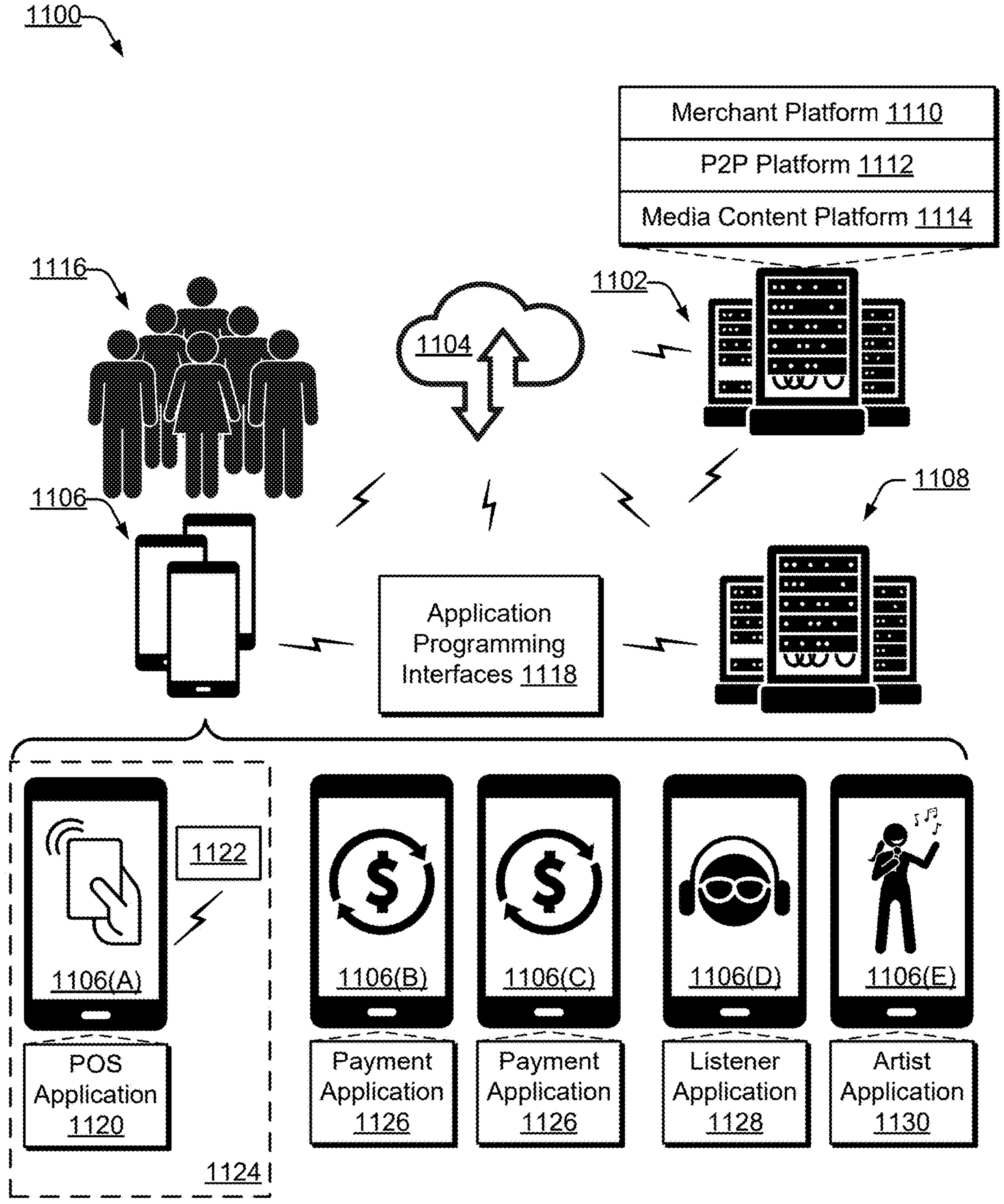
FIG. 11 is a block diagram illustrating an example environment for providing an application and/or for customizing the application for different platforms, in accordance with some examples.

FIG. 11 illustrates an example environment 1100 for application interface customization. The environment 1100 includes server(s) 1102 that can communicate over a network 1104 with end user devices 1106 and/or server(s) 1108 associated with third-party service provider(s). In various examples, the end user devices 1106 may comprise one or more merchant devices 1106(A), one or more user devices 1106(B) and/or 1106(C) in a peer network, one or more content consumption devices 1106(D), one or more artist user devices 1106(E), combinations of these examples, or other categories of user devices. The server(s) 1102 can be associated with one or more service providers that can provide one or more services for the benefit of users 1116, as described below. For example, the server(s) 1102 may enable services of service providers such as in association with a merchant platform 1110 (which may further include a buyer platform), a peer-to-peer (P2P) payment platform 1112, a media content platform 1114, a combination of these platforms, or other platforms associated with other service providers. While services and features are referenced throughout in connection with a particular one of the merchant platform 1110, the P2P payment platform 1112, or the media content platform 1114, it should be understood that any of these platforms may perform the functionality described in relation to any of the other platforms. Actions attributed to the service provider(s) can be performed by the server(s) 1102.

In some examples, the end user devices 1106, merchant platform 1110, P2P platform 1112, and/or media content platform 1114 can be examples of the context-sensitive scanner system 105, the context-sensitive scanner systems 150A-150C, the context-sensitive scanner system 205, the context-sensitive scanner system 300, the context-sensitive scanner system 405, the context-sensitive scanner system 505, the context-sensitive scanner system 605, the context-sensitive scanner system 705, the context-sensitive scanner system 805, the ML system 900, the ML engine 920, the ML model(s) 925, the feedback engine(s) 945, a context-sensitive scanner system that performs the process 1000A and/or the process 1000B, or a combination thereof. In some examples, individual ones of the end user devices 1106 can be operable by users 1116 (e.g., user 135). The users 1116 (individually referred to herein as "user 1116") can be referred to as miners, customers, buyers, merchants, sellers, borrowers, employees, employers, payors, payees, couriers, artists, musicians, listeners, fans, supervisors, hosts, audience members, and so on. The users 1116 can interact with the end user devices 1106 via user interfaces presented via the end user devices 1106. In at least one example, a user interface can be presented via a web browser, or the like. Alternatively or additionally, a user interface can be presented via an application, such as a mobile application or desktop application, which can be provided by the merchant platform 1110, the P2P payment platform 1112, and/or the media content platform 1114, or which can be an otherwise dedicated application. In some examples, individual end user devices 1106 can have an instance or versioned instance of an application, which can be downloaded from an application store, for example, which can present the user interface(s) described herein.

In at least one example, the users 1116 can include merchants that can operate the seller device(s) 1106(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1106(A) can have an instance of a point of sale ("POS") application 1120 stored thereon. The POS application 1120 can configure the seller device 1106(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1120 can determine transaction data associated with the POS transactions. Transaction data can include payment information, which can be obtained from a reader device 1122 associated with the seller device 1106(A), user authentication data, purchase amount information, point-of-purchase information (e.g., item(s) purchased, date of purchase, time of purchase, subscription type, etc.), etc. The POS application 1120 can send transaction data to the server(s) 1102 such that the server(s) 1102 can track transactions of the customers, merchants, and/or the users 1116 over time. Furthermore, the POS application 1120 can present a UI to enable the merchant to interact with the POS application 1120 and/or the merchant platform 1110 via the POS application 1120.

In at least one example, the seller device 1106(A) can be a special-purpose computing device configured as a POS terminal (via the execution of the POS application 1120). In at least one example, the POS terminal may be connected to a reader device 1122, which is capable of accepting a variety of payment instruments, such as credit cards, debit cards, gift cards, short-range communication based payment instruments, and the like, as described below. In at least one example, the reader device 1122 can plug in to a port in the seller device 1106(A), such as a microphone port, a headphone port, an audio-jack, a data port, or other suitable port. In additional or alternative examples, the reader device 1122 can be coupled to the seller device 1106(A) via another wired or wireless connection, such as via Bluetooth®, BLE, and so on. In some examples, the reader device 1122 can be a software solution executing on the POS terminal, e.g., a mobile phone. In some examples, the reader device 1122 can read information from alternative payment instruments including, but not limited to, wristbands and the like.

In some examples, the reader device 1122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1122, and communicate with the merchant platform 1110, which can provide, among other services, a payment processing service. The server(s) 1102 associated with the merchant platform 1110 can communicate with server(s) 1108, as described below. In this manner, the POS terminal and reader device 1122 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1122 of the POS system 1124 are shown as separate devices, in additional or alternative examples, the POS terminal and the reader device 1122 can be part of a single device. In some examples, the reader device 1122 can have a display integrated therein for presenting information to customers of a merchant. In additional or alternative examples, the POS terminal can have a display integrated therein for presenting information to the customers of the merchant. POS systems, such as the POS system 1124, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1122, whereby the reader device 1122 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1124, the server(s) 1102, and/or the server(s) 1108 may exchange payment information and transaction data to determine whether transactions are authorized. For example, the POS system 1124 may provide encrypted payment data, user authentication data, purchase amount information, point-of-purchase information, etc. (collectively, transaction data) to server(s) 1102 over the network(s) 1104. The server(s) 1102 may send the transaction data to the server(s) 1108.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1108 associated therewith) can forward the fund transfer request to an issuing bank (e.g., "issuer"). The issuer is a bank or financial institution that offers a financial account (e.g., credit or debit card account) to a user. The issuer (e.g., the server(s) 1108 associated therewith) can make a determination as to whether the customer has the capacity to absorb the relevant charge associated with the payment transaction. In at least one example, the merchant platform 1110 can serve as an issuer and/or can partner with an issuer. The transaction is either approved or rejected by the issuer and/or the card payment network (e.g., the server(s) 1108 associated therewith), and a payment authorization message is communicated from the issuer to the POS device via a path opposite of that described above, or via an alternate path.

The server(s) 1108 may send an authorization notification over the network(s) 1104 to the server(s) 1102, which may send the authorization notification to the POS system 1124 over the network(s) 1104 to indicate whether the transaction is authorized. The server(s) 1102 may also transmit additional information such as transaction identifiers to the POS system 1124. In one example, the server(s) 1102 may include a merchant application and/or other functional components for communicating with the POS system 1124 and/or the server(s) 1108 to authorize or decline transactions (e.g., the API 1118). In examples, the merchant platform 1110 can enable the merchants to receive cash payments, payment card payments, and/or electronic payments from customers for POS transactions and the service provider can process transactions on behalf of the merchants.

Based on the authentication notification that is received by the POS system 1124 from server(s) 1102, the merchant may indicate to the customer whether the transaction has been approved. In some examples, approval may be indicated at the POS system 1124, for example, at a display of the POS system 1124. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 1110 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the end user devices 1106 can access all of the services. In some cases, the end user devices 1106 can have gradated access to the services, which can be based on risk tolerance, IDV outputs, subscriptions, and so on. In at least one example, access to such services can be availed to the merchants via the POS application 1120. In additional or alternative examples, each service can be associated with its own access point (e.g., application, web browser, etc.).

As the merchant platform 1110 processes transactions on behalf of the merchants, the merchant platform 1110 can maintain accounts or balances for the merchants in one or more ledgers. For example, the merchant platform 1110 can analyze transaction data received for a transaction to determine an amount of funds owed to a merchant for the transaction and deposit funds into an account of the merchant. The account can have a stored balance, which can be managed by the merchant platform 1110. The account can be different from a conventional bank account at least because the stored balance is managed by a ledger of the merchant platform 1110 and the associated funds are accessible via various withdrawal channels including, but not limited to, scheduled deposit, same-day deposit, instant deposit, and a linked payment instrument.

A scheduled deposit can occur when the merchant platform 1110 transfers funds associated with a stored balance of the merchant to a bank account of the merchant that is held at a bank or other financial institution (e.g., associated with the server(s) 1108). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 1110 to the bank account of the merchant.

In at least one example, the merchant platform 1110 may provide inventory management services. That is, the merchant platform 1110 may provide inventory tracking and reporting. Inventory management services may enable the merchant to access and manage a database storing data associated with a quantity of each item that the merchant has available (i.e., an inventory). Furthermore, in at least one example, the merchant platform 1110 can provide catalog management services to enable the merchant to maintain a catalog, which can be a database storing data associated with items that the merchant has available for acquisition (i.e., catalog management services). The merchant platform 1110 can offer recommendations related to pricing of the items, placement of items on the catalog, and multi-party fulfillment of the inventory, to name a few examples.

In at least one example, the merchant platform 1110 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 1110 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 1110 can provide financing services for offering and/or lending a loan to a borrower that is to be used for, in some instances, financing the borrower's short-term operational needs (e.g., a capital loan). Additionally or alternatively, the merchant platform 1110 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 1110 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 1110 can provide web-development services, which enable users 1116 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 1110 can recommend and/or generate content items to supplement omni-channel presences of the merchants.

Furthermore, the merchant platform 1110 can provide payroll services to enable employers to pay employees for work performed on behalf of employers. In at least one example, the merchant platform 1110 can receive data that includes time worked by an employee (e.g., through imported timecards and/or POS interactions), sales made by the employee, gratuities received by the employee, and so forth. Based on such data, the merchant platform 1110 can make payroll payments to employee(s) on behalf of an employer via the payroll service. For instance, the merchant platform 1110 can facilitate the transfer of a total amount to be paid out for the payroll of an employee from the bank of the employer to the bank of the merchant platform 1110 to be used to make payroll payments. In at least one example, when the funds have been received at the bank of the merchant platform 1110, the merchant platform 1110 can pay the employee, such as by check or direct deposit.

Moreover, in at least one example, the merchant platform 1110 can provide employee management services for managing schedules of employees. Further, the merchant platform 1110 can provide appointment services for enabling users 1116 to set schedules for scheduling appointments and/or users 1116 to schedule appointments.

In some examples, the merchant platform 1110 can provide restaurant management services to enable users 1116 to make and/or manage reservations, to monitor front-of-house and/or back-of-house operations, and so on. In such examples, the seller device(s) 1106(A) and/or server(s) 1102 can be configured to communicate with one or more other computing devices, which can be located in the front-of-house (e.g., POS device(s)) and/or back-of-house (e.g., kitchen display system(s) (KDS)). In at least one example, the merchant platform 1110 can provide order management services and/or fulfillment services to enable restaurants (or other merchant types) to manage open tickets, split tickets, and so on and/or manage fulfillment services.

In some examples, the merchant platform 1110 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 1110 can leverage other merchants and/or sales channels that are part of the merchant platform 1110 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 1110 can enable conversational commerce via conversational commerce services, which can use one or more machine learning mechanisms to analyze messages exchanged between two or more users 1116, voice inputs into a virtual assistant or the like, to determine intents of user(s) 1116. In some examples, the merchant platform 1110 can utilize determined intents to automate customer service, offer promotions, provide recommendations, or otherwise interact with customers in real-time. In at least one example, the merchant platform 1110 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1116 may be new to the merchant platform 1110 such that the user 1116 that has not registered (e.g., subscribed to receive access to one or more services offered by the merchant platform 1110) with the merchant platform 1110. The merchant platform 1110 can offer onboarding services for registering a potential user 1116 with the merchant platform 1110. In some examples, onboarding can involve presenting various questions, prompts, and the like to a potential user 1116 to obtain information that can be used to generate a profile for the potential user 1116. In at least one example, the merchant platform 1110 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 1110 can be transitioned to more permissive (e.g., less limited) or longer-term access to such services.

The merchant platform 1110 can be associated with IDV services, which can be used by the merchant platform 1110 for compliance purposes and/or can be offered as a service, for instance to third-party service providers (e.g., associated with the server(s) 1108). That is, the merchant platform 1110 can offer IDV services to verify the identity of users 1116 seeking to use or using their services. Identity verification may involve requesting a customer (or potential customer) to provide information that is used by compliance departments to prove that the information is associated with an identity of a real person or entity (e.g., an artist). In at least one example, the merchant platform 1110 can perform services for determining whether identifying information provided by a user 1116 accurately identifies the customer (or potential customer).

Techniques described herein can be configured to operate in both real-time/online and offline modes. "Online" modes refer to modes when devices are capable of communicating with the merchant platform 1110 while offline mode refers to modes when devices are unable to communicate with the server(s) 1108 due to network connectivity issue, for example. In such examples, devices may operate in "offline" mode where at least some payment data is stored (e.g., on the seller device(s) 1106(A)) and/or the server(s) 1102 until connectivity is restored and the payment data can be transmitted to the server(s) 1102 and/or the server(s) 1108 for processing.

In at least one example, the merchant platform 1110 can be associated with a hub, such as an order hub, an inventory hub, a fulfillment hub and so on, which can enable integration with one or more additional service providers (e.g., associated with the additional server(s) 1108). In some examples, such additional service providers can offer additional or alternative services and the service provider can provide an interface or other computer-readable instructions to integrate functionality of the service provider into the one or more additional service providers.

Turning now to the P2P functionality provided by the environment 1100, the P2P platform 1112 can provide a peer-to-peer payment service that enables peer-to-peer payments between two or more of the users 1116. Two or more of the users 1116 may be considered "peers" in a peer-to-peer interaction, such as a payment. In at least one example, the P2P platform 1112 can communicate with instances of a payment application 1126 (or other access point) installed on end user devices 1106 configured for operation by the users 1116. In an example, an instance of the payment application 1126 executing on a first user device 1106(B) operated by a payor (e.g., one of the users 1116) can send a request to the P2P platform 1112 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1116) via a peer-to-peer payment. In some examples, assets associated with an account of the payor are transferred to an account of the payee. In some examples, assets can be held at least temporarily in an account of the P2P platform 1112 prior to transferring the assets to the account of the payee.

Figure 12:
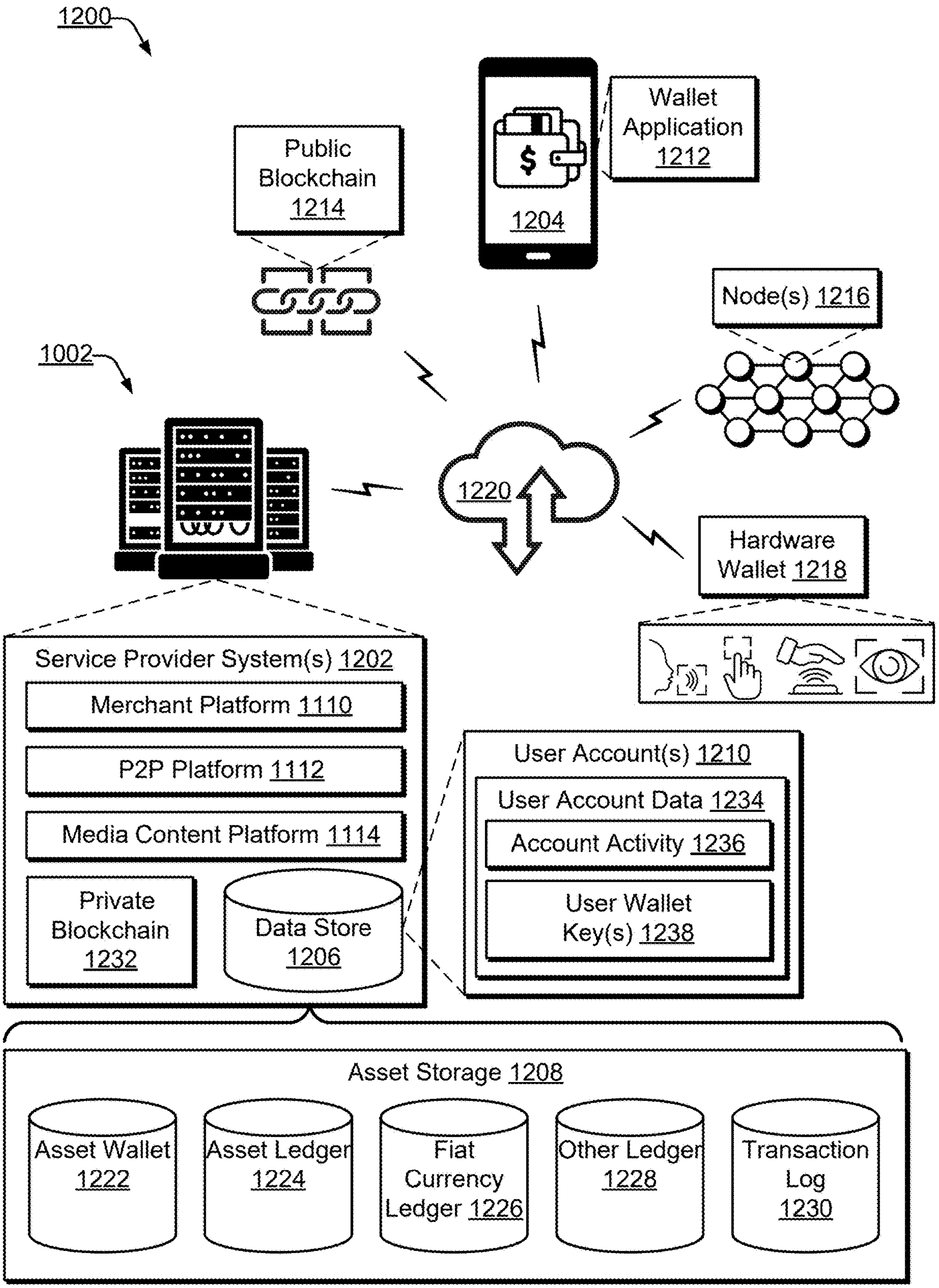
FIG. 12 is a block diagram illustrating an example environment including a service provider system which may be associated with the server(s) of FIG. 11, in accordance with some examples.

In some examples, the P2P platform 1112 can utilize a ledger system to track transfers of assets between users 1116. FIG. 12, below, provides additional details associated with such a ledger system. The ledger system can enable users 1116 to own fractional shares of assets that are not conventionally available. For instance, a user can own a fraction of a Bitcoin, an NFT, or a stock. Additional details are described herein.

In at least one example, the P2P platform 1112 can facilitate transfers and can send notifications related thereto to instances of the payment application 1126 executing on user device(s) of payee(s). As an example, the P2P platform 1112 can transfer assets from an account of a first user to an account of a second user and can send a notification to the user device 1106(B) of the second user for presentation via a user interface. The notification can indicate that a transfer is in process, a transfer is complete, or the like. In some examples, the P2P platform 1112 can send additional or alternative information to the instances of the payment application 1126 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1112 funds the request to payee on behalf of the payor, to speed up the transfer process and compensate for lags that may be attributed to the payor's financial network.

In some examples, the P2P platform 1112 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1126 executing on the end user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1112 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 11 or a third-party service provider associated with the server(s) 1108. In examples where the content provider is a third-party service provider, the server(s) 1108 can be accessible via one or more APIs 1118 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1112 (e.g., the P2P platform 1112 offers a chat or messaging service that is within the payment application or accessible via the payment application). In some examples, the messaging application can be external to the P2P platform 1112. (e.g., the messaging application is hosted by a third-party service provider associated with the server(s) 1108, which can be accessible via one or more of the APIs 1118 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1112 can enable users 1116 to perform banking transactions via instances of the payment application 1126. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1112 can enable users to allocate funds between different accounts, sub-accounts, or balances (e.g., spending, saving, different assets, different currencies), etc. Further, users 1116 can configure bill pay, recurring payments, and/or the like using assets associated with their accounts. In some examples, the P2P platform 1112, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1112 enables users to buy and/or sell assets via asset networks such as cryptocurrency networks, securities networks, and/or the like. In some examples, acquisition of such assets can be in whole or fractional shares. The ledger system described below with reference to FIG. 12 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1112 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1112 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1112 can automatically apply the amount of funds associated with the gift card to the transaction.

In some examples, users can configure their account such that when they use their payment instruments, the P2P platform 1112 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1112 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1112 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1112 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1112.

In some examples, components of the environment 1100 may be integrated to enable payments at the point-of-sale using assets associated with user accounts of the P2P platform 1112. As illustrated in the environment 1100, the components can communicate with one another via the network 1104, where one or more APIs 1118 or other functional components can be used to facilitate such communication.

In at least one example, an integration can enable a customer to participate in a transaction via their own computing device (e.g., user device 1106(B)) instead of interacting with a merchant device of a merchant, such as the seller device 1106(A). In such an example, the POS application 1120, associated with a payment processing platform and executable by the seller device 1106(A) of the merchant, can present a Quick Response (QR) code, or other code that can be used to identify a transaction (e.g., a transaction code), in association with a transaction between the customer and the merchant. The QR code, or other transaction code, can be provided to the POS application 1120 via an API 1118 associated with the peer-to-peer payment platform. In an example, the customer can utilize their own computing device, such as the user device 1106(B), to capture the QR code, or the other transaction code, and to provide an indication of the captured QR code, or other transaction code, to server(s) 1102.

Based at least in part on the integration of the peer-to-peer payment platform and the payment processing platform (e.g., via the API 1118), the server(s) 1102 of the merchant platform 1110 can exchange communications with a payment application 1126 associated with the P2P platform 1112 and/or the POS application 1120 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1112 and merchant platform 1110 (which can be a first- or third-party integration) such that a QR code, or other transaction code, specific to the transaction can be used for providing transaction details, location details, customer details, or the like to a computing device of the customer, such as the user device 1106(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1106(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1120 and the payment application 1126, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1106(B), can be specially configured as a buyer-facing device having functionality similar to the functionality described above in the brick-and-mortar example.

In some examples, based at least in part on capturing the QR code, or other transaction code, the merchant platform 1110 can provide transaction data to the P2P platform 1112 for presentation via the payment application 1126 on the computing device of the customer, such as the user device 1106(B), to enable the customer to complete the transaction via their own computing device. In some examples, in response to receiving an indication that the QR code, or other transaction code, has been captured or otherwise interacted with via the customer computing device, the P2P platform 1112 can determine that the customer authorizes payment of the transaction using funds associated with a stored balance of the customer that is managed and/or maintained by the P2P platform 1112. Such authorization can be implicit such that the interaction with the transaction code can imply authorization of the customer. Alternatively or additionally, the P2P platform 1112 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1112 can transfer funds from the stored balance of the customer to the merchant platform 1110. In at least one example, the merchant platform 1110 can deposit the funds, or a portion thereof, into a stored balance of the merchant that is managed and/or maintained by the merchant platform 1110. In such an example, the merchant platform 1110 can be a "peer" to the customer in a peer-to-peer transaction.

In some examples, techniques described herein can enable the customer to interact with the transaction after payment for the transaction has been settled. For example, in at least one example, the merchant platform 1110 can cause a total amount of a transaction to be presented via a user interface associated with the payment application 1126 such that the customer can provide gratuity, feedback, loyalty information, or the like, via an interaction with the user interface. In another example, the merchant platform 1110 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1112, if the customer inputs a tip and/or an event affecting the total amount of the transaction is triggered, the P2P platform 1112 can transfer additional funds, associated with the tip or event, to the merchant platform 1110. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1126 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1112 as described herein (e.g., a debit card linked to a stored balance of a customer) such that when the payment instrument is caused to interact with a payment reader, the merchant platform 1110 can exchange communications with the P2P platform 1112 to authorize payment for a transaction and/or provision associated transaction data to a computing device of the customer associated with the transaction.

Turning now to media content functionality provided by the environment 1100, the media content platform 1114 can provide digital media to a content consumption device 1106(D) where playback may occur using "streaming." In examples, "streaming" media content involves encoding the media content and transmitting the encoded media content over the network 1104 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1114 can provide a digital media streaming service (e.g., subscription-based, non-subscription-based) that enables a content consumption device 1106(D) to stream and/or download digital media content via a listener application 1128 installed on the content consumption device 1106(D). For instance, the media content platform 1114 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1106(D), the listener application 1128 may verify access rights to the digital media content items at time intervals, for instance intermittently (e.g., when the content consumption device 1106(D) has a network connection with the media content platform 1114 via the network(s) 1104), and/or at regular intervals (e.g., daily, weekly, monthly, etc.). In examples, access rights to the digital media content items may be provided when a subscription to the media content platform 1114 is active, while access rights to the digital media content items may be withheld when the subscription to the media content platform 1114 is terminated. Enabling storage on the end user devices 1106 and subsequent access to digital media content items via the listener application 1128 provides the users 1116 with the ability to access the digital media content items "offline" such as when a connection to the media content platform 1114 via the network(s) 1104 is unavailable or unreliable.

In some examples, the media content platform 1114 may additionally or alternatively provide an artist management service that enables the users 1116 to manage aspects of artist business via an artist application 1130 installed on the artist device 1106(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1116 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1116 may have access to a single user account via respective end user devices 1106, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1130 and the listener application 1128 may be distinct applications having differing user experiences and verification processes for access, such as illustrated in the environment 1100. For instance, the media content platform 1114 may request additional verification, such as a link to an artist website, a sample of an artist's work, a verified credential supplied by a third party, etc. to grant access to the artist application 1130 in addition to information requested to access the listener application 1128. Further, the artist application 1130 may provide the artist management services described herein, without the subscription-based digital media streaming services described herein, and vice versa. However, examples are also considered in which functionality provided by the artist application 1130 and the listener application 1128 partially or fully overlap, and/or where verification processes for access are substantially similar.

In at least some examples, the media content platform 1114 enables interaction between the users 1116 utilizing the listener application 1128 installed on the content consumption devices 1106(D), and the users 1116 utilizing the artist application 1130 installed on the artist end user devices 1106(E). For example, the media content platform 1114 may provide interconnectivity between the subscription-based digital media streaming service and the artist management service. Functionality provided by the media content platform 1114 in such instances may include a communication channel between one or more of the users 1116 (e.g., a listener, fan, music supervisor, publisher, etc.) utilizing the listener application 1128 and another user (e.g., an artist) of the users 1116 utilizing the artist application 1130. The communication channel may include, for instance, a messaging platform (also referred to as a "messaging application" herein), a live streaming platform, a videoconferencing or teleconferencing platform, and/or a combination of these.

Additionally, in some cases, the media content platform 1114 may facilitate a resource transfer between the listener application 1128 and the artist application 1130. In an example, the media content platform 1114 may direct a resource, such as a portion of a subscription fee paid by one of the users 1116 designated as a listener, to one or more of the users 1116 designated as artists based on a number of instances that the listening user consumed (e.g., streamed, downloaded, etc.) content created by respective ones of the artist users. Alternatively or additionally, the media content platform 1114 may direct a resource, such as funds, from an account associated with a listening user to an account associated with an artist user (or vice versa), in accordance with transfers between accounts as described herein. The media content platform 1114 may facilitate resource transfers in examples such as merchandise purchases, event ticket purchases, "tipping" an artist, payments for royalties or other fees, and so forth.

In some examples, the media content platform 1114 enables interaction between individual ones of the users 1116 with one another via the listener application 1128 installed on the content consumption device 1106(D) and other of the content consumption devices 1106(D) via a communication channel as described above. In an example, the listener application 1128 may provide functionality via a communication channel for a user to stream an individual digital media item, a playlist, or the like to an audience comprising other ones of the content consumption devices 1106(D). Alternatively or additionally, the communication channel may facilitate sharing of individual digital media items, playlists, user and/or artist profiles, and the like between the users 1116 via messages, uniform resource locators (URLs), quick response (QR) codes, and so forth.

In some cases, the media content platform 1114 enables interaction between individual ones of the users 1116 with one another via the artist application 1130 installed on the artist device 1106(E) and other of the artist end user devices 1106 via a communication channel as described above. In some instances, the media content platform 1114 may provide recommendations for a particular user indicating which of the other users 1116 to communicate with. Such a recommendation may be based on a similarity (or dissimilarity) of content created by two or more of the users 1116, an overlap (or lack thereof) of audience members of the users 1116, a geographic location of the users 1116, a coinciding event location of the users 1116, and so forth. In some examples, a user may input parameters for a desired connection via the artist application 1130, and the media content platform 1114 may filter which of the users 1116 to surface for recommendations to the user based on the input parameters. Alternatively or additionally, the media content platform 1114 may implement one or more machine learning models to filter which of the users 1116 to surface for recommendations to the user. The recommendations provided by the media content platform 1114 may be data driven and thus increase relevance of communications presented to the users 1116 and reduce unsolicited communications that may be received by the users 1116.

The media content platform 1114 may interact with the server(s) 1108 associated with the third-party service providers to, for instance, ingest digital media items, report digital media consumption data, pay royalties, and the like. In some examples, the server(s) 1108 may be accessible by the media content platform 1114 via one or more APIs 1118 or other integrations. In some cases, the third-party service provider may be a digital media content provider (e.g., a record label, a performance rights organization (PRO), an independent artist, etc.). In such cases, the media content platform 1114 may receive digital media content items from the server(s) 1108, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1114 may use the metadata to associate the digital media content item as being created by a particular user, to provide search results to the users 1116, to generate playlists, and so forth. Further, the media content platform 1114 may provide payments (e.g., royalties) to the third-party service provider based on a number of streams and/or downloads of individual digital media content items by the users 1116 via the listener application 1128.

Techniques described herein are directed to services provided via a distributed system of end user devices 1106 that are in communication with server(s) 1102 of the service provider. That is, techniques described herein are directed to a specific implementation—or, a practical application—of utilizing a distributed system of end user devices 1106 that are in communication with server(s) 1102 of the merchant platform 1110, the P2P platform 1112, and/or the media content platform 1114 to perform a variety of services, as described above. The unconventional configuration of the distributed system described herein enables the server(s) 1102 that are remotely-located from end-users (e.g., users 1116) to intelligently offer services based on aggregated data associated with the end-users, such as the users 1116 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 1110, the P2P platform 1112, and/or the media content platform 1114, and those outside of the control of these service providers, to track the standing (payables, receivables, payroll, invoices, appointments, capital, balances, collaborations, etc.) of the users 1116. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1116 and end user devices 1106. Furthermore, such features are changed dynamically based on the profiles of the users involved interacting with the GUIs. As such, techniques described herein are directed to improvements to computing systems.

The merchant platform 1110, the P2P platform 1112, and/or the media content platform 1114 are capable of providing additional or alternative services, and the services described above are offered as a sampling of services. In at least one example, the merchant platform 1110, the P2P platform 1112, and/or the media content platform 1114 can exchange data with the server(s) 1108 associated with third-party service providers. Such third-party service providers can provide information that enables the merchant platform 1110, the P2P platform 1112, and/or the media content platform 1114 to provide services, such as those described above. In additional or alternative examples, such third-party service providers can access services of the merchant platform 1110, the P2P platform 1112, and/or the media content platform 1114. That is, in some examples, the third-party service providers can be subscribers, or otherwise access, services of the merchant platform 1110, the P2P platform 1112, and/or the media content platform 1114.

FIG. 12 illustrates an example environment 1200 including a service provider system 1202 which may be associated with the server(s) 1102 of FIG. 11. The environment 1200 may also include a user device 1204, which may correspond to any of the end user devices 1106 described in relation to FIG. 11. In examples, the service provider system 1202 may include one or a combination of the merchant platform 1110, the P2P platform 1112, or the media content platform 1114, as well as one or more data store(s) 1206 that can store assets in an asset storage 1208, as well as data in user account(s) 1210. In some examples, the environment 1200 may also include a public blockchain 1214, one or more nodes 1216, and/or a hardware wallet 1218. The service provider system 1202, the user device 1204, public blockchain 1214, the node(s) 1216, and the hardware wallet 1218 may be connected and able to communicate via one or more networks 1220, which may have the same or similar functionality described in relation to the network 1104 of FIG. 11.

In some examples, user account(s) 1210 can include merchant account(s), customer account(s), media content subscriber account(s), artist account(s), and so forth. In at least one example, the asset storage 1208 can be used to record whether individual assets are registered to a user account 1210. For example, the asset storage 1208 can include asset wallet(s) 1222 for storing records of assets owned by the service provider system 1202, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1108 of FIG. 11 can be associated therewith.

The asset wallet 1222 can be associated with one or more addresses and can vary addresses used to acquire assets (e.g., from the asset network(s)) so that its holdings are represented under a variety of addresses on the asset network. In examples where the service provider system 1202 has holdings of cryptocurrency (e.g., in the asset wallet 1222), a user can acquire cryptocurrency directly from the service provider system 1202. In some examples, the service provider system 1202 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1202 can provide the same or similar functionality for securities or other assets.

The asset storage 1208 may contain ledgers that store records of assignments of assets to users 1116. Specifically, the asset storage 1208 may include asset ledger 1224, fiat currency ledger 1226, and/or other ledger(s) 1228, which can be used to record transfers of assets between users 1116 and/or one or more third-parties (e.g., merchant network(s), payment card network(s), ACH network(s), equities network(s), the asset network, securities networks, etc.). In doing so, the asset storage 1208 can maintain a running balance of assets managed by the service provider system 1202. The ledger(s) of the asset storage 1208 can further indicate some of the running balance for individual ledger(s) stored in the asset storage 1208 are assigned or registered to one or more user account(s) 1210.

In at least one example, the asset storage 1208 can include transaction logs 1230, which can include, as transaction data, records of past transactions involving the service provider system 1202 and/or the user account 1210. In some examples, the data store(s) 1206 can store a private blockchain 1232. A private blockchain 1232 can function to record sender addresses, recipient addresses, public keys, values of cryptocurrency transferred, and/or can be used to verify ownership of cryptocurrency tokens to be transferred. In some examples, the service provider system 1202 can record transactions involving cryptocurrency until the number of transactions has exceeded a determined limit (e.g., number of transactions, storage space allocation, etc.). Based at least in part on determining that the limit has been reached, the service provider system 1202 can publish the transactions in the private blockchain 1232 to the public blockchain 1214 (e.g., associated with the asset network), where miners can verify the transactions and record the transactions to blocks on the public blockchain 1214. In at least one example, the service provider system 1202 can participate as miner(s) at least for transactions to which the respective platform is a party to, to be posted to the public blockchain 1214.

In some cases, the data store(s) 1206 can store and/or manage multiple user accounts, an example of which is described in relation to the user account 1210. In at least one example, the user account 1210 can include user account data 1234, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1234 can include account activity 1236 and user wallet key(s) 1238. In some examples, the user wallet key(s) 1238 can include a public-private key-pair and a respective address associated with the asset network or other asset networks. In some examples, the user wallet key(s) 1238 may include one or more key pairs, which can be unique to the asset network or other asset networks.

In addition to the user account data 1234, the user account 1210 can include ledger(s) for account(s) managed by the service provider system 1202, for the user. For example, the user account 1210 may include an asset ledger 1224, a fiat currency ledger 1226, and/or one or more other ledgers 1228. The ledger(s) can indicate that a corresponding user utilizes the service provider system 1202 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1202.

In some examples, the asset ledger 1224 can store a balance for each of one or more cryptocurrencies (e.g., Bitcoin, Ethereum, Litecoin, etc.) registered to the user account 1210. In at least one example, the asset ledger 1224 can further record transactions of cryptocurrency assets associated with the user account 1210. For example, the user account 1210 can receive cryptocurrency from the asset network using the user wallet key(s) 1238. In some examples, the user wallet key(s) 1238 may be generated for the user upon request. User wallet key(s) 1238 can be requested by the user in order to send, exchange, or otherwise control the balance of cryptocurrency held by the service provider system 1202 (e.g., in the asset wallet 1222) and registered to the user. In some examples, the user wallet key(s) 1238 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1202 and the value is credited as a balance in asset ledger 1224), by purchasing currency in the form associated with the account using currency in a different form (e.g., buying a value of cryptocurrency from the service provider system 1202 using a value of fiat currency reflected in fiat currency ledger 12391226, and crediting the value of cryptocurrency in asset ledger 1224), or by conducting a transaction with another user (customer or merchant) of the service provider system 1202 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1202 (i.e., an external account). Such a transaction can request that the user to transfer an amount of the cryptocurrency in a message signed by user's private key to an address provided by the service provider system 1202. In at least one example, the transaction can be sent to miners to bundle the transaction into a block of transactions and to verify the authenticity of the transactions in the block. Once a miner has verified the block, the block is written to the public blockchain 1214 where the service provider system 1202 can then verify that the transaction has been confirmed and can credit the user's asset ledger 1224 with the transferred amount. When an account is funded by transferring cryptocurrency from a third-party cryptocurrency wallet, an update can be made to the public blockchain 1214. In some cases, this update of the public blockchain 1214 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1202. As described above, in some examples, the service provider system 1202 can acquire cryptocurrency from a third-party source. In examples where the service provider system 1202 has its own cryptocurrency assets, cryptocurrency transferred in a transaction (e.g., data with address provided for receipt of transaction and a balance of cryptocurrency transferred in the transaction) can be stored in an asset wallet 1222 associated with the service provider system 1202. In at least one example, the service provider system 1202 can credit the asset ledger 1224 of the user. Additionally, while the service provider system 1202 recognizes that the user retains the value of the transferred cryptocurrency through crediting the asset ledger 1224, an inspection of the blockchain will show the cryptocurrency as having been transferred to the service provider system 1202. In some examples, the asset wallet 1222 can be associated with many different addresses. In such examples, an inspection of the blockchain may not necessarily associate all cryptocurrency stored in asset wallet 1222 as belonging to the same entity. The presence of a private ledger used for real-time transactions and maintained by the service provider system 1202, combined with updates to the public ledger at other times, allows for extremely fast transactions using cryptocurrency to be achieved. In some examples, the "private ledger" can refer to the asset ledger 1224, which in some examples, can utilize the private blockchain 1232, as described herein. The "public ledger" can correspond to the public blockchain 1214 associated with the asset network.

In at least one example, an asset ledger 1224, fiat currency ledger 1226, or the like associated with the user account 1210 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1224. In some examples, a user can receive fiat currency or another currency in the form of payment for a transaction with another user. In at least one example, at least a portion of such funds can be converted into cryptocurrency by the service provider system 1202 and used to fund the asset ledger 1224 of the user.

In examples, a user can also have an account in U.S. dollars, which can be tracked, for example, via the fiat currency ledger 1226. Such an account can be funded by transferring money from a bank account at a third-party bank to an account maintained by the service provider system 1202 as is conventionally known. In some examples, a user can receive fiat currency in the form of payment for a transaction with another user. In such examples, at least a portion of such funds can be used to fund the fiat currency ledger 1226.

In some examples, a user can have one or more internal payment cards registered with the service provider system 1202. Internal payment cards can be linked to one or more of the accounts associated with the user account 1210. In some embodiments, options with respect to internal payment cards can be adjusted and managed using an application (e.g., the payment application 1126, a wallet application 1212, etc.).

In at least one example, the user account 1210 can be associated with the asset wallet accessible via a wallet application 1212 of the user device 1204, or a stored balance for use in payment transactions, peer-to-peer transactions, payroll payments, etc. In at least one example, the asset wallet 1222 can store data indicating an address provided for receipt of a cryptocurrency transaction. In at least one example, the balance of the asset wallet 1222 can be based at least in part on a balance of the asset ledger 1224. In at least one example, funds availed via the asset wallet 1222 can be stored in the asset wallet 1222. Funds availed via the asset wallet 1222 can be tracked via the asset ledger 1224. The asset wallet 1222, however, can be associated with additional cryptocurrency funds.

In at least one example, when the service provider system 1202 includes a private blockchain 1232 for recording and validating cryptocurrency transactions, the asset wallet 1222 can be used instead of, or in addition to, the asset ledger 1224. For example, a merchant can provide the address of the asset wallet 1222 for receiving payments. In an example where a customer is paying in cryptocurrency and the customer has their own cryptocurrency wallet account associated with the service provider system 1202, the customer can send a message signed by its private key including its wallet address (i.e., of the customer) and identifying the cryptocurrency and value to be transferred to the merchant's asset wallet 1222. The service provider system 1202 can complete the transaction by reducing the cryptocurrency balance in the customer's cryptocurrency wallet and increasing the cryptocurrency balance in the merchant's asset wallet 1222. In addition to recording the transaction in the respective cryptocurrency wallets, the transaction can be recorded in the private blockchain 1232 and the transaction can be confirmed. A user can perform a similar transaction with cryptocurrency in a peer-to-peer transaction as described above.

While the asset ledger 1224 and/or asset wallet 1222 are each described above with reference to cryptocurrency, the asset ledger 1224 and/or asset wallet 1222 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1202 is an aspect of the technology disclosed that enables technical advantages of increased processing speed and improved security.

The description of the environment 1200 above generally relates to a centralized service provider system 1202 that at least partially facilitates storing and managing assets in the data store 1206. However, the environment 1200 may also facilitate decentralized storage and management of assets alternatively or in addition to centralized storage and management as described above. For instance, the environment 1200 may include a decentralized platform implemented using a plurality of nodes (e.g., web nodes), an example of which is illustrated as node 1216. The node 1216 is representative of a computer or other device tasked with validating transactions and/or maintaining a copy of a blockchain ledger, such as a ledger associated with the public blockchain 1214. The decentralized platform may be implemented via the environment 1200 through use of decentralized identifiers and verifiable credentials that are stored and managed by user devices 1204. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1202). The decentralized identity referenced by a decentralized identifier gives an entity control over what data can be accessed, stored, modified, and so forth by other entities, such as the service provider system 1202.

The node 1216, as representative of one of a plurality of decentralized nodes (e.g., decentralized web nodes), supports data storage and relays that allows entities, service provider systems, individuals, organizations and so forth to send, store, and receive encrypted or public messages and data. The node 1216 is universally addressable and is "crawlable" using data addressing in relation to the decentralized identifiers. The node 1216 is also configured to support decentralized replication of data across the nodes that is consistent across multiple nodes over time through continued data communication between the nodes in the decentralized platform. The node 1216 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1204 may be an issuer, a holder, and/or a verifier, as can the service provider system 1202.

In some examples, the user device 1204 may implement a wallet application 1212 configured to manage decentralized identifiers and/or verifiable credentials. For instance, the wallet application 1212 may provide a user interface for implementation of access controls to various data associated with the decentralized identifier by the service provider system 1202, to other user devices, and so forth. Additionally, the wallet application 1212 may be configured to provide functionality for resource transfers (e.g., cryptocurrency, fiat currency, etc.) with the service provider system 1202, other user devices, and the like, based on techniques described herein.

In some examples, the hardware wallet 1218 may store cryptocurrency assets in combination with the wallet application 1212 and the service provider system 1202. For instance, the hardware wallet 1218, the wallet application 1212, and the service provider system 1202 may each store a respective, different private key, where a transaction with the cryptocurrency assets is signed by at least two of the three private keys. The user interface provided by the wallet application 1212 may allow a user to request a transaction. The wallet application 1212 may then sign the transaction with the private key of the wallet application 1212, have either the hardware wallet 1218 or the service provider system 1202 use a second of the three private keys to sign the transaction, and then provide the transaction with two signatures to the public blockchain 1214 for processing.

Figure 13:
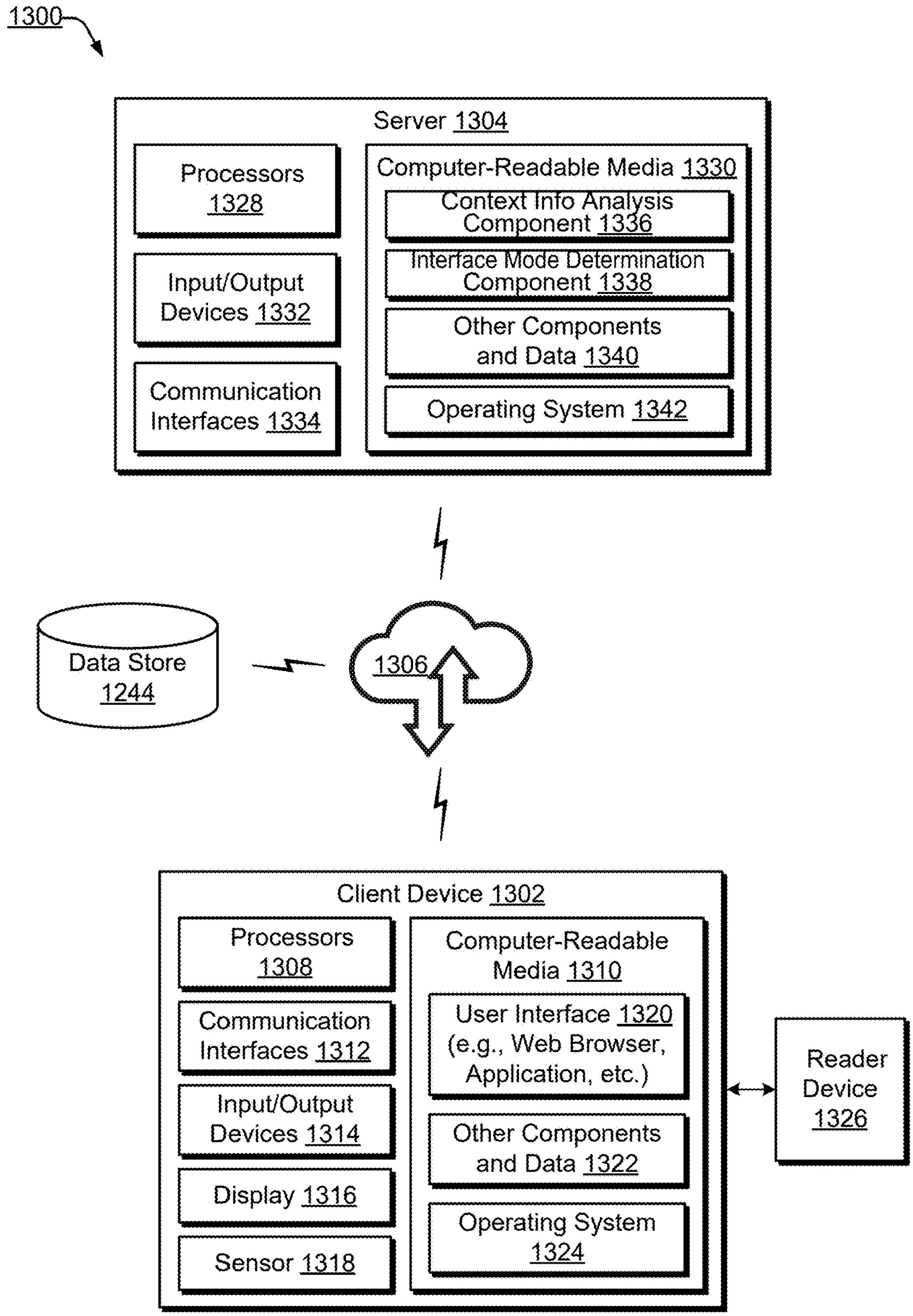
FIG. 13 is a block diagram illustrating a system for performing techniques described herein, in accordance with some examples.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 11.

In some examples, the client device 1302 and/or the server 1304 can include, and/or be examples of, the context-sensitive scanner system 105, the context-sensitive scanner systems 150A-150C, the context-sensitive scanner system 205, the context-sensitive scanner system 300, the context-sensitive scanner system 405, the context-sensitive scanner system 505, the context-sensitive scanner system 605, the context-sensitive scanner system 705, the context-sensitive scanner system 805, the ML system 900, the ML engine 920, the ML model(s) 925, the feedback engine(s) 945, a context-sensitive scanner system that performs the process 1000A and/or the process 1000B, or a combination thereof. The user interface 1320 can be an example of the UI 415, the UI 425, the UI 515, the UI 615, the UI 715, the UI 815, and/or the UI 825, or vice versa.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IOT) device, etc. That is, the user device 1302 can be any computing device capable of sending communications and performing the functions according to the techniques described herein. The user device 1302 can include devices, e.g., payment card readers, or components capable of accepting payments, as described below. The user device 1302 may be representative of, and provide functionality for, the user devices 1106 described in relation to FIG. 11.

In the illustrated example, the user device 1302 includes one or more processors 1308, one or more computer-readable media 1310, one or more communication interface(s) 1312, one or more input/output (I/O) devices 1314, a display 1316, sensor(s) 1318, one or more encoders 1346, and one or more decoders 1348.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In some examples, the user interface 1320 can include a UI associated with a mining application used to perform, control, and/or monitor the mining operations discussed herein, as performed using the mining ASIC(s) of the hashboard(s) discussed herein. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, user movement tracking techniques, eye tracking techniques, etc. to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtual reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. In some examples, the user device 1302 may not include the display 1316, and information can be presented by other means, such as aurally, haptically, etc.

In addition, the user device 1302 can include sensor(s) 1318. The sensor(s) 1318 can include a global positioning system ("GPS") device able to indicate location information. Further, the sensor(s) 1318 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 1110, the P2P platform 1112, and/or the media content platform 1114, described above, to provide one or more services. That is, in some examples, the service provider can implement geofencing to provide particular services to users by the merchant platform 1110, the P2P platform 1112, and/or the media content platform 1114.

In examples, the user device 1302 includes a codec system, which may comprise an encoder 1346 and/or a decoder 1348. The encoder 1346 is configured to encode a data stream or signal from an analog signal (e.g., an analog audio signal, an analog video signal, etc.) to a digital signal for transmission or storage. The decoder 1348 is configured to convert the digital signal back to an analog signal, such as for playback or editing. In some cases, the encoder 1346 may be configured to encode the data stream or analog signal in an encrypted format, and the decoder 1348 may accordingly be configured to decrypt the digital signal as part of the decoding process (e.g., using a cryptographic key). Additionally, in some examples, the encoder 1346 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1346 and/or the decoder 1348 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1300, the server 1304 may include an encoder 1346 and/or a decoder 1348 as well.

Additionally, the user device 1302 can include various other components that are not shown, examples of which include removable storage, a power source, such as a battery and power control unit, a barcode scanner, a printer, a cash drawer, and so forth.

In addition, as described in relation to FIG. 11, the user device 1302 can include, be connectable to, or otherwise be coupled to a reader device 1326, for reading payment instruments and/or identifiers associated with payment objects. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe, a dip, or a tap to obtain payment data associated with a customer. Additionally or optionally, the reader device 1326 may also include a biometric sensor to receive and process biometric characteristics and process them as payment instruments, given that such biometric characteristics are registered with the payment service and connected to a financial account with a bank server. The reader device 1326 may include processing unit(s), computer-readable media, a reader chip, a transaction chip, a timer, a clock, a network interface, a power supply, and so on. That is, the reader device 1326 may include any of the computing components described herein with reference to the user device 1302 to implement the functionality provided by the reader device 1326.

In examples, the reader device 1326 includes a reader chip, which may perform functionality to control the power supply, among other functionality of the reader device 1326. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The reader device 1326 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the merchant platform 1110, the P2P platform 1112, and/or the media content platform 1114. Functional components stored in the computer-readable media 1330 can optionally include a context information analysis component 1336, an interface mode determination component 1338, and one or more other components and data 1340. The computer-readable media 1330 can additionally include an operating system 1342 for controlling and managing various functions of the server(s) 1304.

In some examples, the context information analysis component 1336 can analyze context information (e.g., context information 225, context data 910, contextual data of operation 1005, contextual data of operation 1050). In some examples, the interface mode determination component 1338 can determine whether a given interface (e.g., sensor and/or communication interface) is usable or non-usable in a current mode of a context-sensitive scanner system (and/or an application running on the context-sensitive scanner system). In some examples, the context information analysis component 1336 and the interface mode determination component 1338 can work together, for instance utilizing mode control engine(s) 360 and/or the ML model(s) 925.

The payment component can be configured to receive transaction data from POS systems. The payment component can transmit requests (e.g., authorization, capture, settlement, etc.) to payment service server computing device(s) to facilitate POS transactions between merchants and customers. The payment component can communicate the successes or failures of the POS transactions to the POS systems.

The training component can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, as described herein.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306. In at least one example, the datastore 1344 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Illustrative aspects of the disclosure include:

Aspect 1. A hand-held payment device comprising: a housing; an optical sensor at least partially in the housing; a payment instrument reader at least partially in the housing; an output device at least partially in the housing; a memory that is in the housing and that stores instructions corresponding to an application; and a processor that is in the housing and that executes the instructions, wherein execution of the instructions by the processor causes the processor to: identify, based on received contextual data, a transition in the application from a first mode to a second mode of a plurality of possible modes for the application, wherein different modes of the plurality of possible modes are associated with different functionalities, wherein the first mode is one of a first subset of plurality of possible modes in which optical sensor data from the optical sensor is not usable by the application, and wherein the second mode is one of a second subset of the plurality of possible modes in which optical sensor data from the optical sensor is usable by the application; transition the output device from not outputting an optical sensor usability indicator while the application is in the first mode to outputting the optical sensor usability indicator while the application is in the second mode, the optical sensor usability indicator identifying that the optical sensor data from the optical sensor is usable by the application while the application is in the second mode; activate the optical sensor to scan an optical glyph while the application is in the second mode and while the output device is outputting the optical sensor usability indicator; analyze the optical glyph to optically decode object information from the optical glyph as scanned in the optical sensor data, wherein the object information is associated with an object; and perform an action associated with the object and based on the object information.

Aspect 2. The hand-held payment device of Aspect 1, wherein the execution of the instructions by the processor causes the processor to: identify, after performance of the action, a second transition in the application from the second mode back to the first mode; and transition the output device from outputting the optical sensor usability indicator while in the second mode to not outputting the optical sensor usability indicator while in the first mode.

Aspect 3. The hand-held payment device of any one of Aspects 1 or 2, wherein the execution of the instructions by the processor causes the processor to: identify, after performance of the action, a second transition in the application from the second mode to a third mode of the first subset of plurality of possible modes; and transition the output device from outputting the optical sensor usability indicator while in the second mode to not outputting the optical sensor usability indicator while in the third mode.

Aspect 4. An apparatus comprising: a housing; a sensor at least partially in the housing; an output device at least partially in the housing; a memory that is in the housing and that stores instructions corresponding to an application; and a processor that is in the housing and that executes the instructions, wherein execution of the instructions by the processor causes the processor to: identify, based on contextual data, a transition in the application from a first mode to a second mode, wherein sensor data from the sensor is not usable by the application while the application is in the first mode, and wherein the sensor data from the sensor is usable by the application while the application is in the second mode; transition the output device from not outputting a sensor usability indicator while the application is in the first mode to outputting the sensor usability indicator while the application is in the second mode, the sensor usability indicator identifying that the sensor data from the sensor is usable by the application while the application is in the second mode; activate the sensor to scan an optical glyph while the application is in the second mode and while the output device is outputting the sensor usability indicator; analyze the optical glyph to optically decode object information from the optical glyph as scanned in the sensor data, wherein the object information is associated with an object; and perform an action associated with the object based on the object information.

Aspect 5. The apparatus of Aspect 4, wherein the execution of the instructions by the processor causes the processor to: identify, after performance of the action, a second transition in the application from the second mode back to the first mode; and transition the output device from outputting the sensor usability indicator while in the second mode to not outputting the sensor usability indicator while in the first mode.

Aspect 6. The apparatus of any one of Aspects 4 to 5, wherein the execution of the instructions by the processor causes the processor to: identify, after performance of the action, a second transition in the application from the second mode to a third mode; and transition the output device from outputting the sensor usability indicator while in the second mode to not outputting the sensor usability indicator while in the third mode.

Aspect 7. The apparatus of any one of Aspects 4 to 6, wherein the contextual data includes at least one of an operation to be performed using the application, a location of the apparatus, camera data associated with the sensor of the apparatus, audio data associated with the sensor of the apparatus, a pose of the apparatus, an identity of a user of the apparatus, a time, or a date.

Aspect 8. The apparatus of any one of Aspects 4 to 7, wherein the execution of the instructions by the processor causes the processor to: transition the output device from outputting a sensor non-usability indicator while the application is in the first mode to not outputting the sensor non-usability indicator while the application is in the second mode, the sensor non-usability indicator identifying that the sensor data from the sensor is not usable by the application while the application is in the first mode.

Aspect 9. The apparatus of any one of Aspects 4 to 8, wherein the output device is a display, and wherein the sensor usability indicator is output in one of a status bar or an input field of a graphical user interface while the application is in the second mode.

Aspect 10. The apparatus of any one of Aspects 4 to 9, wherein the output device is a display, and wherein the sensor usability indicator is output at a part of the display that is within a threshold distance of an actuator, wherein activating the sensor is performed in response to receipt of an interaction with the actuator.

Aspect 11. The apparatus of any one of Aspects 4 to 10, wherein the output device is a speaker, and wherein the sensor usability indicator includes a sound played through the speaker.

Aspect 12. The apparatus of any one of Aspects 4 to 11, wherein the output device is a haptic feedback actuator, and wherein the sensor usability indicator includes a vibration output using the haptic feedback actuator.

Aspect 13. The apparatus of any one of Aspects 4 to 12, wherein the optical glyph is a barcode, and wherein the sensor is a barcode scanner.

Aspect 14. The apparatus of any one of Aspects 4 to 13, wherein the optical glyph is a two-dimensional matrix barcode, and wherein the sensor is a camera.

Aspect 15. The apparatus of any one of Aspects 4 to 14, wherein the execution of the instructions by the processor causes the processor to: analyze an image captured using a camera of the apparatus to detect a representation of the object within the image; and verify that the representation of the object in the image matches the object information.

Aspect 16. The apparatus of any one of Aspects 4 to 15, wherein the action includes adding the object to a cart to be purchased as part of a transaction.

Aspect 17. The apparatus of Aspect 16, wherein the execution of the instructions by the processor causes the processor to: receive transaction instrument information from a transaction instrument reader of the apparatus; and facilitate processing of the transaction using the transaction instrument information.

Aspect 18. The apparatus of any one of Aspects 4 to 17, wherein the action includes adding at least a subset of the object information to a field.

Aspect 19. The apparatus of any one of Aspects 4 to 18, wherein the object is an identification document associated with a person, wherein the optical glyph is on at least a part of the identification document and wherein the object information includes personal information associated with the person.

Aspect 20. A computer-implemented method comprising: identifying, based on contextual data, a transition in an application from a first mode to a second mode, wherein sensor data from a sensor is not usable by the application while the application is in the first mode, and wherein the sensor data from the sensor is usable by the application while the application is in the second mode; transitioning an output device from not outputting a sensor usability indicator while the application is in the first mode to outputting the sensor usability indicator while the application is in the second mode, the sensor usability indicator identifying that the sensor data from the sensor is usable by the application while the application is in the second mode; activating the sensor to scan an optical glyph while the application is in the second mode and while the output device is outputting the sensor usability indicator; analyzing the optical glyph to optically decode object information from the optical glyph as scanned in the sensor data, wherein the object information is associated with an object; and performing an action associated with the object based on the object information.

Aspect 21. The computer implemented method of Aspect 21, further comprising: performing operations according to any one of Aspects 2, 3, or 4-19.

Aspect 22. A non-transitory computer-readable medium having stored thereon instructions that, when executed by one or more processors, cause the one or more processors to perform operations according to any of Aspects 1 to 21.

Aspect 23. An apparatus comprising one or more means for performing operations according to any of Aspects 1 to 21.

What is claimed is:

1. A hand-held payment device comprising:
- a housing;
- an optical sensor at least partially in the housing;
- a payment instrument reader at least partially in the housing;
- an output device at least partially in the housing;
- a memory that is in the housing and that stores instructions corresponding to an application; and
- a processor that is in the housing and that executes the instructions, wherein execution of the instructions by the processor causes the processor to:
  - analyze contextual data using a machine learning model to generate a model output, the machine learning model being trained to identify a sensor mode that the application is in based on the contextual data, the sensor mode being one of a plurality of possible modes for the application;
  - identify a transition in the application from a first mode to a second mode of the plurality of possible modes for the application based on the model output, wherein different modes of the plurality of possible modes are associated with different functionalities, wherein the first mode is one of a first subset of the plurality of possible modes in which the optical sensor is disconnected from a power supply via a switch and optical sensor data from the optical sensor is not usable by the application, and wherein the second mode is one of a second subset of the plurality of possible modes in which the optical sensor is connected to the power supply via the switch and the optical sensor data from the optical sensor is usable by the application;
  - transition the output device from not outputting an optical sensor usability indicator while the application is in the first mode to outputting the optical sensor usability indicator while the application is in the second mode, the optical sensor usability indicator identifying that the optical sensor is connected to the power supply and the optical sensor data from the optical sensor is usable by the application while the application is in the second mode;
  - activate the optical sensor to scan an optical glyph while the application is in the second mode and while the output device is outputting the optical sensor usability indicator;
  - analyze the optical glyph to optically decode object information from the optical glyph as scanned in the optical sensor data, wherein the object information is associated with an object; and
  - perform an action associated with the object and based on the object information.

2. The hand-held payment device of claim 1, wherein the execution of the instructions by the processor causes the processor to:
- identify, after performance of the action, a second transition in the application from the second mode back to the first mode; and
- transition the output device from outputting the optical sensor usability indicator while in the second mode to not outputting the optical sensor usability indicator while in the first mode.

3. The hand-held payment device of claim 1, wherein the execution of the instructions by the processor causes the processor to:
- identify, after performance of the action, a second transition in the application from the second mode to a third mode of the first subset of the plurality of possible modes; and
- transition the output device from outputting the optical sensor usability indicator while in the second mode to not outputting the optical sensor usability indicator while in the third mode.

4. An apparatus comprising:
- a housing;
- a sensor at least partially in the housing;
- an output device at least partially in the housing;
- a memory that is in the housing and that stores instructions corresponding to an application; and
- a processor that is in the housing and that executes the instructions, wherein execution of the instructions by the processor causes the processor to:
  - receive, by a machine learning engine, contextual data;
  - analyze the contextual data using a machine learning model of the machine learning engine;
  - generate an output using the machine learning model, the output including a sensor mode determination, the sensor mode determination being utilized to identify a status of the sensor corresponding to at least one of a first mode or a second mode, wherein the sensor is disconnected from a power supply via a switch and sensor data from the sensor is not usable by the application while the application is in the first mode, and wherein the sensor is connected to the power supply via the switch and the sensor data from the sensor is usable by the application while the application is in the second mode;
  - identify a transition in the application from the first mode to the second mode;
  - transition the output device from not outputting a sensor usability indicator while the application is in the first mode to outputting the sensor usability indicator while the application is in the second mode, the sensor usability indicator identifying that the sensor is connected to the power supply and the sensor data from the sensor is usable by the application while the application is in the second mode;

activate the sensor to scan an optical glyph while the application is in the second mode and while the output device is outputting the sensor usability indicator;

analyze the optical glyph to optically decode object information from the optical glyph as scanned in the sensor data, wherein the object information is associated with an object; and perform an action associated with the object based on the object information.

5. The apparatus of claim 4, wherein the execution of the instructions by the processor causes the processor to:

identify, after performance of the action, a second transition in the application from the second mode back to the first mode; and transition the output device from outputting the sensor usability indicator while in the second mode to not outputting the sensor usability indicator while in the first mode.

6. The apparatus of claim 4, wherein the contextual data includes at least one of a location of the apparatus, camera data associated with the sensor of the apparatus, audio data associated with the sensor of the apparatus, a pose of the apparatus, an identity of a user of the apparatus, a time, or a date.

7. The apparatus of claim 4, wherein the execution of the instructions by the processor causes the processor to:

transition the output device from outputting a sensor non-usability indicator while the application is in the first mode to not outputting the sensor non-usability indicator while the application is in the second mode, the sensor non-usability indicator identifying that the sensor data from the sensor is not usable by the application while the application is in the first mode.

8. The apparatus of claim 4, wherein the output device is a display, and wherein the sensor usability indicator is output in one of a status bar or an input field of a graphical user interface while the application is in the second mode.

9. The apparatus of claim 4, wherein the output device is a display, and wherein the sensor usability indicator is output at a part of the display that is within a threshold distance of an actuator, wherein activating the sensor is performed in response to receipt of an interaction with the actuator.

10. The apparatus of claim 4, wherein the output device is a speaker, and wherein the sensor usability indicator includes a sound played through the speaker.

11. The apparatus of claim 4, wherein the output device is a haptic feedback actuator, and wherein the sensor usability indicator includes a vibration output using the haptic feedback actuator.

12. The apparatus of claim 4, wherein the optical glyph is a barcode, and wherein the sensor is a barcode scanner.

13. The apparatus of claim 4, wherein the optical glyph is a two-dimensional matrix barcode, and wherein the sensor is a camera.

14. The apparatus of claim 4, wherein the execution of the instructions by the processor causes the processor to:

analyze an image captured using a camera of the apparatus to detect a representation of the object within the image; and verify that the representation of the object in the image matches the object information.

15. The apparatus of claim 4, wherein the action includes adding the object to a cart to be purchased as part of a transaction, wherein the execution of the instructions by the processor causes the processor to:

receive transaction instrument information from a transaction instrument reader of the apparatus; and facilitate processing of the transaction using the transaction instrument information.

16. A computer-implemented method comprising:

analyzing contextual data using a machine learning model to generate a model output, the machine learning model being trained to identify a sensor mode that an application is in based on the contextual data, the sensor mode being one of a plurality of possible modes for the application;

identifying a transition in the application from a first mode to a second mode based on the model output, wherein a sensor is disconnected from a power supply via a switch and sensor data from the sensor is not usable by the application while the application is in the first mode, and wherein the sensor is connected to the power supply via the switch and the sensor data from the sensor is usable by the application while the application is in the second mode;

transitioning an output device from not outputting a sensor usability indicator while the application is in the first mode to outputting the sensor usability indicator while the application is in the second mode, the sensor usability indicator identifying that the sensor is connected to the power supply and the sensor data from the sensor is usable by the application while the application is in the second mode;

activating the sensor to scan an optical glyph while the application is in the second mode and while the output device is outputting the sensor usability indicator;

analyzing the optical glyph to optically decode object information from the optical glyph as scanned in the sensor data, wherein the object information is associated with an object; and performing an action associated with the object based on the object information.

17. The apparatus of claim 4, wherein the machine learning engine trains the machine learning model with training data including at least one of one or more previous inputs to the machine learning model, one or more previous outputs of the machine learning model, previous contextual data, one or more previous sensor mode determinations, or previous feedback corresponding to the one or more previous outputs.

18. The apparatus of claim 4, wherein the execution of the instructions by the processor causes the processor to:

receive feedback associated with the output, the feedback providing an indication of a quality of the output; and train the machine learning model using the feedback.

19. The apparatus of claim 18, wherein training the machine learning model using the feedback includes using at least one of a loss function, a reward model, a discriminator, or an error function.

20. The hand-held payment device of claim 1, wherein the machine learning model is trained with training data including at least one of one or more previous inputs to the machine learning model, one or more previous outputs of the machine learning model, previous contextual data, one or more previous sensor mode determinations, or previous feedback corresponding to the one or more previous outputs.

* * * * *